3,126,387
18-O-ARYL-SULFONYL-DESERPIDATES AND
ANALOGS THEREOF
Michael Mullen Robison, Berkeley Heights, and Robert
Armistead Lucas, Mendham, N.J., assignors to Ciba
Corporation, a corporation of Delaware
No Drawing. Filed May 16, 1961, Ser. No. 110,320
15 Claims. (Cl. 260—287)

The present invention concerns 3-epi-allo-yohimbane compounds having the nucleus of the formula:

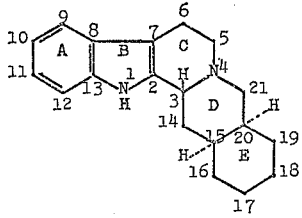

More particularly, it relates to 18α-etherified hydroxy-3-epi-allo-yohimbane 16β-carboxylic acid esters, particularly 18α-etherified hydroxy-17α-R-3-epi-allo-yohimbane 16β-carboxylic acid etsers, in which R represents primarily lower alkoxy, as well as cyano, salts, N-oxides or salts of N-oxides of such compounds. Apart from the groups attached to the 16β-position, the 17α-position and the 18α-position, the compounds of the present invention may contain additional substituents. Thus, substituents attached to the positions of the aromatic nucleus, i.e. ring A, of the molecule, more specifically to the 9-position, the 10-position, the 11-position and/or the 12-position, are represented, for example, by aliphatic hydrocarbon, such as lower alkyl and the like, etherified hydroxyl, particularly lower alkoxy, as well as cycloalkyloxy, cycloalkyl-lower alkoxy, carbocyclic aryloxy, carbocyclic aryl-lower alkoxy, lower alkylenedioxy and the like, esterified hydroxyl, particularly halogeno, as well as lower alkoxy-carbonyloxy, lower alkanoyloxy and the line, etherified mercapto, such as lower alkylmercapto and the like, nitro, amino, such as N,N-disubstituted amino and the like, substituted aliphatic hydrocarbon, such as substituted lower alkyl, for example, halogeno-lower alkyl, particularly trifluoromethyl, or any other suitable substituent. Other substituents, particularly aliphatic hydrocarbon radicals, such as lower alkyl, may also be attached to positions of other nuclei, particularly of the heterocyclic nucleus C, more specifically to the 5-position and/or the 6-position.

More especially, the invention is directed to compounds of the formula:

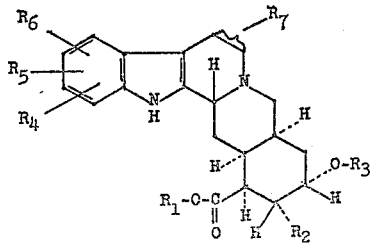

in which $R_1$ represents an aliphatic radical, primarily lower alkyl, as well as a substituted aliphatic radical, primarily substituted lower alkyl, such as, for example, monocyclic carbocyclic aryl-lower alkyl, e.g. phenyl-lower alkyl and the like, etherified hydroxy-lower alkyl, e.g. lower alkoxy-alkyl and the like, tertiary amino-lower alkyl, e.g. N,N-di-lower alkyl-amino-lower alkyl and the like, $R_2$ stands primarily for lower alkoxy, as well as for cyano, $R_3$ represents an aliphatic radical, primarily lower alkyl, as well as lower alkenyl, lower alkynyl and the like, including a cycloaliphatic radical, such as cycloalkyl or cycloalkenyl, or a substituted aliphatic radical, particularly substituted lower alkyl, which is substituted, for example by a cycloaliphatic radical, such as cycloalkyl or cycloalkenyl, carbocyclic aryl, such as monocyclic carbocyclic aryl and the like, hydroxyl, etherified hydroxyl, especially lower alkoxy and the like, esterified hydroxyl, such as lower alkoxy-carbonyloxy, lower alkanoyloxy, carbocyclic aryl-carbonyloxy, carbocyclic aryl-lower aliphatic hydrocarbon-carbonyloxy, halogeno and the like, acyl, such as lower alkanoyl, carbo-lower alkoxy and the like, mercapto, etherified mercapto, such as lower alkyl-mercapto and the like, tertiary amino, for example, N,N-di-lower alkyl-amino and the like, a heterocyclic, particularly a monocyclic heterocyclic, radical, or any other analogous group suitable for being attached to an aliphatic radical, each of the radicals $R_4$, $R_5$ and $R_6$ stands for hydrogen, aliphatic hydrocarbon, particularly lower alkyl and the like, substituted aliphatic hydrocarbon, particularly substituted lower alkyl, such as halogeno-lower alkyl, especially trifluoromethyl, etherified hydroxyl, particularly lower alkoxy, as well as cycloalkyloxy cycloalkyl-lower alkoxy, carbocyclic aryloxy, carbocyclic aryl-lower alkoxy or any other analogous etherified hydroxy group, esterified hydroxyl, particularly halogeno, as well as lower alkoxy-carbonyloxy, lower alkanoyloxy and the like, etherified mercapto, particularly lower alkyl-mercapto, nitro, amino, e.g. N,N-disubstituted amino and the like, or, whenever two of the groups $R_4$ $R_5$ and $R_6$ are attached to two adjacent positions and are taken together, for the lower alkylenedioxy, and $R_7$, attached to one of the positions 5 and 6, stands for hydrogen or lower alkyl, salts, N-oxides or salts of N-oxides of such compounds, as well as process for the preparation of such compounds.

The aliphatic radical of the alcohol portion of the ester grouping attached to the 16β-position of the molecule, which, in the above formula, is represented by the group $R_1$, stands above all for lower alkyl containing from one to ten, preferably from one to four, carbon atoms; such groups are particularly methyl, ethyl, n-propyl, isopropyl, n-butyl, isobutyl, secondary butyl and the like, as well as n-pentyl, isopentyl, n-hexyl, n-heptyl and the like.

The esterifying portion of the ester grouping attached to the 16β-position of the molecule, represented, for example, by the radical $R_1$ in the above formula, may also stand for a substituted aliphatic, particularly substituted lower alkyl, radical, such as, for example, monocyclic carbocyclic aryl-lower alkyl, in which lower alkyl contains from one to four carbon atoms, such as phenyl-lower alkyl, e.g. benzyl, 1-phenyl-ethyl, 2-phenylethyl and the like, or phenyl-lower alkyl, in which phenyl is substituted by lower alkyl, e.g. methyl, ethyl and the like, lower alkoxy, e..g methoxy, ethoxy and the like, halogeno, e.g. fluoro, chloro, bromo and the like, or any other suitable substituent.

Other substituted aliphatic, particularly lower alkyl, radicals, as represented, for example, by the group $R_1$ in the above formula, are aliphatic, especially lower alkyl, radicals substituted by functional groups, such as etherified hydroxyl, particularly lower alkoxy containing preferably from one to four carbon atoms, e.g. methoxy, ethoxy, n-propyloxy, isopropyloxy, n-butyloxy and the like, or tertiary amino, particularly N,N-di-lower alkyl-amino, in which lower alkyl contains from one to four carbon atoms, e.g. N,N-dimethylamino, N-ethyl-N-methylamino, N,N-diethylamino, N,N-di-n-propylamino, N,N-di-isopropylamino and the like, as well as 1-N,N-alkyleneimino, in which alkylene contains from four to six ring carbon atoms, e.g. 1-pyrrolidino, 1-piperidino, 1-N,N- hexamethyleneimino and the like, 1-N,N-oxa-alkylene-imino, in which oxa-alkylene contains preferably four ring carbon atoms, e.g. 4-morpholino and the like, N,N-thia-alkylene-imino, in which alkylene contains preferably four carbon atoms, e.g. 4-thiamorpholino and the like, or 1-N,N-aza-alkylene-imino, in which aza-alkylene contains from four to six ring carbon atoms, particularly 4-lower alkyl-1-piperazino, e.g. 4-methyl-1-piperazino, 4-ethyl-1-piperazino and the like. The aliphatic, particularly the lower alkyl, portion in an aliphatic, especially lower alkyl, radical substituted by functional groups, such as in an etherified hydroxy-lower alkyl radical, or in a tertiary amino-lower alkyl radical and the like, may be represented by a lower alkylene radical, which contains at least two, preferably from two to three, carbon atoms, separating the functional group, such as etherified hydroxyl, tertiary amino and the like, from the 16β-carboxyl group in the molecule by at least two, preferably by from two to three, carbon atoms. Such alkylene radicals are primarily 1,2-ethylene, 1-methyl-1,2-ethylene, 2-methyl-1,2-ethylene, 1,3-propylene, as well as 1,4-butylene and the like. Aliphatic, particularly lower alkyl radicals containing functional groups, which radicals are represented by $R_1$ in the above formula, may be primarily lower alkoxy-lower alkyl, in which lower alkyl has from two to three carbon atoms and separates the lower alkoxy group from the 16β-carboxyl group in the molecule by at least two carbon atoms, for example, 2-lower alkoxy-ethyl, e.g. 2-methoxyethyl, 2-ethoxyethyl and the like, 2-lower alkoxy-propyl, e.g. 2-methoxy-propyl and the like, 3-lower alkoxy-propyl, e.g. methoxy-propyl, 3-ethoxypropyl and the like. Other substituted aliphatic, particularly lower alkyl radicals, are, for example, N,N-di-lower alkyl-amino-lower alkyl, in which lower alkyl carrying the N,N-di-lower alkyl-amino group has from two to three carbon atoms and separates the N,N-di-lower alkyl-amino group from the 16β-carboxyl group in the molecule by at least two carbon atoms, for example, 2-N,N-di-lower alkyl-ethyl, e.g. 2-N,N-dimethyl-aminoethyl, 2-N,N-diethylaminoethyl and the like, 2-N,N-di-lower alkyl-amino-propyl, e.g. 2-N,N-diethyl-aminopropyl and the like, 3-N,N-di-lower alkyl-amino-propyl, e.g. 3-N,N-dimethylaminopropyl, 3-N,N-diethyl-aminopropyl and the like, N,N-alkylene-imino-lower alkyl, in which lower alkyl has from two to three carbon atoms and separates the N,N-alkylene-imino group from the 16β-carboxyl group in the molecule by at least two carbon atoms, and alkylene contains from four to seven carbon atoms, such as 2-(1-N,N-alkylene-imino)-ethyl, e.g. 2-(1-pyrrolidino)-ethyl, 2-(1-piperidino)-ethyl and the like, 2-(N,N-alkylene-imino)-propyl, e.g. 2-(1-pyrrolidino)-propyl, 2-(1-piperidino)-propyl and the like, 3-(1-N,N-alkylene-imino)-propyl, e.g. 3-(1-piperidino)-propyl, 3-(1-N,N-hexamethylene-imino)-propyl and the like, or any other suitable tertiary amino-lower alkyl radical.

The substituent attached to the 17α-position, as represented by the group $R_2$ in the above formula, represents lower alkoxy which contains preferably from one to four carbon atoms, and stands primarily for methoxy, as well as ethoxy, n-propyloxy, isopropyloxy, n-butyloxy, iso-butyloxy and the like. It may also stand for cyano.

The etherified hydroxyl group attached to the 18-position and represented, for example, by the grouping $R_3$—O— in the previously-given formula, is etherified by an aliphatic radical, including a cycloaliphatic or a substituted aliphatic radical. These radicals, represented in the above formula by the group $R_3$, stand, above all, for lower alkyl, containing from one to ten, preferably from one to seven, carbon atoms such as, for example, methyl, ethyl, n-propyl, isopropyl, n-butyl, isobutyl, secondary butyl, n-pentyl, isopentyl, neopentyl, n-hexyl, iso-hexyl, n-heptyl, n-oxtyl, n-nonyl, n-decyl and the like.

Other etherified 18-hydroxyl groups have as the etherifying portions, represented, for example by the radical $R_3$ in the above-given formula, other aliphatic radicals, such as, for example, lower alkenyl, particularly lower allylic alkenyl, containing preferably from three to five carbon atoms, e.g. allyl, 2-methyl-allyl, 2-butentyl, 3-methyl-2-butenyl, 2-pentenyl and the like, lower alkynyl, e.g. propargyl and the like, or cycloaliphatic radicals, such as cycloalkyl containing from three to eight, ring carbon atoms, e.g. cyclopropyl, cyclobutyl, cyclopentyl, cyclohexyl, cycloheptyl, cyclo-octyl and the like, or cyclo-alkenyl, containing preferably from five to eight ring carbon atoms, e.g. 3-cyclopentenyl, 2-cyclohexenyl and the like.

Aliphatic radicals etherifying the 18-hydroxyl group, as represented by $R_3$ in the above formula, may contain substituents, such as, for example, cycloaliphatic radicals. Accordingly, substituted aliphatic radicals may be represented by cycloaliphatic-aliphatic radicals, for example, by cycloalkyl-lower alkyl, in which cycloalkyl contains from three to eight ring carbon atoms, and lower alkyl contains from one to four carbon atoms, e.g. cyclopropylmethyl, 2-cyclopropylethyl, cyclobutylmethyl, cyclopentylmethyl, 1-cyclopentylethyl, 2-cyclopentylethyl, 3-cyclopentylpropyl, cyclohexylmethyl, 2-cyclohexylethyl and the like, cycloalkyl-lower alkenyl, in which cycloalkyl has the above-given meaning, and lower alkenyl contains preferably from three to five carbon atoms, e.g. 3-cyclopropyl-alkyl, 3-cyclopentyl-allyl and the like, cycloalkenyl-lower alkyl, in which cycloalkenyl contains from five to eight ring carbon atoms, and ower alkyl has from one to four carbon atoms, e.g. 2-(1-cyclopentyl)-ethyl, 2-cyclohexenylmethyl, 3-cyclohexenylmethyl and the like.

Other substituted aliphatic radicals contains as substituents carbocyclic aryl groups and represent, for example, carbocyclic aryl-aliphatic radicals, such as mono-cyclic carbocyclic aryl-lower alkyl, particularly phenyl-lower alkyl, e.g. benzyl, dephenylmethyl, 1-phenylethyl, 2-phenylethyl and the like, as well as carbocyclic-lower alkenyl, such as monocyclic carbocyclic aryl-lower alkenyl, particularly phenyl-lower alkenyl, e.g. 3-phenylallyl and the like, or analogous radicals, in which the carbocyclic aryl nucleus is substituted by one or more than one of the same or different substituents, for example, by lower alkyl, e.g. methyl, ethyl and the like, lower alkoxy, e.g. methoxy, ethoxy and the like, lower alkenyloxy, e.g. allyloxy and the like, halogeno, e.g. fluoro, chloro, bromo and the like, lower alkoxy-carbonyloxy, e.g. methoxy-carbonyloxy, ethoxy-corbonyloxy and the like, halogeno-lower alkyl, e.g. trifluoromethyl and the like, nitro, amino, such as N,N-di-lower alkyl-amino, e.g. N,N-dimethylamino and the like, or any other suitable substituent.

Other substituted aliphatic radicals, particularly lower alkyl groups, represented in the above formula by the group $R_3$, may be substituted by functional groups, particularly by hydroxyl or etherified hydroxyl. Aliphatic radicals containing hydroxyl groups are, for example, hydroxy-aliphatic radicals, such as hydroxy-lower alkyl, in which the hydroxyl group is separated from the 18-oxygen atom in the molecule by at least two carbon atoms, e.g. 2-hydroxyethyl, 2-hydroxypropyl, 3-hydroxypropyl, 4-hydroxybutyl, 5-hydroxypentyl and the like.

Etherified hydroxy-aliphatic radicals are primarily represented by lower alkoxy-lower alkyl, in which lower alkoxy contains from one to four carbon atoms, and stands, for example, for methoxy, ethoxy, n-propyloxy, isopropyloxy, n-butyloxy and the like, and in which the lower alkoxy group is separated from the 18-oxygen atom in the molecule by at least two carbon atoms; lower alkoxy-lower alkyl groups may be represented by 2-lower alkoxy-ethyl, e.g. 2-methoxyethyl, 2-ethoxyethyl, 2-isopropyloxyethyl and the like, 2-lower alkoxy-propyl, e.g. 2-methoxypropyl, 2-ethoxypropyl, 2-n-propyloxy-propyl and the like, 3-lower alkoxypropyl, e.g. 3-methoxypropyl, 3-ethoxypropyl and the like, or any other analogous lower alkoxy-lower alkyl group.

Other etherified hydroxyl groups, which may substitute aliphatic, particularly lower alkyl, radicals are, for example, lower alkenyloxy, e.g. vinyloxy, allyloxy and the like, cycloalkyloxy, in which cycloalkyl has from three to eight ring carbon atoms, e.g. cyclopentyloxy, cyclohexyloxy and the like, cycloalkenyloxy, in which cycloalkenyl has from five to eight ring carbon atoms, e.g. 3-cyclohexenyloxy and the like, cycloalkyl-lower alkoxy, in which cycloalkyl has from three to eight ring carbon atoms, e.g. cyclopentylmethyloxy, 2-cyclohexylethyloxy and the like, lower alkoxy-lower alkoxy, e.g. 2-methoxyethoxy, 3-methoxy-propyloxy, and the like, ω-lower alkoxy-poly-lower alkyleneoxy, e.g. ω-methoxydiethyleneoxy, ω-ethoxy-diethyleneoxy, ω-methoxy-tetraethyleneoxy, ω-methoxy-nonaethyleneoxy, ω-methoxy-dodecaethyleneoxy and the like, or any other suitable etherified hydroxyl group. Aliphatic, particularly lower alkyl, groups carrying such etherified hydroxyl groups are, for example, lower alkenyloxy-lower alkyl, in which the lower alkenyloxy group is separated from the 18-oxygen atom in the molecule by at least two carbon atoms, for example, 2-lower alkenyloxy-ethyl, e.g. 2-vinyloxyethyl, 2-allyloxyethyl and the like, 2-lower alkenyloxypropyl, e.g. 2-vinyloxypropyl and the like, 3-lower alkenyloxypropyl, e.g. 3-vinyloxypropyl, 3-allyloxypropyl and the like, cycloalkyloxy-lower alkyl, in which cycloalkyloxy is separated from the 18-oxygen atom in the molecule by at least two carbon atoms, such as 2-cycloalkyloxy-ethyl, e.g. 2-cyclopentyloxy-ethyl and the like, 2-cycloalkyloxy-propyl, e.g. 2-cyclohexyloxy-propyl and the like, 3-cycloalkyl-propyl, e.g. 3-cyclopentyloxypropyl and the like, cycloalkenyloxy-lower alkyl, in which cycloalkenyloxy is separated from the 18-oxygen atom in the molecule by at least two carbon atoms, such as 2-cycloalkenyloxy-ethyl, e.g. 2-(2-cyclopentenyloxy)-ethyl and the like, 2-cycloalkenyloxypropyl, e.g. 2-(3-cyclohexenyloxy)-propyl and the like, 3-cycloalkenyloxy-propyl, e.g. 3-(3-cyclopentenyloxy)-propyl and the like, cycloalkyl-lower alkoxy-lower alkyl, in which cycloalkyl-lower alkoxy is separated from the 18-oxygen atom in the molecule by at least two carbon atoms, such as 2-(cycloalkyl-lower alkoxy)-ethyl, e.g. 2-cyclopentylmethyloxyethyl and the like, 2-(cycloalkyl-lower alkoxy)-propyl, e.g. 2-(2-cyclohexylethoxy)-propyl and the like, 3-(cycloalkyl-lower alkoxy)-propyl, e.g. 3-cyclohexyl-methoxypropyl and the like, lower alkoxy-lower alkoxy-lower alkyl, in which lower alkoxy-lower alkoxy is separated from the 18-oxygen atom in the molecule by at least two carbon atoms, such as 2-(lower alkoxy-lower alkoxy)-ethyl, e.g. 2-(2-methoxyethoxy)-ethyl, 2-(2-ethoxy-ethoxy)-ethyl, 2-(2-isopropyloxyethoxy)-ethyl and the like, 2-(lower alkoxy-lower alkoxy)-propyl, e.g. 2-(2-methoxyethoxy)-propyl, 2-(2-ethoxyethoxy)-propyl and the like, 3-(lower alkoxy-lower alkoxy)-propyl, e.g. 3-(2-methoxyethoxy)-propyl, 3-(2-ethoxyethoxy)-propyl and the like, ω-lower alkoxy-poly-lower alkyleneoxy)-lower alkyl, in which ω-lower alkoxy-poly-lower alkyleneoxy is separated from the 18-oxygen atom is the molecule by at least two carbon atoms, such as 2-(ω-lower alkoxy-poly-lower alkyleneoxy)-ethyl, e.g. 2-(ω-methoxy-diethyleneoxy)-ethyl, 2-(ω-ethoxy-tetraethyleneoxy)-ethyl, 2-(ω-methoxy-nonaethyleneoxy)-ethyl and the like, 2-(ω-lower alkoxy-poly-lower alkyleneoxy)-propyl, e.g. 2-(ω-methoxy-triethyleneoxy)-propyl, 2-(ω-ethoxy-tetraethyleneoxy)-propyl, 2-(ω-methoxy-nonaethyleneoxy)-propyl and the like, 3-(ω-lower alkoxy-poly-lower alkyleneoxy)-propyl, e.g. 3-(ω-methoxy-diethyleneoxy)-propyl, 3-(ω-ethoxy-tetraethyleneoxy)-propyl, 3-(ω-methoxy-nonaethyleneoxy)-propyl and the like, or any other analogous aliphatic group carrying an etherified hydroxyl group.

Other substituted aliphatic, especially substituted lower alkyl, radicals contain as substituents esterified hydroxyl groups, such as lower alkoxy-carbonyloxy, e.g. methoxy-carbonyloxy, ethoxy-carbonyloxy and the like, lower alkanoyloxy, e.g. acetoxy, propionyloxy and the like, carbocyclic aryl-carbonyloxy, particularly monocyclic carbocyclic aryl-carbonyloxy, e.g. benzoyloxy, and benzoyloxy, in which the carbocyclic aryl portion is substituted by the same or different substituents attached to any of the positions available for substitution, such as, for example, by lower alkyl, e.g. methyl, ethyl, isopropyl and the like, lower alkoxy, e.g. methoxy, ethoxy- n-butyloxy and the like, lower alkenyloxy, e.g. allyloxy and the like, halogeno, e.g. fluoro, chloro, bromo and the like, lower alkoxy-carbonyloxy, e.g. methoxy-carbonyloxy, ethoxy-carbonyloxy and the like, polyhalogeno-lower alkyl, e.g. trifluoromethyl and the like, nitro, amino, such as N,N-di-lower alkyl-amino, e.g. N,N-dimethylamino and the like, or any other suitable substituent, carbocyclic aryl-lower aliphatic hydrocarbon-carbonyloxy, such as monocyclic carbocyclic aryl-lower alkanoyloxy or monocyclic carbocyclic aryl-lower alkenoyloxy, e.g. phenyl-acetoxy, 3-phenyl-propionyloxy, cinnamoyloxy and the like, and these radicals substituted in the carbocyclic nucleus by one or more than one of the same or of different substituents, such as those mentioned hereinbefore, or halogeno (representing a hydroxyl group esterified with a hydro-halic acid), e.g. fluoro and the like. Aliphatic, particularly lower alkyl, radicals substituted by esterified hydroxyl groups, in which the esterified hydroxyl group is separated from the 18-oxygen atom of the molecule by at least two carbon atoms, may be represented, for example, by lower alkoxy-carbonyloxy-lower alkyl, in which the esterified hydroxyl group is separated from the 18-oxygen atom in the molecule by at least two carbon atoms, such as 2-lower alkoxy-carbonyloxy-ethyl, e.g. 2-methoxy-carbonyloxy-ethyl and the like, 2-lower alkoxy-carbonyloxy-propyl, e.g. 2-ethoxy-carbonyloxy-propyl and the like, 3-lower alkoxy-carbonyloxy-propyl, e.g. 3-methoxy-carbonyloxy-propyl and the like, lower alkanoyloxy-lower alkyl, in which the esterified hydroxyl group is separated from the 18-oxygen atom in the molecule by at least two carbon atoms, such as 2-lower alkanoyloxy-ethyl, e.g. 2-acetyloxyethyl, 2-propionyloxyethyl and the like, 2-lower alkanoyloxy-propyl, e.g. 2-acetyloxy-propyl and the like, 3-lower alkanoyloxy-propyl, e.g. 3-acetyloxypropyl and the like, monocyclic carbocyclic aryl-carbonyloxy-lower alkyl, in which the esterified hydroxyl group is separated from the 18-oxygen atom in the molecule by at least two carbon atoms, such as, 2-monocyclic carbocyclic aryl-carbonyloxy-ethyl, e.g. 2-benzoyloxyethyl, 2 - (3,4,5 - trimethoxy-benzoyloxy)-ethyl, 2-(4-ethoxycarbonyl-syringoyloxy)-ethyl and the like, 2-monocyclic carbocyclic aryl-carbonyloxy-propyl, e.g. 2-benzoyloxy-propyl and the like, 3-monocyclic carbocyclic aryl-carbonyloxy-propyl, e.g. 3-benzoyloxypropyl, 3-(3,4,5-trimethoxy-benzoyloxy)-propyl and the like, monocyclic carbocyclic aryl-lower alkanoyloxy-lower alkyl, in which the esterified hydroxyl group is separated from the 18-oxygen atom in the molecule by at least two carbon atoms, such as 2-monocyclic carbocyclic aryl-lower alkanoyloxy-ethyl, e.g. 2-[3-(3,4,5-trimethoxy-phenyl)-propionyloxy]-ethyl and the like, 2-monocyclic carbocyclic aryl-lower alkanoyloxy-propyl, e.g. 2-phenylacetyloxy-propyl and the like, 3-monocyclic carbocyclic aryl-lower alkanoyloxy-propyl, e.g. 3-phenylacetyloxy-propyl and the like, monocyclic carbocyclic aryl-lower alkenoyloxy-lower alkyl, in which the esterified hydroxyl group is separated from the 18-oxygen atom in the molecule by at least two carbon atoms, such as 2-(monocyclic carbocyclic aryl-lower alkenyloxy)-ethyl, e.g. 2-cinnamoyloxyethyl and the like, 2-monocyclic carbocyclic aryl-lower alkenoyloxy-propyl, e.g. 2-cinnamoyloxy-propyl and the like, 3-(monocyclic carbocyclic aryl-lower alkenoyloxy)-propyl, e.g. 3-(3,4,5-trimethoxy-cinnamoyloxy)-propyl and the like, halogeno-lower alkyl, in which halogeno is separated from the 18-oxygen atom in the molecule by at least two carbon atoms such as, for example, 2-trifluoroethyl and the like.

Other aliphatic, particularly lower alkyl, radicals etherifying the 18-hydroxyl group and represented, for example, by $R_3$ in the above formula, may be substituted by acyl, particularly lower alkanoyl, e.g. acetyl, propionyl and the like, or carbo-lower alkoxy, e.g. carbomethoxy, carbethoxy and the like; such aliphatic radicals may be represented, for example, by lower alkanoyl-lower alkyl, e.g. acetonyl, butan-2-onyl, butan-3-onyl and the like, carbo-lower alkoxy-lower alkyl, e.g. carbomethoxymethyl, 2-carbethoxyethyl and the like.

Additional aliphatic, particularly lower alkyl, radicals etherifying the 18-hydroxyl group and represented, for example, by $R_3$ in the above formula, may be substituted by mercapto or etherified mercapto, such as lower alkyl-mercapto, e.g. methylmercapto, ethylmercapto and the like, and represent mercapto-lower alkyl, in which the mercapto group is separated from the 18-oxygen atom in the molecule by at least two carbon atoms, e.g. 2-mercapto-ethyl, 2-mercaptopropyl, 3-mercaptopropyl and the like, or lower alkyl-mercapto-lower alkyl, in which lower alkyl-mercapto is separated from the 18-oxygen atom in the molecule by at least two carbon atoms, such as 2-lower alkylmercapto-ethyl, e.g. 2-methylmercaptoethyl, 2-ethylmercaptoethyl and the like, 2-lower alkyl-mercapto-propyl, e.g. 2-methylmercapto-propyl and the like, 3-lower alkyl-mercapto-propyl, e.g. 3-ethylmercaptopropyl and the like.

Still other aliphatic, particularly lower alkyl, radicals etherifying the 18-hydroxyl group and represented, for example, by the group $R_3$ in the above formula, may be substituted by amino, particularly tertiary amino, such as N,N-di-lower alkylamino, e.g. N,N-dimethylamino, N-ethyl-N-methyl-amino, N,N-diethylamino, N,N-di-n-propylamino, N,N-di-isopropylamino, N,N-dibutylamino and the like, N,N-alkylene-imino, in which alkylene contains from four to seven carbon atoms, e.g. 1-pyrrolidino, 1-piperidino, 1-N,N-hexamethyleneimino and the like, N,N-oxa-alkylene-imino, in which alkylene contains primarily four carbon atoms, e.g. 4-morpholino and the like, N,N-thia-alkylene-imino, in which alkylene has primarily four carbon atoms, e.g. 4-thiamorpholino and the like, N,N-aza-alkylene-imino, in which alkylene contains from four to six ring carbon atoms, particularly 4-lower alkyl-1-piperazino, e.g. 4-methyl-1-piperazino, 4-ethyl-1-piperazino and the like. Aliphatic radicals substituted by a tertiary amino group are primarily tertiary amino-lower alkyl, such as N,N-di-lower alkylamino-lower alkyl, in which lower alkyl carrying the N,N-di-lower alkyl-amino group has from two to three carbon atoms and separates the tertiary amino group from the 18-oxygen atom in the molecule by at least two carbon atoms, for example, 2-N,N-di-lower alkyl-amino-ethyl, e.g. 2-N,N-dimethylaminoethyl, 2-N,N-diethylaminoethyl and the like, 2-N,N-di-lower alkyl-amino-propyl, e.g. 2-N,N-dimethylaminopropyl, 2-N,N-diethylaminopropyl and the like, 3-N,N-di-lower alkyl-amino propyl, e.g. 3-N,N-dimethylaminopropyl, 3-N,N-diethylaminopropyl and the like, 1-N,N-alkylene-imino-lower alkyl, in which lower alkyl has from two to three carbon atoms and separates the N,N-alkylene-imino group from the 18-oxygen atom in the molecule by at least two carbon atoms, and alkylene contains from four to seven carbon atoms, for example, 2-N-N-alkyleneimino-ethyl, e.g. 2-(1-pyrrolidino)-ethyl, 2-(1-piperidino)-ethyl and the like, 2-N,N-alkylene-imino-propyl, e.g. 2-(1pyrrolidino)-propyl, and the like, 3-N,N-alkylene-imino-propyl, e.g. 3-(1-piperidino)-propyl and the like, 4-morpholino-lower alkyl, in which lower alkyl has from two to three carbon atoms and separates the morpholino group from the 18-oxygen atom in the molecule by at least two carbon atoms, such as 2-(4-morpholino)-ethyl, 2-(4-morpholino)-propyl, 3-(4-morpholino)-propyl and the like, 4-lower alkyl-1-piperazino-lower alkyl, in which lower alkyl, carrying the 4-lower alkyl-1-piperazino group, has from two to three carbon atoms and separates the 4-lower alkyl-1-piperazino group from the 18-oxygen atom in the molecule by at least two carbon atoms, for example, 2-(4-lower alkyl-1-piperazino)-ethyl, e.g. 2-(4-methyl-1-piperazino)-ethyl, 2-(4-ethyl-1-piperazino)-ethyl and the like, 2-(4-lower alkyl-1-piperazino)-propyl, e.g. 2-(4-ethyl-1-piperazino)-propyl and the like, 3-(4-lower alkyl-1-piperazino)-propyl, e.g. 3-(4-methyl-1-piperazino)-propyl, 3-(4-ethyl-1-piperazino)-propyl and the like, as well as other analogous aliphatic radicals substituted by tertiary amino groups.

Aliphatic, particularly lower alkyl, radicals may also contain heterocyclic groups as substituents, which are attached to the aliphatic, e.g. lower alkyl, radical through one of their ring carbon atoms. Such groups are, for example, monocyclic heterocyclic aryl groups, especially monocyclic azacyclic aryl groups, such as pyridyl, e.g. 2-pyridyl, 4-pyridyl and the like, thienyl, e.g. 2-thienyl and the like or monocyclic cyclo-heteroaliphatic groups, such as tetrahydrofuranyl, e.g. 2-tetrahydrofuranyl and the like. Aliphatic radicals substituted by a heterocyclic radical may be represented, for example, by pyridyl-lower alkyl, e.g. 2-pyridylmethyl, 2-(4-pyridyl)-ethyl, and the like, thienyl-lower alkyl, e.g. 2-thenyl and the like, tetrahydrofuranyl-lower alkyl, e.g. tetrahydrofurfuryl and the like.

Substituents attached to any of the positions available for substitution in ring A, particularly those represented by the groups $R_4$, $R_5$ and $R_6$ (each of which may also stand for hydrogen) in the previously-given formula, may be, for example, lower aliphatic hydrocarbon, especially lower alkyl, containing preferably from one to four carbon atoms, e.g. methyl, ethyl, n-propyl, isopropyl, n-butyl, isobutyl, secondary butyl, tertiary butyl and the like, or functional groups, such as, for example, etherified hydroxyl, particularly lower alkoxy, containing preferably from one to four carbon atoms, e.g. methoxy, ethoxy, n-propyloxy, isopropyloxy, n-butyloxy, isobutyloxy, secondary butyloxy, tertiary butyloxy and the like, as well as lower alkenyloxy, e.g. allyloxy and the like, cycloalkyloxy, in which cycloalkyl contains from three to eight, preferably from five to six, ring carbon atoms, e.g. cyclopentyloxy, cyclohexyloxy and the like, cycloalkyl-lower alkoxy, in which cycloalkyl contains from three to eight, preferably from five to six, ring carbon atoms, e.g. cyclopentylethoxy, 2 - cyclopentylethoxy, cyclohexyl-methoxy and the like, carbocyclic aryloxy, such as monocyclic carbocyclic aryloxy, e.g. phenyloxy and the like, carbocyclic aryl-lower alkoxy, such as monocyclic carbocyclic aryl-lower alkoxy, for example, phenyl-lower alkoxy, e.g. benzyloxy, diphenylmethoxy, 2-phenylethoxy and the like, esterified hydroxyl, particularly halogeno (representing hydroxyl esterified by a hydrohalic acid), particularly halogeno having an atomic weight of 19 to 80, e.g. fluoro, chloro, bromo and the like, lower alkoxy-carbonyloxy, e.g. methoxycarbonyloxy, ethoxycarbonyloxy and the like, or lower alkanoyloxy, e.g. acetoxy, propionyloxy and the like, etherified mercapto, particularly lower alkylmercapto, containing preferably from one to four carbon atoms, e.g. methylmercapto, ethylmercapto and the like, nitro, amino, particularly N,N-disubstituted amino, such as N,N-di-lower alkyl-amino, e.g. N,N-dimethylamino, N-ethyl-N-methyl-amino, N,N-diethylamino and the like, polyhalogeno-lower alkyl, particularly trifluoromethyl and the like, or any other suitable functional group. A substituent may also be attached to two adjacent positions of ring A and form a ring fused onto the A-ring; for example, two of the radicals $R_4$, $R_5$ and $R_6$ in the formula, when substituting two neighboring positions and taken together, may also form a fused-on cyclic substituent. Such substituents may be represented, for example, by lower alkylenedioxy, e.g. methylenedioxy, 1,1-ethylenedioxy and the like, or any other analogous grouping.

Substituents, which may be attached to other positions in the molecule, particularly to positions in ring C, which are available for substitution, are primarily aliphatic hydrocarbon, such as lower alkyl, containing preferably from one to four carbon atoms, particularly methyl, as well as ethyl, n-propyl, isopropyl and the like. The radical $R_7$ in the previously-given formula which stands primarily for hydrogen, may, therefore, also represent lower alkyl, particularly methyl, as well as ethyl and the like.

Salts of the compounds of this invention are primarily therapeutically and pharmacologically acceptable, non-toxic acid addition salts, particularly those with inorganic acids, such as mineral acids, e.g. hydrochloric, hydrobromic, sulfuric, phosphoric acids and the like, as well as with organic acids, e.g. acetic, maleic, citric, tartaric, methane sulfonic, ethane sulfonic, 1,2-ethane disulfonic, p-toluene sulfonic acid and the like.

Also included within the scope of the present invention are the N-oxides of the above-described compounds, as well as the pharmacologically acceptable acid addition salts of these N-oxides, such as the addition salts with the above-mentioned inorganic, particularly mineral, and organic acids.

In view of the fact that several asymmetric carbon atoms are present in the compounds of this invention, the latter may be obtained in the form of a mixture of racemates, racemates or optically pure compounds.

The compounds of the present invention exhibit pharmacological properties and can be used accordingly. In contrast to the naturally occurring Rauwolfia diester alkaloids, the compounds of this invention react rapidly, the pharmacological action is of definite duration and the recovery from the effects is complete; in other words, the compounds of this invention can be used in cases of emergency, and their actions are easily controllable. Furthermore, the non-toxic acid addition salts of these compounds are to a high degree water-soluble, and are, therefore, extremely useful in the preparation of pharmaceutical compositions, particularly of aqueous solutions for injection and aqueous oral preparations, e.g. elixirs and the like.

The compounds of this invention exhibit sedative and tranquilizing properties, as well as antihypertensive, antifibrillatory and/or local anesthetic effects. The degree of and the ratio between each of these properties may vary considerably. Thus, some of the compounds of this invention show strong sedative and tranquilizing effects with negligible antihypertensive; in others, the predominant sedative and tranquilizing activities are accompanied by beneficial antifibrillatory effects. Again others exhibit pronounced antihypertensive properties, while the sedative and tranquilizing components are much weaker. In addition to such differentiations in the activity pattern, certain compounds of this invention exhibit local anesthetic properties.

Depending on the predominant pharmacological effects, the compounds of the present invention can, therefore, be used as sedative and tranquilizing agents to relieve states of hyperactivity, tension and agitation, as, for example, associated with mental disturbances, anxiety and the like, as antihypertensive compounds to counteract hypertensive conditions, such as, for example, renal hypertension, toxemia and the like, in the treatment of cardiac irregularities, including extrasystoles, auricular fibrillation and the like, and/or as local anesthetics in connection with minor surgery or in the treatment of burns.

Compounds of this invention are particularly suitable in calming laboratory test animals, such as monkeys, cats, dogs and the like, prior to handling; some of the compounds can be used as local anesthetics during animal surgery performed, for example, in connection with the testing of pharmacologically active compounds influencing the functioning of certain organs, such as the adrenal glands, kidneys and the like.

Furthermore, compounds of this invention with sedative and tranquilizing effects can also be used in the veterinary field to quiet animals, particularly chickens, turkeys and the like, as well as other domestic animals to facilitate handling during vaccination, shipment and the like.

A preferred group of compounds is represented by the formula:

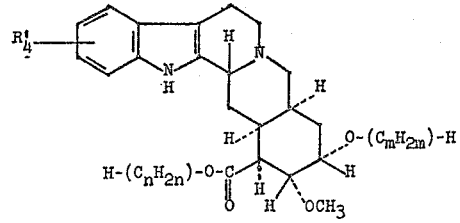

in which each of the letters $m$ and $n$ represents one of the whole numbers from one to seven, particularly from one to three, and $R_4'$ represents lower alkoxy having from one to four carbon atoms, particularly methoxy, as well as ethoxy, n-propyloxy, isopropyloxy, n-butyloxy and the like, whereby $R_4'$ is preferably attached to the 10-position or the 11-position, or the non-toxic, pharmacologically acceptable acid addition salts thereof.

These compounds are represented by the lower alkyl 18-epi-O-lower alkyl-reserpates, in which lower alkyl has from one to seven, especially from one to three carbon atoms, particularly by the methyl 18-epi-O-lower alkyl-reserpates, in which lower alkyl has from one to three carbon atoms, and is represented by methyl, ethyl, n-propyl or isopropyl, or the non-toxic pharmacologically acceptable acid addition salts thereof. Compounds of this type, particularly the above-mentioned methyl 18-epi-O-lower alkyl-reserpates or the non-toxic, pharmacologically acceptable acid addition salts thereof, are characterized by strong sedative and tranquilizing properties, which can be accompanied by anti-fibrillatory and local anesthetic effects, but shown only negligible antihypertensive activities.

Another preferred group of compounds is represented by the formula:

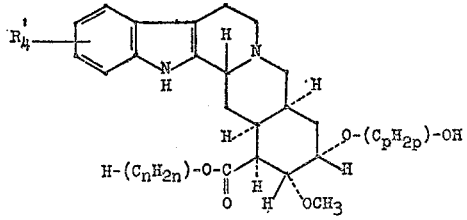

in which the letter $n$ represents one of the whole numbers from one to seven, particularly from one to three, and the letter $p$ stands for one of the whole numbers from two to seven, particularly from two to five, and in which the radical of the formula $-(C_pH_{2p})-$ separates the two oxygen atoms attached to such radical by at least two carbon atoms, and $R_4'$ is lower alkoxy having from one to four carbon atoms, particularly methoxy, as well as ethoxy, n-propyloxy, isopropyloxy, n-butyloxy and the like, whereby $R_4'$ is preferably attached to the 10-position or the 11-position, or the non-toxic, pharmacologically acceptable acid addition salts thereof.

These compounds are primarily represented by the lower alkyl 18-epi-O-(hydroxy-lower alkyl)-reserpates, in which lower alkyl of the ester group has from one to seven, especially from one to three carbon atoms, and lower alkyl of the hydroxy-lower alkyl group has from two to seven, particularly from two to five carbon atoms separating the hydroxyl group from the 18-oxygen atom by at least two carbon atoms, or the non-toxic, pharmacologically acceptable acid addition salts thereof, particularly by the methyl 18-epi-O-(hydroxy-lower alkyl)-reserpates, in which lower alkyl has from two to five carbon atoms separating the hydroxyl group from the 18-oxygen atom by at least two carbon atoms, or the non-toxic pharmacologically acceptable acid addition salts thereof. Compounds of this type, particularly the above-mentioned methyl 18-epi-O-(hydroxy-lower alkyl)-reserpates or the non-toxic, pharmacologically acceptable acid addition salts thereof, show strong sedative and tranquilizing properties, accompanied by negligible antihypertensive effects.

Another group of preferred compounds having outstanding sedative and tranquilizing properties is represented by the formula:

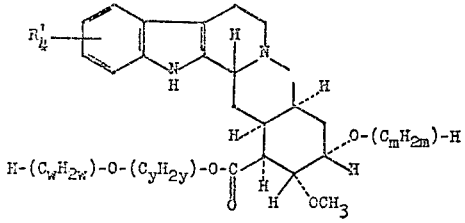

in which the letter $m$ stands for one of the whole numbers from one to seven, particularly from one to three, the letter $w$ stands for one of the whole numbers from one to four, and the letter $y$ stands for one of the whole numbers from two to three, and in which the radical of the formula —$(C_yH_{2y})$— separates the two oxygen atoms attached to such radical by at least two carbon atoms, and $R_4'$ represents lower alkoxy having from one to four carbon atoms, particularly methoxy, as well as ethoxy, n-propyloxy, isopropyloxy, n-butyloxy and the like, whereby $R_4'$ is preferably attached to the 10-position or the 11-position, or the non-toxic, pharmacologically acceptable acid addition salts thereof.

Compounds of the above type are primarily the lower alkoxy-lower alkyl 18-epi-O-lower alkyl-reserpates, in which lower alkyl substituting the 18-oxygen atom has from one to seven, especially from one to three carbon atoms, and lower alkyl of the lower alkoxy-lower alkyl group has from two to three carbon atoms, which separate the lower alkoxy group having from one to four carbon atoms, by at least two carbon atoms from the 16β-carboxyl group, or the non-toxic, pharmacologically acceptable acid addition salts thereof. Compounds of this type, particularly the above-mentioned lower alkoxy-lower alkyl 18-epi-O-lower alkyl-reserpates or the non-toxic, pharmacologically acceptable acid addition salts thereof, are characterized by strong sedative and tranquilizing effects and show only negligible antihypertensive properties.

A further group of preferred compounds is represented by those having the formula:

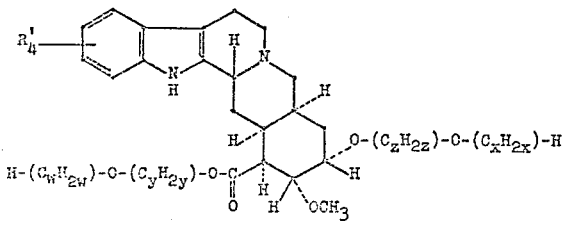

in which each of the letters $w$ and $x$ stands for one of the whole numbers from one to four, and each of the letters $y$ and $z$ stands for one of the whole numbers from two to three, and each of the radicals of the formula $$—(C_yH_{2y})—$$

and —$(C_zH_{2z})$— separates the two oxygen atoms attached to such radicals by at least two carbon atoms, and $R_4'$ is lower alkoxy having from one to four carbon atoms, particularly methoxy, as well as ethoxy, n-propyloxy, isopropyloxy, n-butyloxy and the like, whereby $R_4'$ is preferably attached to the 10-position or the 11-position, or the non-toxic, pharmacologically acceptable acid addition salts thereof.

Compounds of the above type are primarily the lower alkoxy-lower alkyl 18-epi-O-(lower alkoxy-lower alkyl)-reserpates, in which lower alkyl has from two to three carbon atoms, which separate the lower alkoxy group, having from one to four carbon atoms, by at least two carbon atoms from the 16β-carboxyl group and the 18α-oxygen atom, respectively, or the non-toxic, pharmacologically acceptable acid addition salts thereof. Compounds of this type, particularly the above-mentioned lower alkoxy-lower alkyl 18-epi-O-lower alkoxy-lower alkyl-reserpates or pharmacologically acceptable acid addition salts thereof, have antihypertensive properties accompanied by less pronounced or negligible sedative and tranquilizing effects.

The compounds of this invention may be used in the form of pharmaceutical preparations, which contain the new compounds or derivatives thereof, such as non-toxic, pharmacologically acceptable acid addition salts, N-oxides or pharmacologically acceptable acid addition salts of N-oxides thereof, in admixture with a pharmaceutical organic or inorganic, solid or liquid carrier suitable for enteral or parenteral administration. For making up the preparations there can be employed inert substances, which are compatible with the new compounds, such as water, gelatine, lactose, starches, stearic acid, magnesium stearate, stearyl alcohol, talc, vegetable oils, benzyl alcohols, gums, waxes, propylene glycol, polyalkylene glycols or any other known inert carrier used in pharmaceutical preparations. These may be in solid form, for example, as tablets, capsules, dragees and the like, or in liquid form, for example, as solutions, suspensions, emulsions and the like. If necessary, they may contain additional substances, such as preserving, stabilizing, wetting, emulsifying agents and the like, salts for varying the osmotic pressure, buffers or any other auxiliary substances. They may also contain in combination, other therapeutically useful substances.

The 18α-etherified hydroxy-3-epi-allo-yohimbane 16β-carboxylic acid esters, salts, N-oxides or salts of N-oxides thereof may be prepared, for example, by subjecting an 18β-organic sulfonyloxy-3-epio-allo-yohimbane 16β-carboxylic acid ester, a salt, an N-oxide or a salt of an N-oxide thereof, to solvolysis with an alcohol, and, if desired, converting in a resulting compound the esterified carboxyl group in the 16β-position into another esterified carboxyl group, and/or, if desired, converting in a resulting compound an 18α-etherified hydroxyl group, which is capable of being converted into another etherified carboxyl group, such group into another etherified hydroxyl group, and/or, if desired, converting a resulting salt into the free base, and/or, if desired, converting a resulting compound into a salt, an N-oxide or a salt of an N-oxide thereof, and/or, if desired, converting a resulting N-oxide into the free compound, and/or, if desired, converting a resulting mixture of isomers into the single isomers.

The organic portion of the organic sulfonyloxy group is primarily a monocyclic carbocyclic aryl group, which may be represented by phenyl, or, more particularly, by substituted phenyl. The latter is preferably a phenyl radical substituted in the 2-position, 3-position and/or the 4-position by an electron-withdrawing substituent, particularly nitro or halogeno, such as bromo, as well as fluoro, chloro or iodo, or carbo-lower alkoxy, e.g. carbomethoxy, carbethoxy and the like, carbamyl, cyano or any other suitable group. Lower alkyl, especially methyl and the like, also represents a possible substituent. The organic portion may, therefore, be represented by phenyl, or primarily by halogeno-phenyl, e.g. 4-bromo-phenyl and the like, or nitro-phenyl, e.g. 3-nitrophenyl, 4-nitro-phenyl and the like, as well as cyano-phenyl, e.g. 4-cyano-phenyl and the like, or di-substituted or tri-substituted phenyl radicals containing such groups. The organic radical may also stand for other organic radicals, such as an aliphatic radical, for example, lower alkyl, e.g. methyl, ethyl and the like.

Solvolysis with the alcohol may be carried out in the absence, but more preferably in the presence of an alcoholysis reagent, particularly of a base of medium strength. Such reagent is represent by an amine, for example, a tertiary amine, especially an aliphatic tertiary amine, such as an N,N,N-tri-lower alkyl-amine, e.g. N,N,N-trimethyl-amine, N-ethyl-N,N-dimethylamine, N,N-diethyl-N-methylamine, N,N,N-triethylamine and the like, an N,N,N',N'-tetra-lower alkyl-lower alkylene-diamine, e.g. N,N,N',N'-tetramethyl-1,5-pentylene-diamine, N,N,N',N'-tetramethyl-1,6-hexylenediamine, N,N,N',N' - tetramethyl-1,7-heptylene-diamine and the like, a 1-lower alkyl-N,N-alkylene-imine, in which alkylene contains from four to six carbon atoms, e.g., 1-methyl-pyrrolidine, 1-methyl-piperidine, 1-ethyl-piperidine, 1 - methyl-N,N-hexamethylene-imine and the like, 4-lower alkyl-morpholine, e.g. 4-methyl-morpholine, 4-ethyl-morpholine and the like, 1,4-di-lower alkyl-piperazine, e.g. 1,4-dimethyl-piperazine and the like, or any other suitable aliphatic tertiary amine, as well as a heterocyclic base containing a tertiary nitrogen atom, e.g. pyridine, collidine and the like, or any other suitable base.

Solvolysis with an alcohol, for example, a lower alkanol, a lower alkoxy-lower alkanol, in which the lower alkoxy group is separated from the hydroxyl group by at least two carbon atoms, or any other suitable alcohol, is carried out while using the alcohol as the diluent; any other inert solvent such as, for example, p-dioxane and the like, may be added to ensure complete solution. The reaction is preferably completed at an elevated temperature, if necessary, in a closed vessel under an increased pressure, and/or in the atmosphere of an insert gas, e.g. nitrogen.

The above solvolysis reaction proceeds with inversion, i.e. the 18β-organic sulfonyloxy-3-epi-allo-yohimbane 16β-carboxylic acid ester yields upon solvolysis according to the above procedure the 18α-etherified hydroxy-3-epi-allo-yohimbane 16β-carboxylic acid ester.

The 18β-organic sulfonyloxy-3-epi-allo-yohimbane 16β-carboxylic acid esters, salts, N-oxides or salts of N-oxides may be prepared according to known methods, for example, by esterification of an 18β-hydroxy-3-epi-allo-yohimbane 16β-carboxylic acid ester with an organic sulfonyl halide, particularly a monocyclic aryl sulfonyl halide, such as benzene sulfonyl chloride, or a substituted benzene sulfonyl chloride, e.g. 3-nitro-benzene sulfonyl chloride, 4-nitro-benzene sulfonyl chloride, 4-bromo-benzene sulfonyl chloride and the like, in the presence of a base, particularly an organic tertiary base, e.g. pyridine, collidine and the like. In the esterification step, the base, such as, for example, pyridine and the like may also serve as the diluent; other suitable, inert solvents may be added, if necessary. The reaction is carried out under cooling or at room temperature, preferably under the exclusion of moisture.

New and particularly suitable as starting materials are the 18β-(halogeno-phenyl)-sulfonyloxy-3-epi-allo-yohimbane 16β-carboxylic acid esters and the 18β-(nitro-phenyl)-sulfonyloxy-3-epi-allo-yohimbane 16β-carboxylic acid esters, particularly the compounds of the formula:

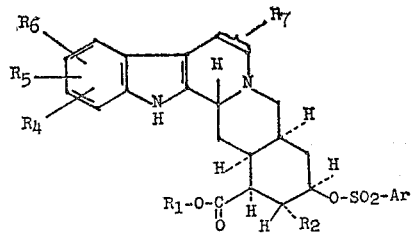

in which $R_1$, $R_2$, $R_4$, $R_5$, $R_6$ and $R_7$ have the previously-given meaning, and Ar represents halogeno-phenyl or nitro-phenyl, salts, N-oxides and salts of N-oxides thereof, which compounds are intended to be included within the scope of this application. These compounds are preferred starting materials used in the above-described conversion into the desired 18α-etherified hydroxy-3-epi-allo-yohimbane 16β-carboxylic acid esters. Apart from being valuable intermediates, the above mentioned 18β-organic sulfonyloxy-3-epi-allo-yohimbane 16β-carboxylic acid esters, salts, N-oxides, or salts of N-oxides thereof show sedative and tranquilizing properties and can be used accordingly.

Important intermediates used in the above solvolysis are those having the formulae:

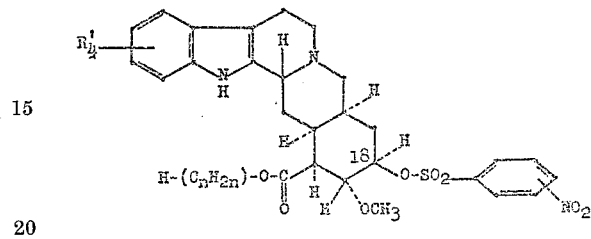

or

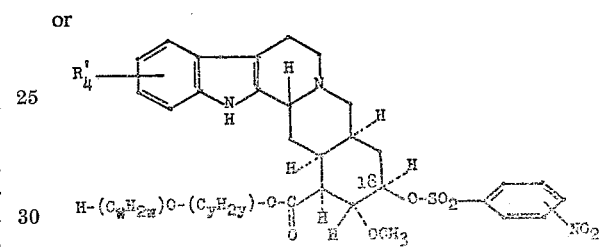

in which the letter $n$ represents one of the whole numbers from one to seven, particularly from one to three, the letter $w$ represents one of the whole numbers from one to four, and the letter $y$ stands for one of the whole numbers from two to three, and in which the radical of the formula $-(C_yH_{2y})-$ separates the two oxygen atoms by at least two carbon atoms, and $R_4'$ represents lower alkoxy, having from one to four carbon atoms, particularly methoxy, as well as ethoxy, n-propyloxy, isopropyloxy, n-butyloxy and the like, whereby $R_4'$ is preferably attached to the 10-position or the 11-position, and in which the nitro group is preferably located in the 3-position or the 4-position of the phenyl portion of the 18β-(nitro-phenyl-sulfonyloxy)-substituent, or acid addition salts of such compounds. Preferred members of this group of compounds are the lower alkyl 18-O-(nitro-phenyl-sulfonyl)-reserpates, especially the methyl 18-O-(nitro-phenyl-sulfonyl)-reserpates, as well as the 2-lower alkoxy-ethyl 18-O-(nitro-phenyl-sulfonyl)-reserpates, particularly the 2 - methoxyethyl 18-O-(3-nitro-phenyl-sulfonyl)-reserpate, or 2-methoxyethyl 18-O-(4 - nitro-phenyl-sulfonyl)-reserpate, or acid addition salts thereof.

Another group of important intermediates is represented by the following formulae:

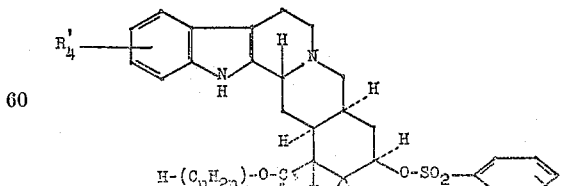

or

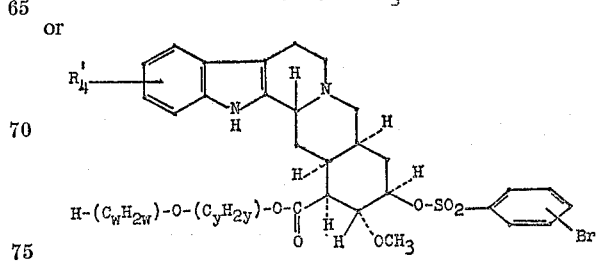

in which the letter $n$ represents one of the whole numbers from one to seven, particularly from one to three, the letter $w$ stands for one of the whole numbers from one to four, and the letter $y$ stands for one of the whole numbers from two to three, and in which the radical of the formula —$(C_yH_{2y})$— separates the two oxygen atoms attached to such radical by at least two carbon atoms, and $R_4'$ represents lower alkoxy, having from one to four carbon atoms, particularly methoxy, as well as ethoxy, n-propyloxy, isopropyloxy, n-butyloxy and the like, whereby $R_4'$ is preferably attached to the 10-position or the 11-position, and in which bromo is preferably located in the 4-position of the phenyl portion of the 18β-(halogeno-phenyl-sulfonyloxy)-group, or acid addition salts of such compounds. Preferred members of this group are the lower alkyl 18-O-(bromo-phenyl-sulfonyl)-reserpates, particularly methyl 18-O-(4-bromo-phenyl-sulfonyl)-reserpate, as well as 2-lower alkoxy-ethyl 18-O-(bromo-phenyl-sulfonyl)-reserpates, particularly 2-methoxyethyl 18-O-(4-bromo-phenyl-sulfonyl)-reserpate, or acid addition salts thereof.

Compounds of this invention can also be formed by etherifying in an 18α-hydroxy-3-epi-allo-yohimbane 16β-carboxylic acid ester, a salt, an N-oxide, or a salt of an N-oxide thereof, the free hydroxyl group attached to the 18α-position by treatment with a diazo-compound in the presence of a strong inorganic Lewis acid, and, if desired, carrying out the optional steps.

A salt of the starting material or of an N-oxide thereof, is an addition salt with an acid, primarily a salt with an inorganic, such as a mineral, acid, e.g. hydrochloric, hydrobromic, sulfuric, phosphoric acid and the like. An acid addition salt may also be a salt with the strong inorganic Lewis acid catalyzing the etherification reaction, e.g. fluoboric acid and the like; such salt may be formed during the reaction.

The starting material is reacted with the diazo compound, particularly a lower diazo-alkane, e.g. diazomethane, diazoethane, n-diazopropane, n-diazobutane, diazoisobutane, n-diazopentane and the like, or any other suitable diazo reagent, in the presence of a strong inorganic Lewis acid. Fluoboric acid, which may be employed in the form of a concentrated aqueous solution (for example, an about 12 N to an about 16 N aqueous solution), represents the preferred reagent. Other Lewis acid reagents may be, for example, perchloric acid (preferably in anhydrous form) and the like. Due to the salt-forming properties of free starting material, the Lewis acid, catalyzing the etherification of the 18α-hydroxyl group, is used in excess of one mol, whenever the free base is present; an about one to an about two hundred, preferably an about ten to an about fifty, percent excess appears to be sufficient to promote the etherification reaction.

The reaction is carried out in the presence of an organic solvent, which is inert towards the starting material, the diazo reagent and the Lewis acid. Appropriate diluents are, for example, halogenated lower aliphatic hydrocarbons, e.g. methylene chloride, chloroform, ethylene chloride, trichloroethane, tetrachloroethane and the like, ethers, e.g. diethylether, tetrahydrofuran and the like, lower alkyl lower alkanoates, e.g. methyl acetate, ethyl acetate and the like, acetonitrile or any other useful solvent, as well as mixtures of solvents, such as those mentioned hereinabove. A solution of the diazo reagent in an inert solvent, such as an ether, e.g. diethyl ether and the like, or a halogenated hydrocarbon, e.g. methylene chloride and the like, or a mixture of solvents, may be added to the mixture of the starting material and the Lewis acid, preferably kept in solution. The diazo compound may also be distilled out of a solution into the solution of the mixture of the starting material and the Lewis acid. Furthermore, the latter mixture may also be given to a solution of the diazo reagent.

The reaction is preferably carried out while cooling the reaction mixture to below room temperature, for example, to from about 10° to about —20°, especially to from about 0° to about —15°. If necessary, the reaction may be carried out in the atmosphere of an inert gas, e.g. nitrogen and the like.

An excess of the diazo reagent present at the end of the reaction may be destroyed, for example, by adding an acid, preferably an easily esterifiable organic carboxylic acid, e.g. acetic, benzoic acid and the like.

The 18-hydroxy-3-epi-allo-yohimbane 16β-carboxylic acid esters, may be prepared, for example, by reacting an 18β-organic sulfonyloxy-3-epi-allo-yohimbane 16β-carboxylic acid ester, in which the organic radical represents primarily monocyclic carbocyclic aryl, such as phenyl, or substituted phenyl, a salt, an N-oxide or a salt of an N-oxide thereof, with water to form the desired 18α-hydroxy-3-epi-allo-yohimbane 16β-carboxylic acid ester, and, if desired, converting a resulting compound into a salt, an N-oxide or a salt of an N-oxide thereof. Hydrolysis according to the above procedure occurs with inversion.

Substituted phenyl groups are those previously mentioned and are primarily represented by nitro-phenyl, e.g. 3-nitro-phenyl, 4-nitro-phenyl and the like, halogeno-phenyl, e.g. 4-bromo-phenyl and the like, as well as by phenyl and the like. The organic radical of an organic sulfonyloxy group may also be an aliphatic radical, for example, lower alkyl, e.g. methyl, ethyl and the like.

Hydrolysis of the organic sulfonyloxy group in the 18β-organic sulfonyloxy-3-epi-allo-yohimbane 16β-carboxylic acid ester, may be carried out by treatment with water, preferably in the presence of an amine, especially a tertiary amine, such as, for example, an N,N,N-tri-lower alkyl-amine, e.g. N,N,N-trimethylamine, N-ethyl-N,N-dimethylamine, N,N,N-triethylamine and the like, or any other suitable amine. Hydrolysis is achieved by heating the mixture to an elevated temperature, preferably in a closed vessel and/or in the atmosphere of an inert gas, e.g. nitrogen.

The above 18β-organic sulfonyloxy-3-epi-allo-yohimbane 16β-carboxyic acid esters used as the intermediates may be prepared as previously shown, for example, by esterification of an 18β-hydroxy-3-epi-allo-yohimbane 16β-carboxylic acid ester.

The compounds of the present invention may also be prepared by removing in a $\Delta^3$-18α-etherified hydroxy-allo-yohimbene 18-carboxylic acid ester or a salt of such compound or a salt thereof the double bond extending from the 3-position by reduction and isolating the desired 18α-etherified hydroxy-3-epi-allo-yohimbane 16β-carboxylic acid ester compound, and, if desired, carrying out the optional steps.

The double bond in the starting material is in the 3(14)-position or in the 3(4)-position; in a free base or in the latter, whenever in solution in a non-polar solvent, the double bond is in the 3(14)-position, whereas in a salt, in the latter in solution or in the free base in solution in a polar solvent, the double bond is in the 3(4)-position.

In the above starting materials the anion of a salt stands primarily for the anion of a strong inorganic acid, particularly a mineral acid, such as a hydrohalic acid, e.g. hydrochloric, hydrobromic acid and the like, or phosphoric acid, a halogenophosphoric acid, e.g. chlorophosphoric acid and the like, or perchloric acid or any other suitable acid; it may also represent the anion of an organic acid. A salt with an organic acid may be present whenever a solution of the starting material in an organic acid, e.g. acetic acid and the like, is used in the above-described removal procedure. The conversion of one form into the other may be carried out according to known methods. Thus, a free compound yields the salt upon reaction with an acid, or by treatment of the salt with an alkaline reagent, particularly ammonia, preferably in an anhydrous medium or any other suitable base, the free compound may be obtained. In the previously-described method, acidic conditions prevail; therefore, whenever the starting material is given to the reaction mixture in the form of the free compound, the salt is formed in situ.

The removal of the double bond may be carried out according to known reduction methods, particularly by treating a solution of the starting material in an acid, such as, for example, acetic acid (preferably in the form of aqueous acetic acid), perchloric acid and the like, with a metal. Together with the acid, the metal funishes the reducing reagent capable of reducing the double bond; zinc, in the presence of an acid, e.g. acetic, perchloric acid and the like, yields a very useful reducing reagent. Zinc in the presence of perchloric acid, which may be used in an aqueous mixture or in admixture with another acid, e.g. acetic acid and the like, represents the preferred reagent; this reagent is particularly suitable, because the rate of reduction is fast and any contact of the starting material, as well as the reduction product with the acidic medium can be kept to a minimum. Organic solvents, such as ether, e.g. tetrahydrofuran, p-dioxan and the like, lower alkanones, e.g. acetone and the like, or any other suitable solvent may be present as additional diluents, if desired, together with water. The reaction may be carried out at room temperature, or, if necessary, under cooling or at an elevated temperature.

The above-mentioned starting materials may be prepared, for example, by reacting an 18α-etherified hydroxy-3-oxo-2,3-seco-allo-yohimbane 16β-carboxylic acid ester with a ring-closing reagent, and, if desired, converting a resulting salt into the free compound, and/or, if desired, converting a free compound into a salt thereof.

Ring closure of the above-described 2,3-seco-allo-yohimbane compounds may be carried out according to known methods, for example, by treatment with an acidic ring closing reagent, for example, a phosphoric acid, e.g. polyphosphoric acid and the like, a phosphorus halide, e.g. phosphorus trichloride, phosphorus pentachloride, or advantageously a phosphorus oxyhalide, e.g. phosphorus oxychloride and the like.

The 2,3-seco-allo-yohimbane compounds used as the intermediates in the preparation of the Δ³-allo-yohimbene starting materials may be prepared according to different procedures.

Thus, the intermediate 3-oxo-2,3-seco-allo-yohimbane compounds may be prepared by esterifying in an 18β-hydroxy-3-oxo-2,3-seco-allo-yohimbane 16β-carboxylic acid ester the free hydroxyl group by treatment with an organic sulfonic acid halide, particularly a monocyclic carbocyclic aryl sulfonyl halide, as well as an aliphatic sulfonic acid halide, and subjecting a resulting 18β-organic sulfonyloxy-3-oxo-2,3-seco-allo-yohimbane 16β-carboxylic acid ester to solvolysis with an alcohol. Esterification with an organic sulfonic acid halide, for example, with a (halogeno-phenyl)-sulfonyl chloride, a (nitro-phenyl)-sulfonyl chloride and the like, is carried out as previously shown, for example, in the presence of an organic base, e.g. pyridine and the like. Alcoholysis of the 18β-organic sulfonyloxy group may be achieved according to the procedure described hereinbefore, preferably in the presence of a base, such as an organic amine, e.g. N,N,N-diethylamine, pyridine and the like. As has been shown hereinbefore, solvolysis of an 18β-organic sulfonyloxy group occurs with inversion at the 18β-carbon atom.

The desired intermediates may also be prepared, for example, by etherifying in an 18α-hydroxy-3-oxo-2,3-seco-allo-yohimbane 16β-carboxylic acid ester compound, the free hydroxyl group. Etherification may be carried out according to the previously mentioned etherification procedure, for example, by treatment with a diazo compound in the presence of fluoboric acid or any other suitable Lewis acid. Etherification may also be achieved according to other known procedures, particularly by treatment with other reagents suitable for the etherification of a secondary hydroxyl group. Such reagents are, for example, reactive esters formed by hydroxylated compounds with strong acids, such as inorganic acids, e.g. hydrochloric, hydrobromic, hydriodic, sulfuric acid and the like, or with organic acids, particularly strong organic sulfonic acids, e.g. p-toluene sulfonic acid and the like, which reagents are preferably used in the presence of reagents facilitating the etherification procedures.

The 18α-hydroxy-3-oxo-2,3-seco-allo-yohimbane 16β-carboxylic acid esters, which compounds are used in the above etherification procedure to form the 18α-etherified hydroxy-3-oxo-2,3-seco-allo-yohimbane 16β-carboxylic acid esters may be obtained for example, by hydrolysis of 18β-organic sulfonyloxy-3-oxo-2,3-seco-allo-yohimbane 16β-carboxylic acid esters with water, preferably in the presence of a base, such as an organic amine. Such hydrolysis procedure is carried out according to methods previously described in detail.

The 18α-etherified hydroxy-3-oxo-2,3-allo-yohimbane 16β-carboxylic acid esters, used as the intermediates for the preparation of the starting materials may also be obtained, for example, by ring closure of an 18α-etherified hydroxy-3-lower alkoxy-3-oxo-2,3;3,4-bis-seco-allo-yohimbane 16β-carboxylic acid ester of a salt thereof. Ring closure may be achieved according to known methods, for example, by treatment of the ester with a suitable ring closing reagent, such as, for example, a carboxylic acid anhydride, e.g. acetic acid anhydride and the like, or any other analogous reagent.

The 2,3;3,4-bis-seco-allo-yohimbane compounds used in the above procedure may be prepared, for example, by reacting a 3β-hydroxy-7-oxo-1α,2β,3α,4,7,8,9α,10α-octahydro-naphthalene 1β-carboxylic acid ester with an organic sulfonic acid halide, preferably a monocyclic carbocyclic aryl-sulfonyl chloride, in the presence of an organic base, and subjecting a resulting 3β-organic sulfonyloxy-7-oxo - 1α,2β,3α,4,7,8,9α,10α - octahydronaphthalene 1β-carboxylic acid ester to solvolysis with an alcohol, preferably in the presence of an organic tertiary base, to form a 3α-etherified hydroxy-7-oxo-1α,2β,3β,4,7,8,9α,10α-octahydronaphthalene 1β-carboxylic acid ester. The latter is then oxidized, for example, with osmium tetroxide in an aqueous solution, followed by treatment with sodium chlorate, to form a 5α,6α-dihydroxy-3α-etherified hydroxy-7-oxo-1α,2β, 3β,4,5β,6β,7,8,9α,10α - decahydro-naphthalene 1β-carboxylic acid ester, which diol is then oxidatively split, for example, by treatment with periodic acid hydrate in an aqueous medium, to form a 5β-aldehydo-3α-etherified hydroxy-6β-carboxymethyl-1α,2β,3β,4,5α,6α-hexahydrobenzene 1β-carboxylic acid ester. The free carboxyl group of the carboxymethyl portion is then esterified, for example, by treatment with a lower diazoalkane, e.g. diazomethane, diazoethane and the like, to form the desired 5β-aldehydo-3α-etherified hydroxy-6β-carbo-lower alkoxy - methyl-1α,2β,3β,4,5α,6α-hexahydrobenzene 1β-carboxylic acid ester, which compound is then reacted with a tryptamine, preferably in solution with an inert solvent, e.g. benzene and the like, to yield the Δ⁴⁽²¹⁾-18α-etherified hydroxy-3-lower alkoxy-3-oxo-2,3;3,4-bis-seco-allo-yohimbene 16β-carboxylic acid ester. Upon treatment with a reducing reagent, for example, with a borohydride, e.g. sodium borohydride and the like, in an inert solvent, such as a lower alkanol, e.g. methanol, ethanol and the like, and, if necessary, in the presence of an activator, e.g. aluminum chloride and the like, the Schiff-base type double bond is reduced, and the desired 18α-etherified hydroxy-3-lower alkoxy-3-oxo-2,3;3,4-bis-seco-allo-yohimbane 16β-carboxylic acid ester is formed, in which the esterified carboxyl groups may be partially or totally hydrolized. Hydrolized carboxyl groups may subsequently be re-esterified, for example, by treatment with a lower aliphatic diazo-hydrocarbon, such as a lower diazoalkane, particularly diazomethane, as well as diazoethane and the like, or any other suitable diazo-reagent.

The 5β-aldehydo-3α-etherified hydroxy-6β-carbo-lower alkoxy - methyl-1α,2β,3β,4,5α,6α-hexahydro-benzene 1β-carboxylic acid ester may also be prepared, for example, by esterifying with an organic sulfonic acid halide and subsequently alcoholizing with an alcohol, the free hydroxyl group in a 3β-hydroxy-7-oxo-1α,2β,3α,4,7,8,9α,10α-octahydro-naphthalene 1β-carboxylic acid ester, which reaction is carried out according to the previously-described methods. A resulting 3α-etherified hydroxy-7-oxo-1α,2β,3β,4,7,8,9α,10α-octahydro-naphthalene 1β-carboxylic acid ester is then subjected to the treatment of ozone in the presence of an inert organic solvent, for example, in glacial acetic acid, ethyl acetate and the like, and at temperatures between about 0° and about −60° to effect ozonation, the excess ozone is removed from the reaction mixture, for example, by bubbling an inert gas, e.g. nitrogen and the like, through the reaction solution, and the resulting ozonide is decomposed by adding water at room temperature to form the desired 5β-aldehydo-3α-etherified hydroxy-6β-carboxymethyl-1α,3β,3β,4,5α,6α-hexahydro-benbene 1β-carboxylic acid ester, in which the free carboxylic group is then esterified as previously shown to yield the desired intermediate, which is condensed with the tryptamine compound.

The conversion of a free hydroxyl into an etherified hydroxyl group, with or without simultaneous inversion, may also be carried out at any other suitable step of the above shown procedures leading to the desired intermediates for the preparation of the starting materials.

The $\Delta^3$-18α-etherified hydroxy-allo-yohimbene 16β-carboxylic acid esters or salts thereof, which compounds are used as starting materials for the preparation of the 18α - etherified hydroxy - 3 - epi-allo-yohimbane 16β-carboxylic acid esters according to the previously described procedure, may also be prepared, for example, by ring closure of an 18β-organic sulfonyloxy-3-oxo-2,3-seco-allo-yohimbane 16β-carboxylic acid ester and subsequent solvolysis of a resulting $\Delta^3$-18β-organic sulfonyloxy-allo-yohimbane 16β-carboxylic acid ester or a salt thereof with an alcohol to yield the desired starting material, i.e. the $\Delta^3$-18α-etherified hydroxy-allo-yohimbene 16β-carboxylic acid ester. Ring closure (preferably with phosphorus oxychloride) and alcoholysis (preferably in the presence of an organic amine) are carried out according to methods described in detail hereinbefore.

The $\Delta^3$-18α-etherified hydroxy-allo-yohimbene 16β-carboxylic acid esters or salts thereof used as the starting materials in the above procedure may also be prepared, for example, by etherifying in a $\Delta^3$-18α-hydroxy-allo-yohimbene 16β-carboxylic acid ester or a salt thereof, the free hydroxyl group, and, if desired, carrying out optional steps. The above etherification may be carried out according to previously-described procedures, for example, by treatment with a diazo compound in the presence of a strong Lewis acid, e.g. fluoboric acid and the like, or any other etherification procedure capable of etherifying a secondary hydroxyl group.

The starting materials, which are used in the above procedure, are new and are intended to be included within the scope of the present invention. They are primarily those of the formula:

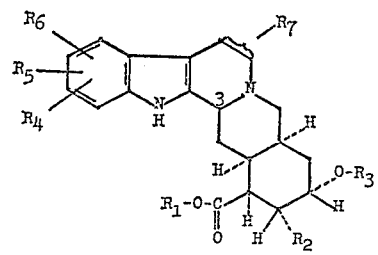

in which $R_1$, $R_2$, $R_3$, $R_4$, $R_5$, $R_6$ and $R_7$ have the previously-given meaning, and in which a double bond extends from the 3-position, or salts thereof.

Preferred groups of important intermediates are those represented by the formulae:

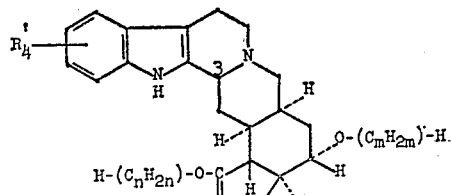

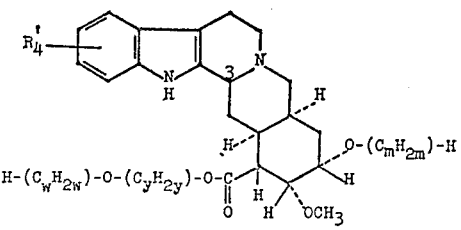

or

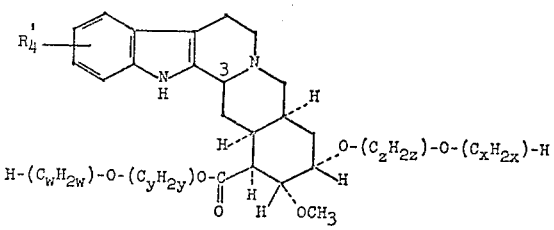

in which the letters $m$, $n$, $w$, $x$, $y$ and $z$ and $R_4'$ have the previously-given meaning, and in which a double bond extends from the 3-position, or salts of such compounds. Salts are especially those, in which the anion is derived from an inorganic, particularly a mineral, acid, such as one of those mentioned hereinabove, e.g. hydrohalic acids, e.g. hydrochloric, hydrobromic acid and the like, phosphoric acid, halogeno-phosphoric acids, e.g., chlorophosphoric acid and the like, or perchloric acid or any other suitable inorganic acid, as well as organic acids, e.g. acetic acid and the like. These compounds are represented, for example, by lower alkyl 18-epi-O-lower alkyl-3-dehydro-reserpates, in which lower alkyl has from one to seven, especially from one to three, carbon atoms, or salts thereof, especially by the methyl 18-epi-O-lower alkyl-3-dehydro-reserpates, in which lower alkyl has from one to three carbon atoms, and by the lower alkoxy-lower alkyl 18-epi-O-lower alkoxy-lower alkyl-3-dehydro-reserpates, in which lower alkyl has from two to three carbon atoms and separates lower alkoxy having from one to four carbon atoms, from the 16β-carboxyl group and the 18α-oxygen atom, respectively, by from two to three carbon atoms, or salts thereof.

In the previously-mentioned methods for the preparation of the starting materials, new and important intermediates are being formed, which are intended to be included within the scope of this invention. Particularly useful are the 18α-etherified hydroxy-3-oxo-2,3-seco-allo-yohimbane 16β-carboxylic acid esters having the formula:

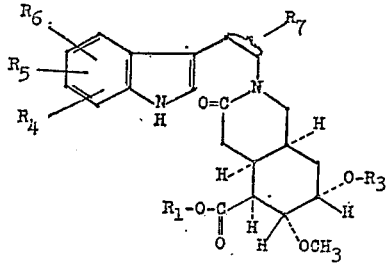

in which $R_1$, $R_2$, $R_3$, $R_4$, $R_5$, $R_6$ and $R_7$ have the previously-given meaning.

Preferred groups of intermediates are represented by the formulae:

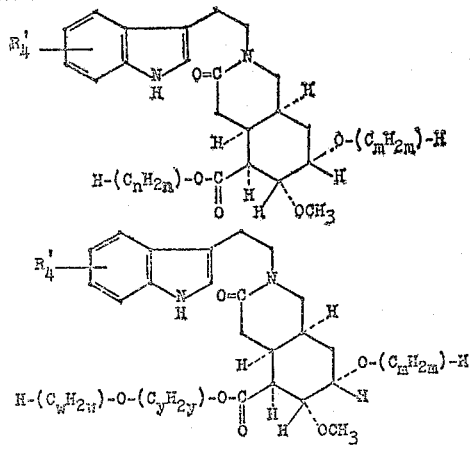

or

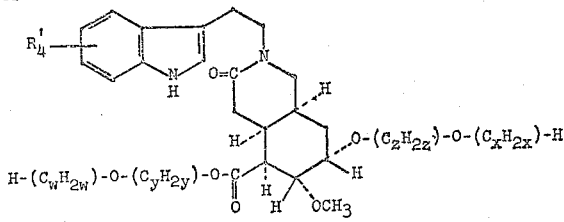

in which the letters m, n, w, x, y and z, and $R_4'$ have the previously-given meaning. These compounds are represented by lower alkyl 18-epi-O-lower alkyl-3-oxo-2,3-seco-reserpates, in which lower alkyl has from one to seven, preferably from one to three carbon atoms, especially by the methyl-3-oxo-2,3-seco-reserpates, in which lower alkyl has from one to three carbon atoms, and by the lower alkoxy-lower alkyl 18-epi-O-lower alkoxy-lower alkyl-3-oxo-2,3-seco-reserpates, in which lower alkyl has from two to three carbon atoms and separates lower alkoxy from the 16β carboxyl group and the 18α-oxygen atom, respectively, by from two to three carbon atoms.

A further method for the preparation of the compounds of this invention comprises isomerizing an 18α-etherified hydroxy-allo-yohimbane 16β-carboxylic acid ester, a salt, an N-oxide or a salt of an N-oxide thereof, by treatment with an acid and isolating the desired 18α-etherified hydroxy-3-epi-allo-yohimbane 16β-carboxylic acid ester, and, if desired, carrying out the optional steps.

Acids used in the above isomerization procedure, which is carried out according to known methods, are, for example, organic carboxylic acids, particularly aliphatic hydrocarbon carboxylic acids, such as lower alkanoic acids, e.g. acetic, propionic acid and the like, primarily glacial acetic acid, organic sulfonic acids, particularly monocyclic carbocyclic aryl sulfonic acids, e.g. p-toluene sulfonic acid and the like, as well as lower alkane sulfonic acids, e.g. methane sulfonic acid and the like, or strong mineral acids, such as hydrohalic acids, e.g. hydrogen chloride and the like, or mixtures of acids. The reaction may be carried out in the absence or presence of an additional solvent; for example, p-toluene sulfonic acid may also be used in the presence of an organic base, e.g. collidine and the like, whereas hydrogen chloride may be used in an anhydrous lower alkanol, e.g. methanol, ethanol and the like. The isomerization reaction is preferably performed at an elevated temperature, if necessary in a closed vessel under pressure, preferably in an atmosphere of an inert gas, e.g. nitrogen.

Optimum yields in the isomerization reaction may be obtained by removing the desired product from the reaction milieu, thus displacing the reaction equilibrium in favor of the product. The removal may be accomplished by separating the product, if desired, in the form of a salt thereof, from the starting material by exploiting the different relative solubilities in different solvent systems. For example, the product or a salt thereof may be separated from the starting material or a salt thereof either by adsorption on a suitable material, such as alumina, paper and the like, and subsequent fractional elution, or by fractional crystallization from a solvent or a mixture of solvents. The starting material separated from the desired product may then be recycled into the isomerization process, to enhance the overall yield of the procedure.

The 18α-etherified hydroxy-allo-yohimbane 16β-carboxylic acid esters used as the starting materials in the above-described isomerization procedure may be prepared, for example, by removing in a Δ³-18α-etherified hydroxy-allo-yohimbene 16β-carboxylic acid ester, or a salt thereof, the double bond extending from the 3-position, and, if desired, converting a resulting compound into a salt, an N-oxide or a salt of an N-oxide thereof.

The above-mentioned removal may be carried out by catalytic hydrogenation, for example, by treatment with hydrogen in the presence of a catalyst containing a metal of the eighth group of the periodic system, e.g. nickel and the like, such as Raney nickel and the like, preferably in the presence of a solvent, such as a lower alkanol, e.g. methanol, ethanol and the like, or any other suitable diluent. The reduction may be carried out at normal or under an increased pressure, if necessary, at an elevated temperature. The removal of the double bond may also be accomplished by treatment with a light metal hydride, particularly a borohydride, such as an alkali metal borohydride, e.g. lithium borohydride, sodium borohydride, potassium borohydride and the like, an alkaline earth metal borohydride, e.g. calcium borohydride, barium borohydride, strontium borohydride, and the like, or an alkali metal lower alkoxy-borohydride, e.g. sodium trimethoxy-borohydride and the like. These reagents are preferably used in the presence of a solvent, such as, for example, a lower alkanol, e.g. methanol, ethanol and the like, a formamide, e.g. formamide, N,N-dimethylformamide and the like, or any other suitable diluent. If necessary, the temperature may be elevated, and the reaction may be carried out under the atmosphere of an inert gas, e.g. nitrogen. The reduction of the double bond extending from the 3-position may also be carried out by treatment with a metal amalgam in the presence of a moist solvent, such as an alkali metal amalgam, e.g. sodium amalgam and the like, or aluminum amalgam in the presence of moist ether or any other suitable moist solvent.

The starting materials used in the isomerization procedure may also be produced, for example, by treatment of an 18β-organic sulfonyloxy-allo-yohimbane 16β-carboxylic acid ester, a salt, an N-oxide or a salt of an N-oxide thereof, with an alcohol in the presence of a base, such as an organic tertiary amine, or etherifying in an 18α-hydroxy-allo-yohimbane 16β-carboxylic acid ester, a salt, an N-oxide or a salt of an N-oxide thereof, the free hydroxyl group attached to the 18α-position, and, if desired, carrying out the optional steps.

The above alcoholysis of the organic sulfonyloxy group in the 18β-position, as well as the etherification of the secondary hydroxyl group attached to the 18α-position are carried out according to previously-described methods, for example, by treatment with an alcohol, particularly a lower alkanol preferably in the presence of a base, e.g. N,N,N-triethylamine, and the like and with a diazo-compound, particularly a lower diazo-alkane in the presence of a strong Lewis acid, e.g. fluoboric acid and the like, respectively.

The starting materials used in the above procedure are new and are intended to be included within the scope of the invention. The 18α-etherified hydroxy-allo-yohimbane 16β-carboxylic acid esters, such as those of the above-given formula, are particularly illustrated by the lower alkyl 18-epi-O-lower alkyl-3-iso-reserpates, in which lower alkyl has from one to seven, especially from one to three carbon atoms, especially by 18-epi-O-ethyl-3-iso-reserpate, methyl 18-epi-O-n-propyl-3-iso-methyl 18-epi-O-lower alkyl-3-iso-reserpates, in which lower alkyl has from one to three carbon atoms, or salts of such compounds.

A modification of the previously-described etherification procedure, yielding 18α-etherified hydroxy-3-epi-alloyohimbane 16β-carboxylc acid esters, in which the radical etherifying the 18α-hydroxyl group and the group esterifying the 16β-carboxyl group are identical, salts, N-oxides or salts of N-oxides thereof, comprises reacting an 18α-hydroxy-3-epi-alloyohimbane 16β-carboxylic acid, a salt, an N-oxide or a salt of an N-oxide thereof, with a diazo-compound in the presence of a strong Lewis acid and isolating the desired compound, and, if desired, carrying out the optional steps.

This reaction may be carried out according to the previously-given method and is catalyzed by the necessary amount of a strong Lewis acid. It may also be carried out in such manner that first the reactive carboxyl group in the 16β-position is esterified. This may be achieved by adding part (one mol or an excess) of the diazo-reagent to the free acid compound, using appropriate solvents, and after the addition of the Lewis acid to catalyze the etherification, giving to the reaction mixture the additional amount (one mol or an excess) of the diazo-reagent.

The compounds of the present invention may also be prepared, for example, by dequaternizing quaternary 18α-etherified hydroxy-3-epi-allo-yohimbane 16-carboxylic acid ester salts, and, if desired, carrying out the optional steps.

The substituent attached to the nitrogen atom representing the 4-position and removed in the dequaternization reaction may be an aliphatic hydrocarbon radical, such as, for example, lower alkyl, e.g. methyl, ethyl, n-propyl, isopropyl, n-butyl and the like, lower alkenyl, such as allylic lower alkenyl, containing preferably from three to five carbon atoms, e.g. allyl, 2-methyl-allyl, 2-butenyl and the like, or any other suitable aliphatic radical. It is more especially a substituted aliphatic hydrocarbon radical, such as, for example, a substituted lower alkyl, particularly methyl, group containing as a substituent, for example, carbocyclic aryl, such as monocyclic or bicyclic carbocyclic aryl, e.g. phenyl, 1-naphthyl, 2-naphthyl and the like, or analogous radicals substituted by additional groups, such as lower alkyl, e.g. methyl, ethyl and the like, lower alkoxy, e.g. methoxy, ethoxy and the like, halogeno, e.g. fluoro, chloro, bromo and the like, nitro, amino, such as N,N-di-lower alkyl-amino, e.g N,N-di-methylamino and the like, or any other suitable substituent, which does not impede the departure of the whole group attached to the 4-position. Other substituents attached to the aliphatic hydrocarbon radical may be functional groups, such as, for example, etherified hydroxyl, particularly lower alkoxy, methoxy, ethoxy, n-propyloxy and the like, carbocyclic aryloxy, particularly monocyclic or bicyclic carbocyclic aryloxy, e.g. phenyloxy, and phenyloxy in which phenyl is substituted by additional substituents, such as those previously mentioned carbocyclic aryl-lower aliphatic hydrocarbonoxy, such as monocyclic or bicyclic carbocyclic aryl-lower alkoxy, e.g. benzyloxy, diphenylmethyloxy and the like, and analogous groups, in which the carbocyclic aryl nucleus contains additional substituents, such as those mentioned hereinbefore. Other functional groups attached to an aliphatic hydrocarbon radical substituting the nitrogen atom of the 4-position are, for example, etherified mercapto, such as, for example, lower alkyl-mercapto, e.g. methylmercapto, ethylmercapto and the like, carbocyclic aryl-mercapto, such as monocyclic or bicyclic carbocyclic-mercapto, e.g. phenyl-mercapto and the like, and phenylmercapto, in which phenyl is substituted by substituents, such as those mentioned before, carbocyclic aryl-lower aliphatic hydrocarbon-mercapto, such as monocyclic or bicyclic carbocyclic aryl-lower alkyl-mercapto, e.g. benzylmercapto, diphenyl-methyl-mercapto and the like, and analogous groups, in which the carbocyclic aryl radical is substituted by the aforementioned substituents, halogeno atoms, e.g. chloro, bromo and the like, carbo-lower alkoxy, e.g. carbomethoxy, carbethoxy and the like, or any other suitable functional group.

Preferred substituted aliphatic hydrocarbon radicals attached to the nitrogen atom of the 4-position are, for example, monocyclic carbocyclic aryl-lower alkyl, particularly monocyclic carbocyclic aryl-methyl, e.g. benzyl, diphenylmethyl, trityl and the like, or 1-monocyclic carbocyclic aryl-ethyl, e.g. 1-phenyl-ethyl and the like, lower alkoxy-lower alkyl, particularly lower alkoxy-methyl, e.g. methoxymethyl, ethoxymethyl, n-propyloxy-methyl, iso-propyloxymethyl and the like, monocyclic carbocyclic aryl-lower alkoxy-lower alkyl, particularly monocyclic carbocyclic aryl-lower alkoxy-methyl, e.g. benzyloxy-methyl and the like, lower alkyl-mercapto-lower alkyl, particularly lower akyl-mercaptomethyl, e.g. methylmercaptomethyl, ethylmercaptomethyl and the like, monocyclic carbocyclic aryl-lower alkyl-mercapto-lower alkyl, especially monocyclic carbocyclic aryl-lower alkyl-mercaptomethyl, e.g. benzylmercaptomethyl and the like, halogeno-lower alkyl, primarily halogeno-methyl, e.g. chloromethyl, bromomethyl and the like, carbo-lower alkoxy-lower alkyl, particularly carbo-lower alkoxy-methyl, e.g. carbomethoxymethyl, carbethoxymethyl and the like.

The anion of the salts used as the starting materials stands primarily for the anion of a strong inorganic, especially mineral, acid, e.g. hydrochloric, hydrobromic, hydriodic, sulfuric, fluoboric acid and the like, or of a strong organic, particularly a strong organic sulfonic, acid, e.g. p-toluene sulfonic acid and the like.

Dequaternization which involves removal of the group attached to the nitrogen atom of the 4-position, may be achieved according to methods, the selection of which depends primarily on the nature of this group. For example, the above-mentioned monocyclic carbocyclic aryl-methyl or 1-monocyclic carbocyclic aryl-ethyl groups, as well as the monocyclic carbocyclic aryl-lower alkoxy-methyl groups, or any other analogous substituent, may be removed by hydrogenolysis, for example, by treatment with hydrogen in the presence of a catalyst containing a metal of the eighth group of the periodic system, e.g. nickel, palladium and the like. Other groups, such as, for example, the above-mentioned etherified hydroxymethyl, such as lower alkoxymethyl, or any other etherified hydroxymethyl group, halogenomethyl, carbo-lower alkoxy-methyl and the like, may be removed by hydrolysis, for example, by treatment with a dilute inorganic acid, such as, for example, hydrochloric, sulfuric acid and the like. Still other groups, particularly the previously-mentioned etherified mercaptomethyl groups, such as lower alkyl-mercaptomethyl, carbocyclic aryl-mercapto-methyl, carbocyclic aryl-lower aliphatic hydrocarbon-mercapto-methyl and the like, may be removed by desulfurization in the presence of a hydrogenation catalyst, particularly a catalyst containing a metal of the eighth group of the periodic system, e.g. Raney nickel, palladium black and the like.

The starting materials used in the above procedure may be obtained according to different methods. For example, an 18α-hydroxy-3-epi-allo-yohimbane 16β-carboxylic acid ester or a salt thereof, may be treated with a reactive ester of an aliphatic hydroxy-hydrocarbon compound or a reactive ester of a substituted aliphatic hydroxy-hydrocarbon compound, and, if necessary, the 18α-hydroxyl group in a resulting quaternary 18α-hydroxy-3-epiallo-yohimbane 16β-carboxylic acid ester salt, which contains an aliphatic hydrocarbon or a substituted aliphatic hydrocarbon substituent attached to the nitrogen atom on the 4-position, may then be etherified to form the desired starting materials.

Reactive esters of aliphatic hydroxy-hydrocarbon and substituted aliphatic hydroxy-hydrocarbon compounds are particularly those with strong inorganic acids, particularly strong mineral acids, e.g. hydrochloric, hydrobromic, hydriodic, sulfuric acid and the like, or with strong organic acids, such as organic sulfonic acids, e.g. p-toluene sulfonic acid and the like. The reaction is carried out in the absence or presence of an inert solvent, under cooling, at room temperature or at an elevated temperature, and, if necessary, under pressure or in the atmosphere of an inert gas, e.g. nitrogen.

Etherification of the free hydroxyl group in the 18α-position may occur simultaneously with the quaternization, i.e. with the introduction of a removable group into the 4-position. Or, a free 18α-hydroxyl group in a resulting quaternary compound may be etherified subsequently according to previously-shown methods, for example, by treatment with a diazo-compound, if necessary, in the presence of a strong Lewis acid, such as fluoboric acid and the like, or any other agent capable of etherifying a secondary hydroxyl group. Quaternization of an 18α-hydroxy-3-epi-alloyohimbane 16β-carboxylic acid ester or a salt thereof may also occur by treatment with a diazo-reagent. The above reaction is carried out in the presence of a Lewis acid, such as, for example, fluoboric acid and the like; under these conditions the free hydroxyl group attached to the 18α-positon may be etherified simultaneously, particularly, if an excess of the diazo-reagent is used.

As mentioned hereinbefore, a 16β-esterified carboxyl group in a resulting compound may be converted into another 16β-esterified carboxyl group. This may be achieved according to known methods, for example, by transesterification.

The transesterification reaction may be carried out, for example, by treating the starting material with an alcohol, primarily with a lower alkanol, e.g. methanol, ethanol, propanol, n-butanol, isobutanol and the like, or a substituted lower alkanol. The reaction may be carried out in the presence of a Lewis base, such as, for example, an alkoxide ion, as, for example, furnished by an alkali metal alcoholate, especially an alkali metal lower alkanolate, e.g. lithium, sodium or potassium methanolate, ethanolate, n-propanolate, n-butanolate, isobutanolate and the like, an alkaline earth metal lower alkanolate, e.g. barium or strontium methanolate, ethanolate, n-propanolate, n-butanolate, isobutanolate and the like, or an aluminum lower alkanolate, e.g. aluminum methanolate, ethanolate, n-propanolate, isopropanolate, n-butanolate, or isobutanolate and the like. The individual alcoholate compounds are employed together with the corresponding alcohol used as the transesterification reagent. Other alcohols, such as substituted lower alkanols, may be used in the presence of the corresponding alkali metal, alkaline earth metal or aluminum alcoholates. Other Lewis base-type catalysts are, for example, an alkali metal cyanide, e.g. potassium cyanide and the like, a strong quaternary ammonium hydroxide, e.g. benzyl-trimethyl-ammonium hydroxide and the like, or any other suitable transesterification catalyst. The transesterification reaction may also be catalyzed by an acidic reagent; an inorganic acid, such as tungstic acid and the like, or an organic acid, such as p-toluene sulfonic acids and the like, may be employed.

Apart from the esterifying alcohol, which may simultaneously serve as a diluent, other inert solvents may be used in the above-mentioned transesterification reaction; carbocyclic aryl hydrocarbons, e.g. benzene, toluene and the like, are examples of such inert solvents. If necessary, the reaction may be carried out at an elevated temperature, under increased pressure and/or in the atmosphere of an inert gas, e.g. nitrogen.

Conversion of a 16β-esterified carboxyl group into another 16β-esterified carboxyl group may also be achieved by hydrolysis of an 18α-etherified hydroxy-3-epi-alloyohimbane 16β-carboxylic acid ester and subsequent re-esterification of the free 16β-carboxyl group in a resulting 18α-etherified hydroxyl - 3 - epi-allo-yohimbane 16β-carboxylic acid.

Hydrolysis of the 16β-esterified carboxyl group may be carried out according to known methods; for example, the esterified carboxyl group may be cleaved by treatment with an alkali metal hydroxide, e.g. sodium hydroxide, potassium hydroxide and the like, in a lower alkanol, e.g. methanol, ethanol and the like, or, preferably, in an aqueous solution of a lower alkanol.

The 16β-carboxyl group in a resulting 18α-etherified hydroxyl-3-epi-allo-yohimbane 16β-carboxylic acid may be esterified according to known methods; for example, the starting material, preferably a solution thereof, may be treated with a lower diazoalkane or with a substituted lower diazo-alkane according to known methods, preferably in an inert suitable solvent.

In view of this esterification procedure, the 18α-etherified hydroxy-3-epi-allo-yohimbane 16β-carboxylic acids are, therefore, also a suitable starting material for the preparation of the 18α-etherified hydroxy-3-epi-allo-yohimbane 16β-carboxylic acid esters of this invention; the latter may be prepared by esterifying in an 18α-etherified hydroxy-3-epi-allo-yohimbane 16β-carboxylic acid, a salt, an N-oxide or a salt of an N-oxide thereof, the 16β-carboxylic acid group by treatment with an aliphatic diazo-compound or a substituted aliphatic diazo-compound, and, if desired, carrying out the optional steps. The reaction is performed according to known methods, for example, those described hereinbefore.

The 18α-etherified hydroxy-3-epi-allo-yohimbane 16β-carboxylic acids formed as the intermediates in the above-described hydrolysis and re-esterification procedure are new and are intended to be included within the scope of the invention. Especially useful as intermediates are the 18-epi-O-lower alkyl-reserpic acids, in which lower alkyl has from one to seven, especially from one to three carbon atoms, e.g. 18-epi-O-methyl-reserpic acid, 18-epi-O-ethyl reserpic acid 18-epic-O-n-propyl-reserpic acid and the like, or the salts, N-oxides or salts of N-oxides thereof.

As also mentioned hereinabove, an 18α-etherified hydroxyl group in a resulting 18α-etherified hydroxyl-3-epi-allo-yohimbane 16β-carboxylic acid ester may be converted into another etherified hydroxyl group. This procedure is particularly feasible for those compounds, in which the etherified hydroxyl group attached to the 18α-position is primarily represented by a lower alkoxy, particularly a methoxy group, which contains as a substituent a functional group capable of being replaced by a hydrogen atom. Such functional groups are, for example, etherified mercapto, such as lower alkyl-mercapto, e.g. methylmercapto, ethylmercapto and the like, carboxyl, halogeno, e.g. chloro, bromo and the like, or any other group, which can be replaced by hydrogen.

The substituent in the above-mentioned substituted lower alkoxy group is replaced by hydrogen according to methods, the selection of which depends primarily on the nature of the different functional groups representing such substituent. For example, an etherified mercapto group may be removed by treating the starting material with a hydrogenation catalyst, containing preferably a metal of the eighth group of the periodic system, e.g. nickel and the like, such as Raney nickel or analogous hydrogenation catalysts. Or, a halogen atom may be replaced by hydrogen, for example, by treating the starting material with catalytically activated hydrogen, for example, hydrogen in the presence of a palladium-containing catalyst, or any other suitable hydrogenation procedure. A carboxyl group may be removed by decarboxylation, preferably at an elevated temperature. Other substituents may be replaced by hydrogen using appropriate methods.

The compounds of the present invention, as well as the starting materials and intermediates used in their formation, may be present in the form of mixtures of racemates, single racemates or antipodes.

Mixtures of racemates of final products or starting materials may be separated into the single racemates on the basis of physico-chemical differences, for example, by fractionated crystallization and the like.

Racemates of intermediates and final products may be resolved into antipodes. Racemates of final products or intermediates, forming acid addition salts, may be resolved, for example, by treating a solution of the free racemic base in a suitable inert solvent with one of the optically active forms of an acid containing an asymmetric carbon atom, or a solution thereof. Especially useful as optically active forms of salt-forming acids having an asymmetric carbon atom as D- and L-tartaric acid, as well as the optically active forms of di-o-toluyl-tartaric, malic, mandelic, camphor-10-sulfonic, quinic acid and the like. A salt may then be isolated, which is formed by the optically active acid with one of the optically active forms of the base. The optically active forms may also be obtained by resolving racemates using biochemical methods. From an optically active salt, the free and optically active compounds may be obtained according to known methods used for the conversion of a salt into a free compound, for example, as outlined hereinbelow. A resulting optically active base may be converted into an acid addition salt with one of the acids mentioned hereinbefore, or into an N-oxide or an acid addition salt of an N-oxide thereof, as shown hereinbelow.

The compounds of this invention or the N-oxides thereof may be obtained in the form of the free bases or as the salts thereof. A salt, including a salt of an N-oxide, may be converted into the free base, for example, by reacting the former with a basic reagent, such as, for example, aqueous ammonia, silver oxide and the like, or an ion exchange resin and the like. A free base or the N-oxide thereof may be converted into the therapeutically useful acid addition salts thereof by treating it with one of the inorganic or organic acids mentioned hereinbefore; the reaction may be carried out, for example, by treating a solution of the free base in a suitable inert solvent with the acid or a solution thereof and isolating the resulting salt. The salts may also be obtained as the hemi-hydrates, monohydrates, sesquihydrates or polyhydrates depending on the conditions used in the formation of the salts.

N-oxides of the compounds of the present invention may be formed according to known methods; for example, a resulting compound, preferably a solution thereof in an inert solvent, may be reacted with an N-oxidizing reagent, such as, for example, hydrogen peroxide, ozone, persulfuric acid, or more especially, an organic peracid, such as an organic percarboxylic acid, e.g. peracetic, perbenzoic, monoperphthalic acid and the like, or a persulfonic acid, e.g. p-toluene persulfonic acid and the like. Inert solvents used in the preparation of the N-oxides are, for example, halogenated lower alkanes, e.g. methylene chloride, chloroform, ethylene chloride and the like, lower alkanols, e.g. methanol, ethanol and the like, or any other suitable solvent. In the N-oxidation reaction an excess of the oxidation reagent and/or an increase in temperature should be avoided in order to prevent oxidative degradation.

Resulting N-oxides or salts thereof may be converted into the free compounds according to methods known per se, for example, by treatment with a reducing reagent, such as hydrogen in the presence of a catalyst, which contains a metal of the eighth group of the periodic system, such as nickel, platinum, palladium and the like, e.g. Raney nickel, platinum oxide and the like, or more appropriately, with nascent hydrogen, as generated, for example, by heavy metals, e.g. iron, zinc, tin and the like, in the presence of acids, e.g. acetic acid and the like, or with any other appropriate reducing reagent or method.

The present application is a continuation-in-part application of our application Serial No. 73,490, filed December 5, 1960, now abandoned, which in turn is a continuation-in-part application of our application Serial No. 46,911, filed August 2, 1960, now abandoned. The present application is also a continuation-in-part application of our application Serial No. 84,519, filed January 24, 1961, now abandoned, which in turn is a continuation-in-part application of our above-mentioned application Serial No. 46,911, filed August 2, 1960.

The following examples illustrate the invention and are not to be construed as being limitations thereof. Temperatures are given in degrees centigrade.

*Example 1*

A mixture of 1.9 g. of methyl 18-O-(4-bromo-phenyl-sulfonyl)-reserpate, 0.36 g. of N,N,N-triethylamine and 240 ml. of methanol is sealed in a thick-walled hydrogenation bottle after squirting with nitrogen. The reaction mixture is heated on the steam-bath for 21 hours; the light yellow solution is evaporated, the residue is extracted into methylene chloride, and the organic solution is washed with a 5 percent aqueous sodium carbonate solution and subsequently with a saturated aqueous sodium chloride solution, and is then dried and evaporated to yield a tan solid, which is meddled with diethyl ether. The latter is dissolved in a 1:2-mixture of benzene and cyclohexane, the solution is passed through charcoal, and filtrate is evaporated to a small volume, whereupon crystallization occurs. The resulting methyl 18-epi-O-methyl-reserpate of the formula:

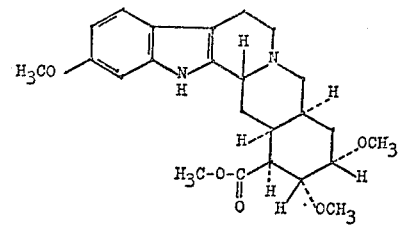

melts at 241–244° (with decomposition); yield: 0.86 g.

The starting material used in the above reaction may be prepared as follows: To a solution of 10.0 g. of methyl reserpate in 70 ml. of pyridine is added 15.8 g. of 4-bromobenzene sulfonyl chloride; the reaction mixture is allowed to stand at room temperature for 2½ days and is then poured into ice-water. The organic material is extracted with chloroform, the organic extract is washed with a 5 percent aqueous sodium hydroxide solution and subsequently with water until a neutral reaction is obtained. The organic solution is evaporated to dryness, and the resulting methyl 18-O-(4-bromo-phenyl-sulfonyl) reserpate is recrystallized from acetone, M.P. 209–212; yield: 5.64 g.

*Example 2*

To a solution of 6.35 g. of methyl 18-epi-O-methyl-reserpate in 100 ml. of acetone is added a solution of 1.4 ml. of concentrated hydrochloric acid in 16 ml. of acetone. A gel-like material precipitates immediately, which on scratching becomes crystalline. The mixture is chilled in an ice-bath for thirty minutes, the solid material is filtered off and washed with cold acetone to yield the desired methyl 18-epi-O-methyl-reserpate hydrochloride, M.P. 239–242° (decomposition).

*Example 3*

A solution of 2.58 g. of methyl 18-epi-reserpate monohydrate in 700 ml. of methylene chloride is cooled to −10° and 90 ml. of an O.1 M stock solution of fluoboric acid is added. (The latter is prepared by concentrating commercial 50 percent fluoboric acid to a concentration of about 14 M and diluting the concentrate with the appropriate quantity of an 11:3-mixture of absolute diethyl ether and methylene chloride.) The turbid solution is cooled to −12° and 135 ml. of an 0.265 M solution of diazomethane in methylene chloride is added over a period of seven minutes and while stirring. The reaction mixture is stirred for an additional 15 minutes, a small amount of glacial acetic acid is added to destroy the excess of diazomethane, and the solution is then washed twice with a 5 percent aqueous sodium carbonate solution and once with a saturated aqueous solution of sodium chloride. The organic layer is separated, dried over anhydrous sodium sulface and evaporated under reduced pressure. The residue contains about 20 to 30 percent of the desired methyl 18-epi-O-methyl-reserpate. The identity of the product with the methyl 18-epi-O-methyl-reserpate prepared according to the procedure of Example 1, is established paperchromatographically: The R$f$-value of methyl 18-epi-O-methyl-reserpate on paper impregnated with a 1:1-mixture of formamide (adjusted to pH 5.6 with benzoic acid) and methanol, using chloroform as the mobile phase, is R$f$=0.45, with chloroform containing 10 percent pyridine as the mobile phase, R$f$=0.80, and with a 1:1-mixture of chloroform and benzene as the mobile phase, R$f$=0.15, as compared with R$f$=0.13, R$f$=0.55 and R$f$=0.04 in the respective systems for methyl 18-epi-reserpate used as the starting material.

The starting material may be prepared as follows: A mixture of 6.34 g. of methyl 18-O-(4-bromo-phenylsulfonyl)-reserpate, 100 ml. of water, 300 ml. of p-dioxane and 1.2 g. of N,N,N-triethylamine is heated on the steam-bath for 41 hours under an atmosphere of nitrogen. The organic solvent is evaporated under reduced pressure, during which operation a precipitate is formed, which is filtered off and dissolved in methylene chloride. The resulting organic solution is extracted with several portions of 5 percent aqueous hydrochloric acid until the acidic extracts no longer give a precipiate on addition of ammonium hydroxide. The combined precipitates, resulting from the treatment of the acidic extracts with aqueous ammonia, are washed with water and dried to yield 2.73 g. of methyl 18-epi-reserpate monohydrate, M.P. 220–222° (decomposition). Upon drying at 140° under reduced pressure, the above hydrate can be converted into the solvent-free methyl 18-epi-reserpate, M.P. 220–222°, [α]$_D^{25}$=−80.5° (in chloroform).

Example 4

To a solution of 1.2 g. of methyl 18-epi-reserpate in 400 ml. of methylene chloride is added 5 ml. of the stock fluoboric acid solution described in Example 3. The solution is kept at a temperature of about −10°, a solution of an excess of n-diazobutane in methylene chloride is added; the reaction mixture is worked up as shown in Example 3, and the resulting methyl 18-epi-O-n-butyl-reserpate is obtained, which melts at 224–226° (decomposition).

Example 5

A mixture of 3.17 g. of methyl 18-O-(4-bromo-phenylsulfonyl)-reserpate, 0.6 g. of N,N,N-triethylamine and 240 ml. of absolute ethanol is heated in a sealed vessel on the steam bath for five days while maintaining a nitrogen atmosphere and stirring. The solvent is then evaporated under reduced pressure, the residue is dissolved in methylene chloride, and the solution is washed twice with a 5 percent aqueous solution of sodium carbonate and once with a saturated aqueous solution of sodium chloride. The organic solution is dried, the solvent is evaporated, the residue is triturated with diethyl ether, and the organic solvent is evaporated to leave 2.01 g. of crude methyl 18-epi-O-ethyl-reserpate of the formula:

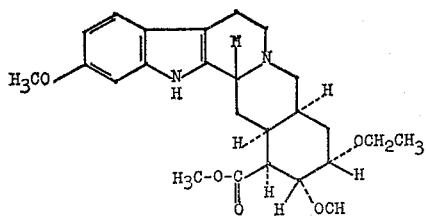

The crude product is recrystallized several times from a mixture of benzene and cyclohexane and melts at 229–230° (decomposition); [α]$_D^{26}$=−27° (chloroform).

Example 6

To a solution of 0.88 g. of methyl 18-epi-O-ethyl-reserpate in 15 ml. of acetone is added a solution of 0.2 ml. of concentrated hydrochloric acid in 2.2 ml. of acetone. A crystalline product is obtained on scratching; the slurry is chilled and the methyl 18-epi-O-ethyl-reserpate hydrochloride is obtained in white plates, which are filtered off and washed with cold acetone, M.P. 233–235° (decomposition).

Example 7

A mixture of 5.56 g. of methyl 18-O-(4-bromo-phenylsulfonyl)-reserpate, 0.90 g. of N,N,N-triethylamine and 250 ml. of n-propanol is refluxed in a nitrogen atmosphere for 95 hours. After evaporating the solvent the reaction mixture is worked up as shown in Example 5 to yield the desired methyl 18-epi-O-n-propyl-reserpate of the formula:

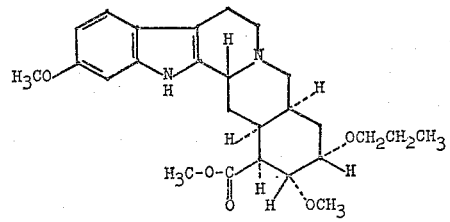

which melts at 223–225° (decomposition) after recrystallization from a mixture of benzene and cyclohexanes; [α]$_D^{29}$=−26° (chloroform).

Example 8

A total of 0.91 g. of methyl 18-epi-O-n-propyl-reserpate is dissolved in 25 ml. of 0.1 N aqeous hydrochloric acid; the solution is frozen and lyophilized to yield the semi-crystalline methyl 18-epi-O-n-propyl-reserpate hydrochloride, which crystallizes as the dihydrate, M.P. 213–223° (decomposition).

Example 9

A mixture of 5.56 g. of methyl 18-O-(4-bromo-phenylsulfonyl)-reserpate, 0.9 g. of N,N,N-triethylamine and 240 ml. of isopropanol is heated for thirteen days in a sealed vessel at 100° while stirring. The reaction mixture is worked up as shown in Example 5 to yield the methyl 18-epi-O-isopropyl-reserpate, which melts at 225–229° (decomposition) after recrystallization from a mixture of benzene and cyclohexane; [α]$_D^{24}$=−23° (chloroform).

The hydrochloride, which is prepared according to the lyophilization procedure of Example 8, crystallizes with 1½ moles of water, M.P. 224–228° (decomposition).

Example 10

A mixture of 5.56 g. of methyl 18-O-(4-bromo-phenylsulfonyl)-reserpate, 0.9 g. of N,N,N-triethylamine and 333 ml. of n-butanol is refluxed under an atmosphere of nitrogen for 15½ hours. The reaction mixture is worked up according to the method described in Example 5 to yield the methyl 18-epi-O-n-butyl-reserpate, which melts at 224–226° (decomposition) after recrystallizations from the mixture of benzene and cyclohexane; [α]$_D^{25}$=−18° (chloroform).

The hydrochloride, M.P. 220–225° (decomposition) is prepared according to the lyophilization procedure described in Example 8 and crystallizes with 1½ moles of water.

Example 11

A mixture of 3.17 g. of methyl 18-O-(4-bromo-phenylsulfonyl)-reserpate, 0.6 ml. of N,N,N-triethylamine and 10 ml. of benzyl alcohol is heated at 100° for four days while maintaining a nitrogen atmosphere. The benzyl alcohol is evaporated under reduced pressure, the residue is taken up in methylene chloride, which solution is washed with an aqueous solution of sodium carbonate and a saturated solution of sodium chloride, dried and then evaporated. The oily residue is crystallized by stirring with diethyl ether. The solid material is separated by filtration, is washed with diethyl ether and recrystallized from 95 percent ethanol to yield methyl 18-epi-O-benzyl-reserpate, which melts at 225–226° (decomposition) after recrystallization from a mixture of benzene and cyclohexane; $[\alpha]_D^{25} = +12°$ (chloroform).

*Example 12*

A mixture of 4.75 g. of methyl 18-O-(4-bromo-phenyl-sulfonyl)-reserpate, 0.9 g. of N,N,N-triethylamine, 50 ml. of ethylene glycol and 50 ml. of p-dioxane (purified by filtration through a column of aluminum oxide, basic, Woelm activity I) is heated at 100° in a nitrogen atmosphere while stirring at 100° for a period of 4½ days. The dioxane is evaporated under reduced pressure, and the remaining solution is taken up in methylene chloride. The organic solution is washed several times with 300 ml. portions of dilute (about 3 percent) aqueous sodium carbonate, with water and with saturated aqueous sodium chloride. On evaporation of the solvents an amorphous residue which crystallizes upon stirring with diethyl ether. The solid material is filtered off, washed with diethyl ether and recrystallized from acetonitrile to yield the methyl 18-epi-O-(2-hydroxyethyl)-reserpate, M.P. 237–239° (decomposition); $[\alpha]_D^{25} = -26°$ (chloroform).

The hydrochloride of methyl 18-epi-O-(2-hydroxyethyl)-reserpate, prepared according to the procedure of Example 6, melts at 220–226° (decomposition) and crystallizes from the acetone solution as the hemihydrate.

*Example 13*

A mixture of 4.75 g. of methyl 18-O-(4-bromo-phenyl-sulfonyl)-reserpate, 0.90 g. of N,N,N-triethylamine and 370 ml. of n-pentanol is refluxed for 24 hours in an atmosphere of nitrogen and then worked up as shown in Example 5. The residue obtained from the methylene chloride solution is triturated with diethyl ether, the solid material is filtered off, and washed with diethyl ether to yield methyl 18-epi-O-n-pentyl-reserpate, M.P. 231–233° (decomposition); $[\alpha]_D^{25} = -15°$ (chloroform).

*Example 14*

0.97 g. of methyl 18-epi-O-n-pentyl-reserpate is dissolved as completely as possible in 100 ml. of 0.1 N aqueous hydrochloric acid, the insoluble material is filtered off, and the solution is freeze-dried to yield methyl 18-epi-O-n-pentyl-reserpate hydrochloride, which melts at 222–224° (decomposition) and crystallizes with 1½ moles of water.

*Example 15*

A mixture of 4.75 g. of methyl 18-O-(4-bromo-phenyl-sulfonyl)-reserpate, 0.9 g. of N,N,N-triethylamine and 310 ml. of isobutanol is refluxed for four days; the reaction is worked up as shown in Example 5 to yield the methyl 18-epi-O-isobutyl-reserpate, which melts at 234–236° (decomposition); $[\alpha]_D^{25} = -18°$ (chloroform).

The hydrochloride is prepared according to the lyophilization procedure described in Example 8 and is obtained as the monohydrate, M.P. 215–224° (decomposition).

*Example 16*

A mixture of 2.0 g. of methyl 18-O-methylsulfonyl-reserpate, 0.5 g. of N,N,N-triethylamine and 120 ml. of methanol is placed in a pressure flask, which is then flushed with nitrogen and sealed. The mixture is heated on the steam bath for twenty days; the solvents are evaporated under reduced pressure and the residue is taken up in methylene chloride. The organic solution is washed twice with a five percent aqueous solution of sodium carbonate and once with a saturated aqueous sodium chloride solution, then filtered through a diatomaceous earth preparation and evaporated under reduced pressure. The residue is taken up in 25 ml. of hot benzene, the solution is filtered, the filtrate is clarified with charcoal and diluted with 74 ml. of cyclohexane and then cooled. 1.19 g. of crystalline methyl 18-epi-O-methyl-reserpate, M.P. 230–233° precipitates and is collected; the product is identical with the compound obtained according to the procedure of Example 1.

$[\alpha]_D^{25} = -37°$ (chloroform)

The starting material may be prepared by adding 2.12 g. of methane sulfonyl chloride and 45 ml. of pyridine to a solution of 6 g. of methyl reserpate in 105 ml. of pyridine while cooling in an ice bath, allowing the mixture to stand at room temperature for three days and diluting it with 750 ml. of a 2.5 percent aqueous sodium hydrogen carbonate solution. The resulting methyl 18-O-methylsulfonyl-reserpate is recrystallized from a mixture of methanol and methylene chloride, M.P. 244–245°; yield: 5.4 g.

*Example 17*

A mixture of 0.1 g. of methyl 18-O-(4-nitro-phenyl-sulfonyl)-reserpate, 0.02 g. of N,N,N-triethylamine and 25 ml. of methanol is heated at 100° in a sealed vessel for 17½ hours; the reaction mixture is worked up as shown in Example 5 to yield the methyl 18-epi-O-methyl-reserpate, M.P. 239–241° (decomposition). The product is identical with the compound described according to the procedure of Example 1.

The starting material is prepared as follows: A mixture of 4.14 g. of methyl reserpate, 5.2 g. of 4-nitro-benzene sulfonyl chloride and 17 ml. of pyridine is allowed to stand at room temperature for three days and is then poured into 200 ml. of ice-water. The aqueous mixture is extracted twice with methylene chloride, the organic extracts are washed with cold aqueous sodium bicarbonate and with saturated aqueous sodium chloride and then evaporated under reduced pressure after drying. The residue is dissolved in methylene chloride, the solution is filtered through a column containing a diatomaceous earth preparation and further elution with methylene chloride yields the crude methyl 18-O-(4nitro-phenyl-sulfonyl)-reserpate. The pure compound melts at 202–204° (decomposition) after recrystallization from acetonitrile.

*Example 18*

A mixture of 0.75 g. of methyl 18-O-(4-bromo-phenyl-sulfonyl)-10-methoxy-deserpidate, 75 ml. of methanol and 0.2 ml. of N,N,N-triethylamine is heated for 13 days in a sealed bottle on the steam bath, while stirring with a magnetic stirrer. The solution is evaporated under reduced pressure, the residue is dissolved in methylene chloride, the organic solution is washed twice with a 5 percent aqueous sodium carbonate and once with a saturated aqueous sodium chloride, then filtered through a diatomaceous earth preparation and evaporated. The residue is taken up in 50 ml. of diethyl ether, the solid material is filtered off, the solvent is evaporated and the diethyl ether soluble material (0.44 g.) is dissolved in benzene and placed on a column containing aluminum oxide (Woelm neutral, activity II to III). The methylene chloride eluate yields 0.15 g. of methyl 10-methoxy-18-epi-O-methyl-deserpidate, which melts at 233–236° after recrystallization from a mixture of benzene and cyclohexane. It crystallizes as the hemihydrate $[\alpha]_D^{25} = -85°$ (chloroform)

The starting material may be prepared as follows: A mixture of 1.5 g. of methyl 10-methoxy-deserpidate, 2.4 g. of 4-bromo-benzene sulfonyl chloride and 15 ml. of pyridine is allowed to stand at room temperature for two days and is then poured into ice-water. The precipitate is filtered off, is washed with water and dissolved in methylene chloride. The organic solution is filtered through a diatomaceous earth preparation and evaporated; the residue yields a powder by treatment with petroleum-ether. The resulting material (1.1 g.) is dissolved in methylene chloride, which solution is washed twice with a five percent aqueous sodium carbonate solution and once with a saturated aqueous sodium chloride solution and then filtered through a diatomaceous earth preparation. The solvent is evaporated; the residue is crystallized from diethyl ether to yield 0.75 g. of methyl 18 - O - (4 - bromo-phenyl-sulfonyl) - 10 - methoxy-deserpidate, M.P. 218–221°; $[\alpha]_D^{28} = -123°$ (chloroform).

Other lower alkyl 18-epi-O-lower alkyl-10-methoxy-deserpidates, such as, for example, methyl 18-epi-O-ethyl-10-methoxy-deserpidate, methyl 18-epi-O-n-propyl-10-methoxy-deserpidate, methyl 10-methoxy-18-epi-O-n-butyl-deserpidate, ethyl 10-methoxy-18-epi-O-methyl-deserpidate, n-propyl 10-methoxy-18-epi-O-methyl-deserpidate, isopropyl 10-methoxy-18-epi-O-methyl-deserpidate and the like, or the salts thereof, are prepared according to the above-described method using the appropriate starting materials.

Other 18α-etherified hydroxy-3-epi-allo-yohimbane 16β-carboxylic acid esters, which may be prepared according to one of the above-described methods by selecting the appropriate starting materials, are, for example, lower alkyl 18-epi-O-lower alkyl-5-methyl-reserpates, e.g. methyl 5-methyl-18-epi-O-methyl-reserpate, methyl 18-epi-O-ethyl-5-methyl-reserpate, ethyl 5-methyl-18-epi-O-methyl-reserpate and the like, lower alkyl 18 - epi - O - lower alkyl-5-methyl-deserpidates, e.g. methyl 5-methyl-18-epi-O-methyl-deserpidate methyl 5-methyl-18-epi-O-n-propyl-deserpidate, ethyl 5-methyl-18-epi-O-methyl - deserpidate and the like, lower alkyl 18-epi-O-lower alkyl-6-methyl-reserpates, e.g. methyl 6-methyl-18-epi-O-methyl - reserpate, methyl 18-epi-O-ethyl-6-methyl-reserpate, methyl 18-epi - O - n - butyl - 6 - methyl-reserpate, ethyl 6 - methyl-18 - epi - O - methyl - reserpate, n - propyl 6 - methyl-18 - epi - O - methyl - reserpate, lower alkyl 18 - epi-O - lower alkyl - 6 - methyl - deserpidates, e.g. methyl 6 - methyl - 18 - epi - O - methyl - deserpidate, methyl 6-methyl-18-epi-O-n-propyl-deserpidate, ethyl 6-methyl-18-epi-O-methyl-reserpate and the like, lower alkyl 18-epi-O-lower alkyl-9-methyl-deserpidates, e.g. methyl 9-methyl-18 - epi - O - methyl-deserpidate, methyl 18-epi-O-ethyl-9-methyl-deserpidate, methyl 18-epi-O-n-butyl-9-methyl-deserpidate, ethyl 9-methyl-18-epi-O-methyl-deserpidate, n-propyl 9-methyl-18-epi-O-methyl-deserpidate and the like, lower alkyl 18-epi-O-lower alkyl-10-methyl-deserpidates, e.g. methyl 10-methyl-18-epi-O-methyl-deserpidate, methyl 18-epi-O-ethyl-10-methyl-deserpidate, ethyl 10-methyl-18-epi-O-methyl-deserpidate and the like, lower alkyl 18-epi-O-lower alkyl-11-methyl-deserpidates, e.g. methyl 11-methyl - 18 - epi - O - methyl-deserpidate, methyl 11-methyl-18-epi-O-n-propyl-deserpidate, ethyl 11-methyl-18-epi-O-methyl-deserpidate, ethyl 18-epi-O-n-butyl-11-methyl-deserpidate, n-propyl 11-methyl-18-epi-O-methyl-deserpidate and the like, lower alkyl 18-epi-O-lower alkyl-9-methoxy-deserpidates, e.g. methyl 9-methoxy-18-epi-O-methyl-deserpidate, methyl 18-epi-O-ethyl-9-methoxy-deserpidate, methyl 9-methoxy-18-epi-O-n-propyl-deserpidate, ethyl 9-methoxy-18-epi-O-methyl-deserpidate and the like, lower alkoxy 18-epi-O-lower alkyl-10-methoxy-reserpates, e.g. methyl 10-methoxy-18-epi-O-methyl-reserpate, methyl 18-epi-O-ethyl-10-methoxy-reserpate, ethyl 10 - methoxy-18-epi - O - methyl - reserpate, ethyl 10-methoxy-18-epi-O-n-propyl-reserpate and the like, lower alkyl 10-ethoxy-18-epi-O-lower alkyl-deserpidates, e.g. methyl 10-ethoxy-18-epi - O - methyl-deserpidate, methyl 10-ethoxy-18-epi-O-n-propyl-deserpidate, n-propyl 10-ethoxy-18-epi-O-methyl-deserpidate and the like, lower alkyl 18-epi-O-lower alkyl-12-methoxy-deserpidates, e.g. methyl 12-methoxy-18-epi-O-methyl-deserpidate, methyl 18-epi-O-n-butyl-12-methoxy-deserpidate, ethyl 12-methoxy-18-epi-O-methyl-deserpidate, n-propyl 12-methoxy-18-epi-O-methyl-deserpidate and the like, lower alkyl 11-ethoxy-18-epi-O-lower alkyl-deserpidates, e.g. methyl 11-ethoxy-18-epi-O-methyl-deserpidate, methyl 11-ethoxy-18-epi-O-ethyl-deserpidate, ethyl 11-ethoxy-18-epi-O-methyl-deserpidate and the like, lower alkyl 18-epi-O-lower alkyl-11-n-propyloxy-deserpidates, e.g. methyl 18-epi-O-methyl-11-n-propyloxy-deserpidate, methyl 18-epi-O-n-propyl-11-n-propyloxy-deserpidate, ethyl 18-epi-O-methyl-11-n-propyloxy-deserpidate, ethyl 18-epi-O-methyl-11-n-propyloxy-deserpidate and the like, lower alkyl 11-isopropyloxy-18-epi-O-lower alkyl-deserpidates, e.g. methyl 11-isopropyloxy-18-epi-O-methyl-deserpidate, methyl 18-epi-O-ethyl-11-iso-propyloxy-deserpidate, ethyl 11-isopropyloxy-18-epi-O-methyl-deserpidate and the like, lower alkyl 11-n-butyloxy-18-epi-O-lower alkyl-deserpidates, e.g. methyl 11-n-butyloxy-18-epi-O-methyl - deserpidate, methyl 11-n-butyloxy-18-epi-O-ethyl-deserpidate, ethyl 11-n-butyloxy-18-epi-O-methyl-deserpidate and the like, lower alkyl 9,10-dimethoxy-18-epi-O-lower alkyl-reserpates, e.g. methyl 9,10-dimethoxy-18 - epi - O - methyl - reserpate, methyl 9,10 - dimethoxy-18 - epi - O - ethyl - reserpate, methyl 9,10-dimethoxy-18 - epi - O - n - propyl - reserpate, ethyl 9,10 - dimethoxy - 18 - epi - O - ethyl - reserpate, n - butyl 9,10-dimethoxy - 18 - epi - O - methyl - reserpate and the like, lower alkyl 18 - epi - O - lower alkyl-10,11-methylenedioxy-deserpidates, e.g. methyl 18-epi-O-methyl-10,11-methylenedioxy-deserpidate, methyl 18-epi-O-ethyl-10,11-methylenedioxy-deserpidate, ethyl 18-epi-O-methyl-10,11-methylenedioxy-deserpidate and the like, lower alkyl 10-benzyloxy-18-epi-O-lower alkyl-deserpidates, e.g. methyl 10-benzyloxy-18-epi-O-methyl-deserpidate, methyl 10-benzyloxy-18-epi-O-ethyl-deserpidate, ethyl 10-benzyloxy-18-epi-O-methyl-deserpidate, n-propyl 10-benzyloxy-18-epi-O-methyl-deserpidate and the like, lower alkyl 11-benzyloxy-18-epi-O-lower alkyl-deserpidates, e.g. methyl 11-benzyloxy-18-epi-O-methyl-deserpidate, methyl 11-benzyloxy-18-epi-O-ethyl-deserpidate, ethyl 11-benzyloxy-18-epi-O-methyl-deserpidate and the like, lower alkyl 18-epi - O - lower alkyl-10-methylmercapto-deserpidates, e.g. methyl 18-epi-O-methyl-10-methylmercapto-deserpidate, methyl 18-epi-O-ethyl-10-methylmercapto - deserpidate, methyl 10-methyl-mercapto-18-epi-O-n-propyl-deserpidate, ethyl 18-epi-O-methyl-10-methylmercapto-deserpidate and the like, lower alkyl 18-epi-O-lower alkyl-11-methylmercapto-deserpidates, e.g. methyl 18-epi-O-methyl-11-methylmercapto-deserpidate, methyl 18-epi-O-ethyl-11-methylmercapto-deserpidate, ethyl 18-epi-O-methyl-11-methylmercapto-deserpidate, n-propyl 18-epi-O-methyl-11-methylmercapto-deserpidate and the like, lower alkyl 11-ethylmercapto-18-epi-O-lower alkyl-deserpidates, e.g. methyl 11-ethylmercapto-18-epi-O-methyl-deserpidate, methyl 11-ethylmercapto-18-epi-O-n-propyl-deserpidate, ethyl 11-ethylmercapto-18-epi-O-methyl-deserpidate, n-propyl 11-ethylmercapto-18-epi-O-methyl-deserpidate and the like, lower alkyl 10-fluoro-18-epi-O-lower alkyl-deserpidates, e.g. methyl 10-fluoro-18-epi-O-methyl-deserpidate, ethyl 10-fluoro-18-epi-O-methyl-deserpidate, ethyl 10-fluoro-18-epi-O-n-propyl-deserpidate and the like, lower alkyl 11-fluoro-18-epi-O-lower alkyl-deserpidates, e.g. methyl 11-fluoro-18-epi-O-methyl-deserpidate, methyl 11-fluoro-18-epi-O-ethyl-deserpidate, ethyl 11-fluoro-18-epi-O-methyl-deserpidate and the like, lower alkyl 10-chloro-18-epi-O-lower alkyl-deserpidates, e.g. methyl 10-chloro-18-epi-O-methyl-deserpidate, methyl 10-chloro 18-epi-O-ethyl-deserpidate, methyl 10-chloro-18-epi-O-n-propyl-deserpidate, ethyl 18-epi-O-n-butyl-10-chloro-deserpidate, isopropyl 10-chloro-18-epi-O-methyl-deserpidate and the like, lower alkyl 9,12-dichloro-18-epi-O-lower alkyl - deserpidates, e.g. methyl 9,12-dichloro-18-epi-O-methyl-deserpidate, methyl 9,12-dichloro-18-epi-O-n-propyl-deserpidate, ethyl 9,12-dichloro-18-epi-O-ethyl-deserpidate and the like, lower alkyl 11,12-dichloro-18-epi-O-lower alkyl-deserpidates, e.g. methyl 11,12-dichloro-18-epi-O-methyl-deserpidate, methyl 11,12-dichloro-18-epi-O-ethyl-deserpidate, ethyl 11,12-dichloro-18-epi-O-n-propyl-deserpidate and the like, lower alkyl 10-chloro-18-epi-O-lower alkyl-reserpates, e.g. methyl 10-chloro-18-epi-O-methyl-reserpate, methyl 10-chloro-18-epi-O-n-propyl-reserpate, ethyl 10-chloro-18-epi-O-methyl-reserpate and the like, lower alkyl 17α - desmethoxy-17α-ethoxy-18-epi-O-lower alkyl-reserpates, e.g. methyl 17α-desmethoxy-17α-ethoxy-18-epi-O-methyl-reserpate, methyl 17α-desmethoxy-17α-ethoxy-18-epi-O-ethyl-reserpate, methyl 17α-desmethoxy-17α-ethoxy-18-epi-O-n-propyl-reserpate, n-propyl 17α-desmethoxy-17α - ethoxy - 18 - epi - O - methyl - reserpate and the like, lower alkyl 17α-desmethoxy-18-epi-O-lower alkyl-17α-n-propyloxy-reserpates, e.g. methyl 17α-desmethoxy-18-epi-O-methyl-17α-n-propyloxy-reserpate, ethyl 17α-desmethoxy-18-epi-O-methyl-17α-n-propyloxy-reserpate and the like, lower alkyl 17α-desmethoxy-17α-isopropyloxy-18-epi-O-lower alkyl-reserpates, e.g. methyl 17α-desmethoxy-17α-isopropyloxy-18-epi-O-methyl-reserpate, methyl 17α - desmethoxy-18-epi-O-ethyl-17α-isopropyloxy-reserpate and the like, lower alkyl 17α-desmethoxy-17α-ethoxy-18-epi-O-lower alkyl-deserpidates, e.g. methyl 17α-desmethoxy-17α-ethoxy-18-epi-O-methyl - deserpidate, methyl 17α - desmethoxy-17α-ethoxy-18-epi-O-ethyl-deserpidate, methyl 17α-desmethoxy-17α-ethoxy-18-epi-O-isobutyl-deserpidate, ethyl 17α - desmethoxy-17α-ethoxy-18-epi-O-methyl-deserpidate, ethyl 17α-desmethoxy-17α-ethoxy-18-epi-O-ethyl-deserpidate, and the like, lower alkyl 17α-cyano-17α-desmethoxy-18-epi-O-lower alkyl - reserpates, e.g. methyl 17α-cyano-17α-desmethoxy-18-epi-O-methyl-reserpate, methyl 17α-cyano-17α-desmethoxy-18-epi-O-ethyl - reserpate, methyl 17α-cyano-17α-desmethoxy-18-epi-O-n-propyl-reserpate, n-propyl 17α-cyano-17α-desmethoxy-18-epi-O-methyl-reserpate and the like, lower alkyl 17α - cyano-17α-desmethoxy-18-epi-O-lower alkyl-deserpidates, e.g. methyl 17α-cyano-17α-desmethoxy-18-epi-O-methyl-deserpidate, methyl 17α-cyano-17α-desmethoxy-18-epi-O-ethyl - deserpidate, ethyl 17α-cyano-17α-desmethoxy-18-epi-O-methyl - deserpidate and the like, N,N - di - lower alkyl - amino - lower alkyl 18 - epi - O - lower alkyl - reserpates, in which the N,N - di - lower alkyl - amino group is separated from the carboxyl group by from two to three carbon atoms, e.g. 2 - N,N - dimethylaminoethyl 18 - epi - O - methyl - reserpate, 2-N,N-dimethy-aminoethyl 18-epi-O-ethyl-reserpate, 2-N,N-diethylaminoethyl 18-epi-O-methyl-reserpate, 3 - N,N - dimethylaminopropyl 18-epi-O-methyl-reserpate and the like, N,N-di-lower alkyl-amino-lower alkyl 18-epi-O-lower alkyl-deserpidates, in which the N,N-di-lower alkyl-amino group is separated from the carboxyl group by from two to three carbon atoms, e.g. 2-N,N-dimethylaminoethyl 18-epi-O-methyl-deserpidate, 2-N,N-dimethylaminoethyl 18-epi-O-ethyl-deserpidate, 2-N,N-dimethylamino-propyl 18-epi-O-methyl-deserpidate and the like, and pharmacologically acceptable acid addition salts thereof.

*Example 19*

A mixture of 3.0 g. of n-propyl 18-O-(4-bromo-phenyl-sulfonyl)-reserpate, 220 ml. of methanol and 0.55 ml. of N,N,N-triethylamine is heated in a sealed pressure bottle on the steam bath for 24 hours while stirring. The solvent is evaporated to dryness and the residue is taken up in methylene chloride; the organic solution is washed twice with a five percent solution of sodium carbonate in water and with a saturated aqueous sodium chloride solution, dried over sodium sulfate and evaporated. The residue is crystallized from diethyl ether, the crystalline material is filtered off, dried and dissolved in methylene chloride. The solution is filtered through charcoal and evaporated to dryness. The residue is crystallized from diethyl ether to yield 1.52 g. of n-propyl 18-epi-O-methyl-reserpate, M.P. 192–196°; $[\alpha]_D^{24} = -25°$ (chloroform).

The starting material may be prepared as follows: A solution of 4.0 g. of n-propyl reserpate and 6.0 g. of 4-bromobenzene sulfonyl chloride in 50 ml. of dry pyridine is cooled in an ice-water bath for fifteen minutes and is then allowed to stand at room temperature in the dark for two days. The reaction mixture is poured into ice-water and the organic material is extracted with methylene chloride; the organic solution is washed twice with a five percent aqueous sodium carbonate solution, with water and a saturated aqueous sodium chloride solution, dried over sodium sulfate and evaporated to a small volume. Toluene is added, the solvents are stripped off, and the residue is dissolved in methylene chloride. This solution is filtered through charcoal, the solvent is evaporated and the residue is recrystallized from benzene to yield 3.9 g. of n-propyl 18-O-(4-bromo-phenyl-sulfonyl)-reserpate, M.P. 198–200°; $[\alpha]_D^{24} = -70°$ (chloroform).

Other compounds prepared according to the above procedure by selecting the proper starting materials are, for example ethyl 18-epi-O-n-propyl-reserpate, ethyl 18-epi-O-isopropyl-reserpate, ethyl 18-epi-O - n - butyl-reserpate, n-propyl 18-epi-O-isopropyl-reserpate, n-propyl 18-epi-O-n-butyl-reserpate, n-propyl 18 - epi - O - secondary butyl-reserpate, isopropyl 18-epi-O-ethyl-reserpate, isopropyl 18-epi-O-n-propyl - reserpate, isopropyl 18-epi-O-n-butyl-reserpate, n-butyl 18-epi-O-methyl-reserpate, n-butyl 18-epi-O-ethyl-reserpate, n-butyl 18-epi-O-n-propyl-reserpate and the like, isobutyl 18-epi-O-methyl-reserpate, isobutyl 18-epi-O-ethyl-reserpate, isobutyl 18-epi-O-n-propyl-reserpate, n-pentyl 18-epi-O-methyl-reserpate, n-pentyl 18-epi-O-ethyl-reserpate, n-pentyl 18-epi-O - n - propyl-reserpate, isopentyl 18-epi - O - methyl-reserpate, n-hexyl 18-epi-O-methyl-reserpate and the like.

*Example 20*

A mixture of 2.8 g. of 2-methoxyethyl 18-O-(4-bromophenyl-sulfonyl)-reserpate, 220 ml. of methanol and 0.55 ml. of N,N,N-triethylamine is heated in a sealed vessel on a steam bath for two days while stirring. The reaction mixture is worked up as shown in Example 19 to yield 1.25 g. of 2-methoxyethyl 18-epi - O - methyl - reserpate, M.P. 151–154°, $[\alpha]_D^{25} = -39°$ (chloroform), which crystallizes as the hydrate, when dried at 110°, and as the hemihydrate when dried at 140°.

A solution of 0.14 g. of 2-methoxyethyl 18-epi-O-methyl-reserpate and 0.35 ml. of 1 N hydrochloric acid in 10 ml. of water is lyophylized and yields 0.09 g. of 2-methoxyethyl 18-epi-O-methyl-reserpate hydrochloride, M.P. 172–175°.

The starting material used in the above preparation is prepared by reacting a mixture of 3.0 g. of 2-methoxyethyl reserpate, 4.2 g. of 4-bromo-benzene sulfonyl chloride and 35 ml. of dry pyridine according to the procedure given in Example 19; the 2-methoxyethyl 18-O-(4-bromo-phenyl-sulfonyl)-reserpate melts at 185–187°;

$$[\alpha]_D^{26} = -76° \text{ (chloroform)}$$

yield: 3.0 g.

Other lower alkoxy-lower alkyl 18-epi-O-lower alkyl-reserpates, which may be prepared according to the above procedure are, for example, 2-methoxyethyl 18 - epi - O - ethyl - reserpate, M.P. 207–207.5°; $[\alpha]_D^{24} = -23°$ (chloroform), the hydrochloride monohydrate of which melts at 170–176°;
2-methoxyethyl 18-epi - O - n-propyl-reserpate, M.P. 168–173°; $[\alpha]_D^{24} = -17°$ (chloroform), the hydrochloride sesquihydrate of which melts at 155–165°;

as well as 2-methoxyethyl 18-epi-O-isopropyl-reserpate, 2-methoxyethyl 18-epi-O-n-butyl-reserpate, 2-ethoxyethyl 18-epi-O-methyl-reserpate, 2-ethoxyethyl 18-epi-O-ethyl-reserpate, 2-isopropyloxy-ethyl 18-epi-O-methyl-reserpate, 3-methoxypropyl 18-epi - O - ethyl-reserpate and the like. Lower alkoxy-lower alkyl 18-epi-O-lower alkyl-deserpidates, such as, for example, 2-methoxyethyl 18-epi-O-methyl-deserpidate, 2-methoxyethyl 18-epi-O-ethyl-deserpidate, 2-ethoxyethyl 18-epi-O-n-propyl-deserpidate and the like, may be preapred according to the above procedure by selecting the appropriate starting materials.

Example 21

A mixture of 3.2 g. of isopropyl 18-O-(4-bromo-phenyl-sulfonyl)-reserpate, 250 ml. of methanol and 0.55 ml. of N,N,N-triethylamine is heated in a sealed pressure bottle on the steam bath for three days while stirring; the reaction mixture is worked up as shown in Example 19 to yield 1.65 g. of isopropyl 18-epi - O - methyl - reserpate, M.P. 206–210° $[\alpha]_D^{26} = -9°$ (chloroform).

The starting material may be prepared by reacting a mixture of 4.0 g. of isopropyl reserpate, 6.0 g. of 4-bromo-benzene sulfonyl chloride and 50 ml. of pyridine as shown in Example 19; the desired isopropyl 18-O-(4-bromo-phenyl-sulfonyl)-reserpate melts at 198–201°, $$[\alpha]_D^{28} = -37° \text{ (chloroform)}$$

yield: 3.4 g.

Example 22

A mixture of 2.0 g. of ethyl 18-O-(4-bromo-phenyl-sulfonyl)-reserpate, 160 ml. of methanol and 0.4 g. of N,N,N-triethylamine is heated in a sealed pressure bottle on the steam bath for 24 hours while stirring. The desired ethyl 18-epi-O-methyl-reserpate, M.P. 195–198° and $[\alpha]_D^{24} = -22°$ (chloroform), is obtained by working up the reaction mixture as shown in Example 19; yield: 0.93 g.

The starting material may be prepared by reacting 2.0 g. of ethyl reserpate, 3.0 g. of 4-bromo-benzene sulfonyl chloride and 20 ml. of dry pyridine as shown in Example 19 and isolating the desired ethyl 18-O-(4-bromo-phenyl-sulfonyl)-reserpate, M.P. 210–212°; yield: 2.0 g.

Example 23

A mixture of 1.3 g. of 2-N,N-dimethylaminoethyl 18-O-(4-bromo-phenyl-sulfonyl)-reserpate, 100 ml. of methanol and 0.4 g. of N,N,N-triethylamine is heated in a sealed pressure bottle on the steam bath for two days while stirring. The resultant 2-N,N-dimethylaminoethyl 18-epi-O-methyl-reserpate, M.P. 202–205°, $[\alpha]_D^{25} = -41°$ (chloroform), is isolated according to the procedure of Example 19; yield: 0.425 g.

The starting material used in the above reaction may be prepared as follows: A mixture of 88 g. of a 33 percent aqueous N,N-dimethyl-ethylenediamine solution and 150 ml. of ether is cooled to 5° and a total of 108.5 g. of ethyl chloroformate is added in portions. A solution of 40 g. of sodium hydroxide in 60 ml. of water is given to the reaction mixture simultaneously with the second half of the ethyl chloroformate; stirring is continued for an additional hour. The ether layer is separated, the aqueous portion is extracted with ether and the ether extracts are combined and dried over anhydrous potassium carbonate. The ether is evaporated, the residue is distilled, B.P. 118–122° at 17–20 mm., to yield the ethyl N-(2-N,N-dimethylaminoethyl)-carbamate.

A solution of 40 g. of ethyl N-(2-N,N-dimethylaminoethyl)-carbamate in 125 ml. of methylene chloride is cooled to 0°, and 19.5 g. of nitrosyl chloride in 300 ml. of methylene chloride is added over a period of approximately one hour while stirring and keeping temperature between 0° and 5°. Stirring is continued for an additional two hours, the precipitate is filtered off and recrystallized from ethyl acetate to yield ethyl N-(2-N,N-dimethylaminoethyl)-N-nitroso-carbamate hydrochloride, M.P. 133–135°.

A suspension of 11.3 g. of ethyl N-(2-N,N-dimethylaminoethyl)-N-nitroso-carbamate hydrochloride in 100 ml. of ether is added to a mixture of 40 g. of a 25 percent methanol solution of potassium hydroxide and 300 ml. of ether while gently refluxing. After fifteen minutes of additional heating the ether layer, containing the 2-N,N-dimethylamino-diazoethane, is decanted and immediately used.

To the above-described ether solution is added portionwise 12.0 g. of reserpic acid in methylene chloride and methanol. The mixture is allowed to stand overnight at room temperature, the solvents are evaporated under reduced pressure, and the residue is added to 400 ml. of water containing 20 ml. of ammonium hydroxide. The water solution is extracted with methylene chloride, the organic solution is filtered through a column containing a diatomaceous earth and evaporated. The 2-N,N-dimethylaminoethyl reserpate is recrystallized from a mixture of ethyl acetate and petroleum ether, M.P. 110–114°.

The desired 2-N,N-dimethylaminoethyl 18-O-(4-bromophenyl-sulfonyl)-reserpate may be prepared by reacting a mixture of 3.0 g. of 2-N,N-dimethylaminoethyl reserpate, 4.5 g. of 4-bromo-benzene sulfonyl chloride and 35 ml. of dry pyridine according to the procedure shown in Example 19; it melts at 140–143°, $[\alpha]_D^{25} = -34°$ (chloroform); yield: 1.4 g.

Other tertiary amino-lower alkyl 18-epi-O-lower alkyl-deserpidates are, for example, 3-N,N-dimethylaminopropyl 18-epi-O-methyl-reserpate, 2-(1-piperidino)-ethyl 18-epi-O-ethyl-reserpate, 2-N,N-dimethylaminoethyl 18-epi-O-ethyl-reserpate, 2-N,N-dimethylaminoethyl 18-epi-O-methyl-deserpidate, 2-N,N-dimethylaminoethyl 10-chloro-18 - epi - O - methyl - deserpidate, 2 - N,N - dimethylaminoethyl 18-epi-O-ethyl-11-n-propyloxy-deserpidate and the like; these compounds may be prepared as shown hereinabove by selecting the appropriate starting materials.

Example 24

A mixture of 2.0 g. of ethyl 18-O-(4-bromo-phenyl-sulfonyl)-reserpate, 160 ml. of absolute ethanol and 0.45 g. of N,N,N-triethylamine is heated in a sealed pressure bottle on the steam bath for two days while stirring. The reaction mixture is worked up as shown in Example 19 to yield 0.73 g. of ethyl 18-epi-O-ethyl-reserpate, M.P. 190–193°; $[\alpha]_D^{25} = -16°$ (chloroform).

Example 25

A mixture of 0.5 g. of methyl 18-epi-O-methyl-3-dehydro-reserpate, 5 ml. of tetrahydrofuran, 5 ml. of acetone, 4.5 ml. of water, 0.6 ml. of aqueous perchloric acid (of 70–72 percent strength) and 0.5 g. of powdered zinc dust is refluxed under an atmosphere of nitrogen for thirty minutes. After filtering off the solid material, the filtrate is evaporated to dryness, the residue is dissolved in a 1:1-mixture of acetone and water, the acetone is stripped off and the aqueous solution is made basic by adding aqueous ammonia. The organic material is extracted with methylene chloride, the residue from the extract is dissolved in 10 ml. of benzene and placed on a column containing 20 g. of aluminum oxide (neutral, activity II to III). The chromatogram is developed as follows:

| Fractions | Solvents | Eluted Amounts |
|---|---|---|
| 1 | 50 ml. of benzene | no residue. |
| 2 | do | 0.035 g. |
| 3 | do | smear. |
| 4 | 50 ml. of methylene chloride | 0.185 g. |
| 5 | do | 0.080 g. |
| 6 | 100 ml. of methylene chloride, containing 1 percent of methanol. | 0.180 g. |
| 7 | 100 ml. of methylene chloride, containing 5 percent of methanol. | 0.010 g. |
| 8 | 100 ml. of methanol | smear. |

Fraction 6 is crystallized from diethyl ether to yield 0.15 g. of methyl 18-epi-O-methyl-reserpate, M.P. 233–236°, $[\alpha]_D^{26} = -38°$ (in chloroform). The compound is identical in every respect with the product obtained according to the procedure of Example 1.

The starting material may be prepared, for example, by esterifying methyl 3-oxo-2,3-seco-reserpate with 4-bromo-benzene sulfonyl chloride in the presence of pyridine, and alcoholyzing the resulting methyl 18-O-(4-bromo - phenyl - sulfonyl) - 3 - oxo - 2,3 - seco - reserpate with methanol, preferably in the presence of a weak base, e.g. N,N,N-triethylamine and the like, as shown hereinbefore. The resulting methyl 18-epi-O-methyl-3-oxo-2,3-seco-reserpate is treated with phosphorus oxychloride. The excess of phosphorus oxychloride is stripped off, a slurry of the residue in water is made basic with aqueous ammonia, the organic material is extracted with methylene chloride, the organic solution is dried over sodium sulfate and evaporated to dryness. 0.74 g. of methyl 18-epi-O-methyl-3-dehydro-reserpate is obtained after recrystallization from methanol, M.P. 226–231°, $[\alpha]_D^{27} = +90°$ (in chloroform), ultraviolet absorption spectrum in ethanol shows the following bands (expressed in m$\mu$); $\lambda_{max}$ at 255–258 ($\epsilon$=9450), 265 ($\epsilon$=9310), 290 ($\epsilon$=9250), 317 ($\epsilon$=14,620), 330 ($\epsilon$=15,060) and 387 ($\epsilon$=6540); $\lambda_{shoulder}$ at 234 ($\epsilon$=16,930); $\lambda_{min}$ at 252 ($\epsilon$=9340), 260–261 ($\epsilon$=9220), 273–276 ($\epsilon$=7610), 293–295 ($\epsilon$=9070), 324 ($\epsilon$=13,790) and 348 ($\epsilon$=3490).

The starting material may also be prepared, for example, by ring closing the methyl 18-O-(4-bromo-phenyl-sulfonyl)-3-oxo-2,3-seco-reserpate with phosphorus oxychloride, and alcoholyzing the resulting methyl 18-O-(4-bromo-phenyl-sulfonyl)-3-dehydro-reserpate with methanol in the presence of N,N,N-triethylamine. The resulting methyl 18-epi-O-methyl-3-dehydro-reserpate may also be obtained, for example, by oxidizing methyl 18-epi-reserpate with potassium dichromate, preferably in an acidic medium, and etherifying the resulting methyl 18-epi-3-dehydro-reserpate by treatment with diazomethane in the presence of fluoboric acid according to the procedure described in Example 3.

The methyl 18-epi-O-methyl-3-oxo-2,3-seco-reserpate used as an intermediate for the preparation of the methyl 18-epi-O-methyl-3-dehydro-reserpate may also be obtained, for example, by esterifying in methyl 3$\beta$-hydroxy-2$\alpha$ - methoxy - 7 - oxo - 1$\alpha$,2$\beta$,3$\alpha$,4,7,8,9$\alpha$,10$\alpha$ - octahydro-naphthalene 1$\beta$-carboxylate the 3$\beta$-hydroxyl group by treatment with 4-bromo-benzene sulfonic acid chloride in the presence of pyridine, and reacting the resulting methyl 3$\beta$-(4-bromo-benzene sulfonyloxy)-2$\alpha$-methoxy - 7 oxo - 1$\alpha$,2$\beta$,3$\alpha$,4,7,8,9$\alpha$,10$\alpha$ - octahydro - naphthalene 1$\beta$-carboxylate with methanol in the presence of N,N,N-triethylamine. The resulting methyl 2$\alpha$,3$\alpha$-dimethoxy-7-oxo-1$\alpha$,2$\beta$,3$\beta$,4,7,8,9$\alpha$,10$\alpha$-octahydro-naphthalene 1$\beta$-carboxylate is then oxidized first with osmium tetroxide to the methyl 5$\alpha$,6$\alpha$-dihydroxy-2$\alpha$,3$\alpha$-dimethoxy-7-oxo-1$\alpha$, 2$\beta$,3$\beta$,4,5$\beta$,6$\beta$,7,8,9$\alpha$,10$\alpha$-decahydro-naphthalene 1$\beta$ - carboxylate and then with periodic acid hydrate to the methyl 5$\beta$ - aldehydro - 6$\beta$ - carboxymethyl - 2$\alpha$,3$\alpha$ - dimethoxy-1$\alpha$,2$\beta$,3$\beta$,4,5$\alpha$,6$\alpha$ - hexahydro - benzene 1$\beta$ - carboxylate, which is then esterified with diazomethane to the methyl 5$\beta$ - aldehydro - 6$\beta$ - carbomethoxy - methyl - 2$\alpha$,3$\alpha$ - dimethoxy-1$\alpha$,2$\beta$,3$\beta$,4,5$\alpha$,6$\alpha$-hexahydro-benzene 1$\beta$-carboxylate. The latter is condensed with 6-methoxy-tryptamine in benzene to form the methyl 3-methoxy-18-epi-O-methyl - 3 - oxo - 2,3;3,4 - bis - seco - 4(21) - dehydro-reserpate, which in turn is treated with sodium borohydride to reduce the Schiff-base type double bond. After re-esterification of any hydrolyzed carboxyl groups with diazomethane, the resulting methyl 3-methoxy-18-epi-O-methyl-3-oxo-2,3;3,4-bis-seco-reserpate is treated with acetic acid anhydride in pyridine to yield the desired methyl 18-epi-O-methyl-3-oxo-2,3-seco-reserpate used as the intermediate in the preparation of the starting material.

Other lower alkyl 18-epi-O-lower alkyl-3-dehydro-reserpates, which may be used in the above procedure for the preparation of the compounds of this invention are, for example, methyl 18-epi-O-ethyl-3-dehydro-reserpate,
methyl 18-epi-O-n-propyl-3-dehydro-reserpate,
methyl 18-epi-O-isopropyl-3-dehydro-reserpate,
methyl 18-epi-O-n-butyl-3-dehydro-reserpate,
ethyl 18-epi-O-methyl-3-dehydro-reserpate,
ethyl 18-epi-O-ethyl-3-dehydro-reserpate,
ethyl 18-epi-O-n-propyl-3-dehydro-reserpate,
n-propyl 18-epi-O-methyl-3-dehydro-reserpate,
n-propyl 18-epi-O-ethyl-3-dehydro-reserpate,
isopropyl 18-epi-O-methyl-3-dehydro-reserpate,
n-butyl 18-epi-O-methyl-3-dehydro-reserpate,
isobutyl 18-epi-O-methyl-3-dehydro-reserpate and the like, or salts of these compounds, such as the perchlorate and the like.

Other highly useful starting materials are the lower alkyl 18-epi-O-lower alkyl-10-methoxy-3-dehydro-deserpidates, e.g. methyl 10-methoxy-18-epi-O-methyl-3-dehydro-deserpidate,
methyl 18-epi-O-ethyl-10-methoxy-3-dehydro-deserpidate,
methyl 10-methoxy-18-epi-O-n-propyl-3-dehydro-deserpidate,
methyl 18-epi-O-n-butyl-10-methoxy-3-dehydro-deserpidate,
ethyl 10-methoxy-18-epi-O-methyl-3-dehydro-deserpidate,
ethyl 10-methoxy-18-epi-O-n-propyl-3-dehydro-deserpidate,
n-propyl 10-methoxy-18-epi-O-methyl-3-dehydro-deserpidate,
isopropyl 10-methoxy-18-epi-O-methyl-3-dehydro-deserpidate and the like, or lower alkyl 18-epi-O-lower alkyl-3-dehydro-deserpidates, e.g. methyl 18-epi-O-methyl-3-dehydro-deserpidate,
methyl 18-epi-O-ethyl-3-dehydro-deserpidate,
methyl 18-epi-O-n-butyl-3-dehydro-deserpidate,
ethyl 18-epi-O-methyl-3-dehydro-deserpidate,
ethyl 18-epi-O-n-propyl-3-dehydro-deserpidate,
n-propyl 18-epi-O-methyl-3-dehydro-deserpidate,
isopropyl 18-epi-O-methyl-3-dehydro-deserpidate,
n-butyl 18-epi-O-methyl-3-dehydro-deserpidate, and the like, or salts thereof, such as the perchlorate and the like, as well as lower alkyl 18-epi-O-lower alkyl-5-methyl-3-dehydro-reserpates, e.g. methyl 5-methyl-18-epi-O-methyl-3-dehydro-reserpate,
methyl 18-epi-O-ethyl-5-methyl-3-dehydro-reserpate,
ethyl 5-methyl-18-epi-O-methyl-3-dehydro-reserpate
and the like, lower alkyl 18-epi-O-lower alkyl-6-methyl-3-dehydro-reserpates, e.g. methyl 6-methyl-18-epi-O-methyl-3-dehydro-reserpate,
methyl 6-methyl-18-epi-O-n-propyl-3-dehydro-reserpate,
ethyl 6-methyl-18-epi-O-methyl-3-dehydro-reserpate
and the like, lower alkyl 18-epi-O-lower alkyl-6-methyl-3-dehydro-deserpidates, e.g. methyl 6-methyl-18-epi-O-methyl-3-dehydro-deserpidate,
methyl 18-epi-O-ethyl-6-methyl-3-dehydro-deserpidate,
ethyl 6-methyl-18-epi-O-methyl-3-dehydro-deserpidate
and the like, lower alkyl 18-epi-O-lower alkyl-9-methyl-3-dehydro-deserpidates, e.g. methyl 9-methyl-18-epi-O-methyl-3-dehydro-deserpidate,
methyl 18-epi-O-isopropyl-9-methyl-3-dehydro-deserpidate,
methyl 9-methyl-18-epi-O-methyl-3-dehydro-deserpidate and the like, lower alkyl 18-epi-O-lower alkyl-10-methyl-3-dehydro-deserpidates, e.g. methyl 10-methyl-18-epi-O-methyl-3-dehydro-deserpidate,
methyl 18-epi-O-ethyl-10-methyl-3-dehydro-deserpidate,
ethyl 10-methyl-18-epi-O-methyl-3-dehydro-deserpidate and the like, lower alkyl 18-epi-O-lower alkyl-11-methyl-3-dehydro-deserpidates, e.g. methyl 11-methyl-18-epi-O-methyl-3-dehydro-deserpidate,
methyl 18-epi-O-ethyl-11-methyl-3-dehydro-deserpidate, ethyl 11-methyl-18-epi-O-methyl-3-dehydro-deserpidate and the like,
lower alkyl 18-epi-O-lower alkyl-9-methoxy-3-dehydro-reserpates, e.g. methyl 9-methoxy-18-epi-O-methyl-3-dehydro-deserpidate,
methyl 18-epi-O-ethyl-9-methoxy-3-dehydro-deserpidate,
ethyl 9-methoxy-18-epi-O-methyl-3-dehydro-deserpidate and the like,
lower alkyl 10-methoxy-18-epi-O-lower alkyl-3-dehydro-reserpates, e.g methyl 10-methoxy-18-epi-O-methyl-3-dehydro-reserpate,
methyl 18-epi-O-ethyl-10-methoxy-reserpate,
methyl 10-methoxy-18-epi-O-n-propyl-3-dehydro-reserpate,
ethyl 18-epi-O-ethyl-10-methoxy-reserpate,
n-propyl 10-methoxy-18-epi-O-methyl-reserpate and the like,
lower alkyl 9,10-dimethoxy-18-epi-O-lower alkyl-3-dehydro-reserpates, e.g. methyl 9,10-dimethoxy-18-epi-O-methyl-3-dehydro-reserpate,
methyl 9,10-dimethoxy-18-epi-O-ethyl-3-dehydro-reserpate,
ethyl 9,10-dimethoxy-18-epi-O-methyl-3-dehydro-reserpate and the like,
lower alkyl 10-ethoxy-18-epi-O-lower alkyl-3-dehydro-deserpidates, e.g. methyl 10-ethoxy-18-epi-O-methyl-3-dehydro-deserpidate,
methyl 10-ethoxy-18-epi-O-n-propyl-3-dehydro-deserpidate and the like,
lower alkyl 11-ethoxy-18-epi-O-lower alkyl-3-dehydro-deserpidates, e.g. methyl 11-ethoxy-18-epi-O-methyl-3-dehydro-deserpidate,
methyl 11-ethoxy-18-epi-O-ethyl-3-dehydro-deserpidate,
n-propyl 11-ethoxy-18-epi-O-methyl-3-dehydro-deserpidate and the like,
lower alkyl 18-epi-O-lower alkyl-11-n-propyloxy-3-dehydro-deserpidates, e.g. methyl 18-epi-O-methyl-11-n-propyloxy-3-dehydro-deserpidate,
methyl 18-epi-O-ethyl-11-n-propyloxy-3-dehydro-deserpidate,
ethyl 18-epi-O-methyl-11-n-propyloxy-3-dehydro-deserpidate and the like,
lower alkyl 11-isopropyloxy-18-epi-O-lower alkyl-3-dehydro-deserpidates, e.g. methyl 11-isopropyloxy-18-epi-O-methyl-3-dehydro-deserpidate,
methyl 11-isopropyloxy-18-epi-O-n-propyl-3-dehydro-deserpidate,
ethyl 11-isopropyloxy-18-epi-O-methyl-3-dehydro-deserpidate and the like,
lower alkyl 11-n-butyloxy-18-epi-O-lower alkyl-3-dehydro-deserpidates, e.g. methyl 11-n-butyloxy-18-epi-O-methyl-3-dehydro-deserpidate,
methyl 11-n-butyloxy-18-epi-O-ethyl-3-dehydro-deserpidate,
n-propyl 11-n-butyloxy-18-epi-O-methyl-3-dehydro-deserpidate and the like,
lower alkyl 18-epi-O-lower alkyl-12-methoxy-3-dehydro-deserpidates, e.g. methyl 12-methoxy-18-epi-O-methyl-3-dehydro-deserpidate,
ethyl 12-methoxy-18-epi-O-n-propyl-3-dehydro-deserpidate and the like,
lower alkyl 10-benzyloxy-18-epi-O-lower alkyl-3-dehydro-deserpidates, e.g. methyl 10-benzyloxy-18-epi-O-methyl-3-dehydro-deserpidate and the like,
lower alkyl 11-benzyloxy-18-epi-O-lower alkyl-3-dehydro-deserpidates, e.g. methyl 11-benzyloxy-18-epi-O-methyl-3-dehydro-deserpidate and the like,
lower alkyl 18-epi-O-lower alkyl-10,11-methylenedioxy-3-dehydro-deserpidates, e.g. methyl 18-epi-O-methyl-10,11-methylenedioxy-3-dehydro-deserpidate,
methyl 10,11-methylenedioxy-18-epi-O-n-propyl-3-dehydro-deserpidate,
ethyl 18-epi-O-methyl-10,11-methylenedioxy-3-dehydro-deserpidate and the like,
lower alkyl 18-epi-O-lower alkyl-11-methylmercapto-3-dehydro-deserpidates, e.g. methyl 18-epi-O-methyl-11-methylmercapto-3-dehydro-deserpidate,
methyl 18-epi-O-ethyl-11-methylmercapto-3-dehydro-deserpidate,
n-propyl 18-epi-O-methyl-11-methylmercapto-3-dehydro-deserpidate and the like,
lower alkyl 11-ethylmercapto-18-epi-O-lower alkyl-3-dehydro-deserpidates, e.g. methyl 11-ethylmercapto-18-epi-O-methyl-3-dehydro-deserpidate,
methyl 18-epi-O-ethyl-11-ethylmercapto-3-dehydro-deserpidate,
ethyl 11-ethylmercapto-18-epi-O-methyl-3-dehydro-deserpidate and the like,
lower alkyl 10-fluoro-18-epi-O-lower alkyl-3-dehydro-deserpidates, e.g. methyl 10-fluoro-18-epi-O-methyl-3-dehydro-deserpidate,
methyl 10-fluoro-18-epi-O-n-propyl-3-dehydro-deserpidate and the like,
lower alkyl 11-fluoro-18-epi-O-lower alkyl-3-dehydro-deserpidates, e.g. methyl-11-fluoro-18-epi-O-methyl-3-dehydro-deserpidate,
methyl 11-fluoro-18-epi-O-n-propyl-3-dehydro-deserpidate,
isopropyl 11-fluoro-18-epi-O-methyl-3-dehydro-deserpidate and the like,
lower alkyl 10-chloro-18-epi-O-lower alkyl-3-dehydro-deserpidates, e.g. methyl 10-chloro-18-epi-O-methyl-3-dehydro-deserpidate,
methyl 10-chloro-18-epi-O-ethyl-3-dehydro-deserpidate,
ethyl 10-chloro-18-epi-O-methyl-3-dehydro-deserpidate and the like,
lower alkyl 9,12-dichloro-18-epi-O-lower alkyl-3-dehydro-deserpidates, e.g. methyl 9,12-dichloro-18-epi-O-methyl-3-dehydro-deserpidate,
methyl 9,12-dichloro-18-epi-O-ethyl-3-dehydro-deserpidate,
n-propyl 9,12-dichloro-18-epi-O-ethyl-3-dehydro-deserpidate and the like,
lower alkyl 11,12-dichloro-18-epi-O-lower alkyl-3-dehydro-deserpidates, e.g. methyl 11,12-dichloro-18-epi-O-methyl-3-dehydro-deserpidate,
ethyl 11,12-dichloro-18-epi-O-n-propyl-3-dehydro-deserpidate and the like,
lower alkyl 10-chloro-18-epi-O-lower alkyl-3-dehydro-reserpates, e.g. methyl 10-chloro-18-epi-O-methyl-3-dehydro-reserpate,
methyl 10-chloro-18-epi-O-n-propyl-3-dehydro-reserpate and the like,
lower alkyl 10-bromo-18-epi-O-lower alkyl-3-dehydro-reserpates, e.g. methyl 10-bromo-18-epi-O-methyl-3-dehydro-reserpate,
methyl 10-bromo-18-epi-O-ethyl-3-dehydro-reserpate,
ethyl 10-bromo-18-epi-O-methyl-3-dehydro-reserpate and the like,
lower alkyl 17α-desmethoxy-17α-ethoxy-18-epi-O-lower alkyl-3-dehydro-reserpates, e.g. methyl 17α-desmethoxy-17α-ethoxy-18-epi-O-methyl-3-dehydro-reserpate,
methyl 17α-desmethoxy-17α-ethoxy-18-epi-O-ethyl-3-dehydro-reserpate,
n-propyl 17α-desmethoxy-17α-ethoxy-18-epi-O-methyl-3-dehydro-reserpate and the like,
lower alkyl 17α-desmethoxy-18-epi-O-lower alkyl-17α-n-propyloxy-3-dehydro-reserpates, e.g. methyl 17α-desmethoxy-18-epi-O-methyl-17α-n-propyloxy-3-dehydro-reserpate,
methyl 17α-desmethoxy-18-epi-O-n-propyl-17α-n-propyloxy-3-dehydro-reserpate,
ethyl 17α-desmethoxy-18-epi-O-methyl-17α-n-propyloxy-3-dehydro-reserpate and the like,
lower alkyl 17α-desmethoxy-17α-ethoxy-18-epi-O-lower alkyl-3-dehydro-deserpidates, e.g. methyl 17α-desmethoxy-17α-ethoxy-18-epi-O-methyl-3-dehydro-deserpidate, methyl 17α-desmethoxy-17α-ethoxy-18-epi-O-n-propyl 3-dehydro-deserpidate,
ethyl 17α-desmethoxy-17α-ethoxy-18-epi-O-methyl-3-dehydro-deserpidate and the like,
lower alkyl 17α-cyano-17α-desmethoxy-18-epi-O-lower alkyl-3-dehydro-reserpates, e.g. methyl 17α-cyano-17α-desmethoxy-18-epi-O-methyl-3-dehydro-reserpate,
methyl 17α-cyano-17α-desmethoxy-18-epi-O-ethyl-3-dehydro-reserpate,
ethyl 17α-cyano-17α-desmethoxy-18-epi-O-methyl-3-dehydro-reserpate and the like,
lower alkyl 17α-cyano-17α-desmethoxy-18-epi-O-lower alkyl-3-dehydro-deserpidates, e.g. methyl 17α-cyano-17α-desmethoxy-18-epi-O-methyl-3-dehydro-deserpidate,
methyl 17α-cyano-17α-desmethoxy-18-epi-O-n-propyl-3-dehydro-deserpidate,
n-propyl 17α-cyano-17α-desmethoxy-18-epi-O-methyl-3-dehydro-deserpidate and the like,
lower alkoxy-lower alkyl 18-epi-O-lower alkyl-3-dehydro-reserpates, in which lower alkoxy is separated from the 16β-carboxyl group by at least two carbon atoms, e.g. 2-methoxyethyl 18-epi-O-methyl-3-dehydro-reserpate,
2-methoxyethyl 18-epi-O-n-propyl-3-dehydro-reserpate,
2-ethoxyethyl 18-epi-O-methyl-3-dehydro-reserpate and the like,
lower alkoxy-lower alkyl 18-epi-O-lower alkoxy-lower alkyl-3-dehydro-reserpate, in which lower alkoxy is separated from the 16β-carboxyl group and the 18-oxygen atom, respectively, by at least two carbon atoms, e.g. 2-methoxyethyl 18-epi-O-(2-methoxyethyl)-3-dehydro-reserpate,
2-methoxyethyl 18-epi-O-(2-ethoxyethyl)-3-dehydro-reserpate,
2-ethoxyethyl -18-epi-O-(2-methoxyethyl)-3-dehydro-reserpate and the like, or salts of these compounds. Upon reduction of the double bond extending from the 3-position, these compounds can be converted into the desired compounds of this invention.

Important intermediates used for the preparation of such starting materials, are, for example,
lower alkyl 18-epi-O-lower alkyl-3-oxo-2,3-seco-reserpates, e.g. methyl 18-epi-O-methyl-3-oxo-2,3-seco-reserpate,
methyl 18-epi-O-ethyl-3-oxo-2,3-seco-reserpate,
methyl 18-epi-O-n-propyl-3-oxo-2,3-seco-reserpate,
methyl 18-epi-O-isopropyl-3-oxo-2,3-seco-reserpate,
methyl 18-epi-O-n-butyl-3-oxo-2,3-seco-reserpate,
methyl 18-epi-O-isobutyl-3-oxo-2,3-seco-reserpate,
ethyl 18-epi-O-methyl-3-oxo-2,3-seco-reserpate,
ethyl 18-epi-O-ethyl-3-oxo-2,3-seco-reserpate,
ethyl 18-epi-O-n-propyl-3-oxo-2,3-seco-reserpate,
ethyl 18-epi-O-n-butyl-3-oxo-2,3-seco-reserpate,
n-propyl 18-epi-O-methyl-3-oxo-2,3-seco-reserpate,
n-propyl 18-epi-O-ethyl-3-oxo-2,3-seco-reserpate,
isopropyl 18-epi-O-methyl-3-oxo-2,3-seco-reserpate,
isopropyl 18-epi-O-n-propyl-3-oxo-2,3-seco-reserpate,
n-butyl 18-epi-O-methyl-3-oxo-2,3-seco-reserpate,
n-butyl 18-epi-O-ethyl-3-oxo-2,3-seco-reserpate,
isobutyl 18-epi-O-methyl-3-oxo-2,3-seco-reserpate,
n-pentyl 18-epi-O-methyl-3-oxo-2,3-seco-reserpate,
n-hexyl 18-epi-O-methyl-3-oxo-2,3-seco-reserpate and the like.

Other highly useful intermediates are the
lower alkyl 18-epi-O-lower alkyl-10-methoxy-3-oxo-2,3-seco-deserpidates, e.g. methyl 10-methoxy-18-epi-O-methyl-3-oxo-2,3-seco-deserpidate,
methyl 18-epi-O-ethyl-10-methoxy-3-oxo-2,3-seco-deserpidate,
methyl 10-methoxy-18-epi-O-n-propyl-3-oxo-2,3-seco-deserpidate,
ethyl 10-methoxy-18-epi-O-methyl-3-oxo-2,3-seco-deserpidate,
n-propyl 10-methoxy-18-epi-O-methyl-3-oxo-2,3-seco-deserpidate,
isopropyl 10-methoxy-18-epi-O-methyl-3-oxo-2,3-seco-deserpidate and the like, or the
lower alkyl 18-epi-O-lower alkyl-3-oxo-2,3-seco-deserpidates, e.g. methyl 18-epi-O-methyl-3-oxo-2,3-seco-deserpidate,
methyl 18-epi-O-ethyl-3-oxo-2,3-seco-deserpidate,
methyl 18-epi-O-n-propyl-3-oxo-2,3-seco-deserpidate,
methyl 18-epi-O-isopropyl-3-oxo-2,3-seco-deserpidate,
ethyl 18-epi-O-methyl-3-oxo-2,3-seco-deserpidate,
n-propyl 18-epi-O-ethyl-3-oxo-2,3-seco-deserpidate,
isopropyl 18-epi-O-methyl-3-oxo-2,3-seco-deserpidate,
and the like.

Additional intermediates are, for example,
lower alkyl 18-epi-O-lower alkyl-5-methyl-3-oxo-2,3-seco-reserpates, e.g. methyl 5-methyl-18-epi-O-methyl-3-oxo-2,3-seco-reserpate and the like,
lower alkyl 18-epi-O-lower alkyl-6-methyl-3-oxo-2,3-seco-reserpates, e.g. methyl 6-methyl-18-epi-O-methyl-3-oxo-2,3-seco-reserpate, methyl 6-methyl-18-epi-O-n-propyl-3-oxo-2,3-seco-reserpate and the like,
lower alkyl 18-epi-O-lower alkyl-6-methyl-3-oxo-2,3-seco-deserpidates, e.g. methyl 6-methyl-18-epi-O-methyl-3-oxo-2,3-seco-deserpidate, ethyl 18-epi-O-ethyl-6-methyl-3-oxo-2,3-seco-deserpidate and the like,
lower alkyl 18-epi-O-lower-alkyl-9-methyl-3-oxo-2,3-seco-deserpidates, e.g. methyl 9-methyl-18-epi-O-methyl-3-oxo-2,3-seco-deserpidate and the like,
lower alkyl 18-epi-O-lower alkyl-10-methyl-3-oxo-2,3-seco-deserpidates, e.g. methyl 10-methyl-18-epi-O-methyl-3-oxo-2,3-seco-deserpidate, methyl 18-epi-O-ethyl-10-methyl-3-oxo-2,3-seco-deserpidate and the like,
lower alkyl 18-epi-O-lower alkyl-11-methyl-3-oxo-2,3-seco-deserpidates, e.g. methyl 11-methyl-18-epi-O-methyl-3-oxo-2,3-seco-deserpidate and the like,
lower alkyl 18-epi-O-lower alkyl-9-methoxy-3-oxo-2,3-seco-deserpidates, e.g. methyl 9-methoxy-18-epi-O-methyl-3-oxo-2,3-seco-deserpidate, methyl 18-epi-O-ethyl-9-methoxy-3-oxo-2,3-seco-deserpidate, ethyl 9-methoxy-18-epi-O-methyl-3-oxo-2,3-seco-deserpidate and the like,
lower alkyl 18-epi-O-lower alkyl-10-methoxy-3-oxo-2,3-seco-reserpates, e.g. metthyl 10-methoxy-18-epi-O-methyl-3-oxo-2,3-seco-reserpate, methyl 18-epi-O-ethyl-10-methoxy-3-oxo-2,3-seco-reserpate and the like,
lower alkyl 9,10-dimethoxy-18-epi-O-lower alkyl-3-oxo-2,3-seco-reserpates, e.g. methyl 9,10-dimethoxy-18-epi-O-methyl-3-oxo-2,3-seco-reserpate, methyl 9,10-dimethoxy-18-epi-O-ethyl-3-oxo-2,3-seco-reserpate and the like
lower alkyl 10-ethoxy-18-epi-O-lower alkyl-3-oxo-2,3-seco-deserpidates, e.g. methyl 10-ethoxy-18-epi-O-methyl-3-oxo-2,3-seco-deserpidate and the like,
lower alkyl 11-ethoxy-18-epi-O-lower alkyl-3-oxo-2,3-seco-deserpidates, e.g. methyl 11-ethoxy-18-epi-O-methyl-3-oxo-2,3-seco-deserpidate, methyl 11-ethoxy-18-epi-O-ethyl-3-oxo-2,3-seco-deserpidate and the like,
lower alkyl 18-epi-O-lower alkyl-11-n-propyloxy-3-oxo-2,3-seco-deserpidates, e.g. methyl 18-epi-O-methyl-11-n-propyloxy-3-oxo-2,3-seco-deserpidate, methyl 18-epi-O-ethyl-11-n-propyloxy-3-oxo-2,3-seco-deserpidate and the like,
lower alkyl 11-isopropyloxy-18-epi-O-lower alkyl-3-oxo-2,3-seco-deserpidates, e.g. methyl 11-isopropyloxy-18-epi-O-methyl-3-oxo-2,3-seco-deserpidate, ethyl 11-isopropyloxy-18-epi-O-methyl-3-oxo-2,3-seco-deserpidate and the like,
lower alkyl 11-n-butyloxy-18-epi-O-lower alkyl-3-oxo-2,3-seco-deserpidates, e.g. methyl 11-n-butyloxy-18-epi-O-methyl-3-oxo-2,3-seco-deserpidate, methyl 11-n-butyloxy-18-epi-O-ethyl-3-oxo-2,3-seco-deserpidate and the like, lower alkyl 18-epi-O-lower alkyl-12-methoxy-3-oxo-2,3-seco-deserpidates, e.g. methyl 12-methoxy-18-epi-O-methyl-3-oxo-2,3-seco-deserpidate, ethyl 12-methoxy-18-epi-O-methyl-3-oxo-2,3-seco-deserpidate and the like, lower alkyl 10-benzyloxy-18-epi-O-lower alkyl-3-oxo-2,3-seco-deserpidates, e.g. methyl 10-benzyloxy-18-epi-O-methyl-3-oxo-2,3-seco-deserpidate and the like, lower alkyl 11-benzyloxy-18-epi-O-lower alkyl-3-oxo-2,3-seco-deserpidates, e.g. methyl 11-benzyloxy-18-epi-O-methyl-3-oxo-2,3-seco-deserpidate and the like, lower alkyl 18-epi-O-lower alkyl-10,11-methylenedioxy-3-oxo-2,3-seco-deserpidates, e.g. methyl 18-epi-O-methyl-10,11-methylenedioxy-3-oxo-2,3-seco-deserpidate and the like, lower alkyl 18-epi-O-lower alkyl-10-methylmercapto-3-oxo-2,3-seco-deserpidates, e.g. methyl-18-epi-O-methyl-10-methylmercapto-3-oxo-2,3-seco-deserpidate and the like, lower alkyl 18-epi-O-lower alkyl-11-methylmercapto-3-oxo-2,3-seco-deserpidates, e.g. methyl 18-epi-O-methyl-11-methylmercapto-3-oxo-2,3-seco-deserpidate and the like, lower alkyl 11-ethylmercapto-18-epi-O-lower alkyl-3-oxo-2,3-seco-deserpidates, e.g. methyl 11-ethylmercapto-18-epi-O-methyl-3-oxo-2,3-seco-deserpidate and the like, lower alkyl 10-fluoro-18-epi-O-lower alkyl-3-oxo-2,3-seco-deserpidates, e.g. methyl 10-fluoro-18-epi-O-methyl-3-oxo-2,3-seco-deserpidate and the like, lower alkyl 11-fluoro-18-epi-O-lower alkyl-3-oxo-2,3-seco-deserpidates, e.g. methyl 11-fluoro-18-epi-O-methyl-3-oxo-2,3-seco-deserpidate and the like, lower alkyl 10-chloro-18-epi-O-lower alkyl-3-oxo-2,3-seco-deserpidates, e.g. methyl 10-chloro-18-epi-O-methyl-3-oxo-2,3-seco-deserpidate and the like, lower alkyl 9,12-dichloro-18-epi-O-lower alkyl-3-oxo-2,3-seco-deserpidates, e.g. methyl 9,12-dichloro-18-epi-O-methyl-3-oxo-2,3-seco-deserpidate, methyl 9,12-dichloro-18-epi-O-n-propyl-3-oxo-2,3-seco-deserpidate and the like, lower alkyl 11,12-dichloro-18-epi-O-lower alkyl-3-oxo-2,3-seco-deserpidates, e.g. methyl 11,12-dichloro-18-epi-O-methyl-3-oxo-2,3-seco-reserpate and the like, lower alkyl 10-chloro-18-epi-O-lower alkyl-3-oxo-2,3-seco-reserpates, e.g. methyl 10-chloro-18-epi-O-methyl-3-oxo-2,3-seco-reserpate and the like, lower alkyl 10-bromo-18-epi-O-lower alkyl-3-oxo-2,3-seco-reserpates, e.g. methyl 10-bromo-18-epi-O-methyl-3-oxo-2,3-seco-reserpate and the like, lower alkyl 17α-desmethoxy-17α-ethoxy-18-epi-O-lower alkyl 3-oxo-2,3-seco-reserpate, e.g. methyl 17α-desmethoxy-17α-ethoxy-18-epi-O-methyl-3-oxo-2,3-seco-reserpate and the like, lower alkyl 17α-desmethoxy-18-epi-O-lower alkyl-17α-n-propyloxy-3-oxo-2,3-seco-reserpates, e.g. methyl 17α-desmethoxy-18-epi-O-methyl-17α-n-propyloxy-3-oxo-2,3-seco-reserpate and the like, lower alkyl 17α-desmethoxy-17α-ethoxy-18-epi-O-lower alkyl-3-oxo-2,3-seco-deserpidates, e.g. methyl 17α-desmethoxy-17α-ethoxy-18-epi-O-methyl-3-oxo-2,3-seco-deserpidate and the like, lower alkyl 17α-cyano-17α-desmethoxy-18-epi-O-lower alkyl-3-oxo-2,3-seco-reserpates, e.g. methyl 17α-cyano-17α-desmethoxy-18-epi-O-methyl-3-oxo-2,3-seco-reserpate and the like, lower alkyl 17α-cyano-17α-desmethoxy-18-epi-O-lower alkyl-3-oxo-2,3-seco-deserpidates, e.g. methyl-17α-cyano-17α-desmethoxy-18-epi-O-methyl-3-oxo-2,3-seco-deserpidate and the like, lower alkoxy-lower alkyl 18-epi-O-lower alkyl-3-oxo-2,3-seco-reserpates, in which lower alkoxy is separated from the 16β-carboxyl group by at least two carbon atoms, e.g. 2-methoxyethyl 18-epi-O-methyl-3-oxo-2,3-seco-reserpate and the like, lower alkoxy-lower alkyl 18-epi-O-lower alkoxy-lower alkyl-3-oxo-2,3-seco-reserpates, in which lower alkoxy is separated from the 16β-carboxyl group and the 18-oxygen atom, respectively, by at least two carbon atoms, e.g. 2-methoxyethyl 18-epi-O-(2-methoxyethyl)-3-oxo-2,3-seco-reserpate and the like, or any other 18β etherified hydroxy-3-oxo-2,3-yohimbane 16β-carboxylic acid ester, such as one of those previously mentioned in the description. These compounds, upon ring closure, for example, with phosphorus oxychloride and the like, yield the desired Δ³-18α-etherified hydroxy-allo-yohimbene 16β-carboxylic acid esters or salts thereof, which are used as the starting materials in the previously-described procedure.

*Example 26*

A solution of 1.5 g. of methyl 18-epi-O-methyl-3-iso-reserpate is heated on the steam bath in 50 ml. of glacial acetic acid for about twenty-four hours under an atmosphere of nitrogen. The reaction mixture is concentrated under reduced pressure to a small volume, water is added to the residue and the solution is extracted with chloroform. The organic solution is separated, washed with water and evaporated under reduced pressure. From the residue, the desired methyl 18-epi-O-methyl-reserpate, which is identified by paper chromatography, can be isolated by chromatography on aluminum oxide; the resulting product is identical with the compound obtained according to the procedure of Example 1.

The starting material used in the above procedure may be prepared as follows: A mixture of 0.125 g. of methyl 18-epi-O-methyl-3-dehydro-reserpate in 20 ml. of methanol is warmed gently to solubilize the material and then cooled to an ice-water bath. 0.25 g. of sodium borohydride in small portions is added over a period of one-half hour, the reaction mixture is allowed to stand for an additional one-half hour while cooling and is diluted with water. The organic material is extratced with methylene chloride, the organic solution is dried over sodium sulfate and evaporated to dryness. The residue is crystallized from diethyl ether to yield methyl 18-epi-O-methyl-3-iso-reserpate, M.P. 225–229°, $$[\alpha]_D^{26} = -37°$$

(chloroform); yield: 0.11 g.

Other compounds, which may be used as starting materials in the above-described isomerization procedure are, for example methyl 18-epi-O-n-hexyl-3-iso-reserpate, M.P. 226–228° (decomposition, recrystallized from acetonitrile); $[\alpha]_D^{25} = -32°$ (chloroform), the hydrochloride monohydrate of which melts at 235–237° (decomposition);

2-methoxyethyl 18-epi-O-(2-methoxyethyl)-3-iso-reserpate, M.P. 154–157° (from methanol); $[\alpha]_D^{25} = -18°$ (chloroform), the hydrochloride of which melts at 172–177°;

as well as methyl 18-epi-O-ethyl-3-iso-reserpate,
methyl 18-epi-O-n-propyl-3-iso-reserpate,
methyl 18-epi-O-isobutyl-3-iso-reserpate,
ethyl 18-epi-O-methyl-3-iso-reserpate,
methyl 10-methoxy-18-epi-O-methyl-3-iso-deserpidate,
methyl 18-epi-O-ethyl-10-methoxy-3-iso-deserpidate,
methyl 10-methoxy-18-epi-O-n-propyl-3-iso-deserpidate,
ethyl 10-methoxy-18-epi-O-methyl-3-iso-deserpidate,
methyl 18-epi-O-methyl-3-iso-deserpidate,
methyl 18-epi-O-ethyl-3-iso-deserpidate,
methyl 18-epi-O-n-propyl-3-iso-deserpidate,
ethyl 18-epi-O-methyl-3-iso-deserpidate,
n-propyl 18-epi-O-methyl-3-iso-deserpidate and the like, or salts of these compounds, or any other 18α-etherified hydroxy-allo-yohimbane 16β-carboxylic acid ester, which contains substituents, such as those previously-mentioned, attached to positions available for substitution. These compounds are useful as starting materials in the isomerization procedure described in the example hereinbefore.

*Example 27*

A mixture of 3.17 g. of methyl 18-O-(4-bromo-phenylsulfonyl)-reserpate in 200 ml. of allyl alcohol containing 1 ml. of N,N,N-triethylamine is stirred and refluxed in an atmosphere of nitrogen for 45 hours. The solution is concentrated to dryness under reduced pressure and the residue is dissolved in methylene chloride; the organic solution is washed with an aqueous sodium carbonate solution and with water, and is dried over sodium sulfate. After evaporating the solvent, the residue is recrystallized from acetone to yield methyl 18-epi-O-allyl-reserpate, M.P. 208–210°; yield: 0.9 g.

The hydrochloride, M.P. 198–201°, is prepared by lyophilizing a solution of the free base in 0.1 N hydrochloric acid.

Other 18α-allyloxy-3-epi-allo-yohimbane 16β-carboxylic acid esters, such as ethyl 18-epi-O-allyl-reserpate, methyl 18-epi-O-allyl-deserpidate and the like, may be prepared according to the above procedure.

*Example 28*

A mixture of 2.12 g. of methyl 18-O-(4-bromo-phenylsulfonyl)-deserpidate, 160 ml. of methanol and 0.40 g. of N,N,N-triethylamine is heated in a sealed pressure bottle on the steam bath for 24 hours while stirring. The reaction mixture is worked up as shown in Example 19 to yield 0.75 g. of methyl 18-epi-O-methyl-deserpidate, M.P. 123–127° (foaming), $[\alpha]_D^{27}=-62°$ (chloroform).

The starting material may be prepared by reacting a mixture of 5.67 g. of methyl deserpidate, 9.6 g. of 4-bromo-benzene sulfonyl chloride and 80 ml. of pyridine as shown in Example 19 to yield the desired methyl 18-O-(4-bromo-phenyl-sulfonyl)-deserpidate, M.P. 198–200° $[\alpha]_D^{26}=-90°$ (chloroform); yield: 5.0 g.

Other lower alkyl 18-epi-O-lower alkyl-deserpidates, such as methyl 18-epi-O-ethyl-deserpidate,
methyl 18-epi-O-n-propyl-deserpidate,
methyl 18-epi-O-isopropyl-deserpidate,
methyl 18-epi-O-n-butyl-deserpidate,
ethyl 18-epi-O-methyl-deserpidate,
ethyl 18-epi-O-n-propyl-deserpidate,
n-propyl 18-epi-O-methyl-deserpidate,
isopropyl 18-epi-O-ethyl-deserpidate,
n-butyl 18-epi-O-methyl-deserpidate and the like may be prepared according to the above-described procedure using the appropriate starting materials.

*Example 29*

A mixture of 2.0 g. of n-propyl 18-O-(4-bromo-phenylsulfonyl)-reserpate, 160 ml. of n-propanol and 0.45 g. of N,N,N-triethylamine is heated for one week as shown in Example 7; the reaction mixture is worked up as described in Example 19 to yield the n-propyl 18-epi-O-n-propyl-reserpate, M.P. 192–195°, $[\alpha]_D^{24}=-12°$ (chloroform); yield: 0.67 g.

The n-propyl 18-epi-O-n-propyl-reserparate hydro chloride monohydrate, prepared as usual, melts at 190–195°.

*Example 30*

A mixture of 5.0 g. of methyl 18-O-(4-bromo-phenylsulfonyl)-reserpate, 250 ml. of 2-methoxyethanol and 1.5 ml. of N,N,N-triethylamine is heated for one week; 2.5 g. of methyl 18-epi-O-(2-methoxyethyl)-reserpate is obtained by working up the reaction mixture as shown in Example 19. It melts at 217–219°, $[\alpha]_D^{26}=-24°$ (chloroform) and its hydrochloride melts at 209–210°.

Other 18α-etherified hydroxy-lower alkoxy-3-epi-allo-yohimbane 16β-carboxylic acid esters, such as ethyl 18-epi-O-(2-methoxyethyl)-reserpate, M.P. 186–188°; $[\alpha]_D^{24}=-12°$ (chloroform), the hydrochloride sesquihydrate of which melts at 175–181°, n-propyl 18-epi-O-(2-methoxyethyl)-reserpate, M.P. 190–192°; $[\alpha]_D^{25}=-14°$ (chloroform), the hydrochloride sesquihydrate of which melts at 165–170°, as well as methyl 18-epi-O-(2-ethoxyethyl)-reserpate, ethyl 18-epi-O-(2-ethoxyethyl)-reserpate, methyl 18-epi-O-(2-methoxyethyl)-deserpidate, n-propyl 18-epi-O-(3-methoxypropyl)-deserpidate and the like, may be prepared according to the above procedure.

*Example 31*

A mixture of 3.17 g. methyl 18-O-(4-bromo-phenylsulfonyl)-reserpate, 50 ml. of crotyl alcohol (2-butenol) and 2 ml. of N,N,N-triethylamine is refluxed for 70 hours in an atmosphere of nitrogen and worked up as shown in Example 19. The resulting methyl 18-epi-O-(2-butenyl)-reserpate is recrystallized from methanol, M.P. 212–213°; yield: 0.8 g. first crop.

Other 18α-(2-butenyloxy)-3-epi-allo - yohimbane 68β-carboxylic acid esters, such as ethyl 18-epi-O-(2-butenyl)-reserpate, methyl 18-epi-O-(2-butenyl)-deserpidate, ethyl 18-epi-O-(2-butenyl)-10-methoxy-deserpidate and the like, may be prepared according to the above procedure by selecting the proper starting materials.

*Example 32*

A mixture of 4.3 g. of methyl 18-O-(3-nitro-phenylsulfonyl)-reserpate, 25 g. of cyclopropylmethanol and 2 ml. of N,N,N-triethylamine is stirred in a sealed flask and under an atmosphere of nitrogen for 4½ days while maintaining a temperature of 100°. The solution is concentrated under reduced pressure and the residue is dissolved in methylene chloride; the organic solution is washed with a five percent aqueous solution of sodium carbonate and with a saturated aqueous solution of sodium chloride, dried over sodium sulfate and then concentrated to dryness under reduced pressure. The oily residue crystallizes in a mixture of methanol and water, and the resulting methyl 18-epi-O-cyclopropylmethyl-reserpate of the formula:

is recrystallized from methanol and water, M.P. 225–227°; yield: 2.6 g.

Other 18α-cycloalkyl-lower alkoxy-3-epi-allo-yohimbane 16β-carboxylic acid esters prepared according to methods analogous to the one mentioned hereinabove, are, for example:

Methyl 18-epi-O-cyclobutylmethyl-reserpate, M.P. 218–220° (crystallized from a benzene-cyclohexane mixture); $[\alpha]_D^{22}=-14°$ (chloroform), the hydrochloride of which melts at 205–210°;

Methyl 18-epi-O-cyclopentylmethyl-reserpate, M.P. 227–230° (from a mixture of benzene and cyclohexane); $[\alpha]_D^{22}=-10°$ (chloroform), the hydrochloride monohydrate of which melts at 195–200°;

Methyl 18-epi-O-cyclohexylmethyl-reserpate, M.P. 220–222° (from a benzene-cyclohexane mixture); $[\alpha]_D^{22}=-5°$ (chloroform), the hydrochloride of which melts at 205–215°;

Methyl 18-epi-O-(3-cyclopentylpropyl)-reserpate, M.P. 220–222° (from a 1:3-mixture of benzene and cyclohexane), $[\alpha]_D^{22}=-10°$ (chloroform), the hydrochloride of which melts at 215–225°;

as well as ethyl 18-epi-O-cyclobutylmethyl-reserpate, ethyl 18-epi-O-cyclopentylmethyl-reserpate, methyl 18-epi-O-(2-cyclopentylethyl)-reserpate, n-propyl 18-epi-O-cyclohexylmethyl - reserpate, methyl 18 - epi - O - cycloheptylmethyl-reserpate, ethyl 18-epi-O-cyclopropylmethyl-reserpate, n-propyl 18-epi-O-cyclopentylmethyl-reserpate, methyl 18-epi-O-cyclopropylmethyl-deserpidate, methyl 18-epi-O-cyclopentylmethyl-deserpidate, ethyl 18-epi-O-cyclopropylmethyl-deserpidate and the like may be prepared according to the above procedure, using the appropriate starting materials.

*Example 33*

A mixture of 18.0 g. of methyl 18-O-(3-nitro-phenyl-sulfonyl)-reserpate, 1440 ml. of ethanol and 3.6 g. of N,N,N-triethylamine is refluxed for about 40 hours. After decolorizing with charcoal, the solution is taken to dryness under reduced pressure, the residue is dissolved in 200 ml. of methylene chloride, the organic solution is washed with two portions of 100 ml. of a five percent aqueous sodium carbonate solution and then with 200 ml. of a saturated aqueous sodium chloride solution. The aqueous washings are extracted with 50 ml. of methylene chloride, the organic solutions are combined, dried over sodium sulfate and evaporated to dryness under reduced pressure. The residue is recrystallized by dissolving it in 170 ml. of hot isopropanol and chilling overnight to 0–5°. The resulting methyl 18-epi-O-ethyl-reserpate is filtered off, washed with cold isopropanol and dried, M.P. 220–223°; yield: 10.28 g. The compound is identical with the product obtained according to the procedure of Example 5.

The starting material may be prepared as follows: To a mixture of 20.70 g. of methyl reserpate and 31.5 ml. of pyridine is added 13.8 g. of 3-nitro-benzene sulfonyl chloride in an atmosphere of nitrogen. The solution is cooled while stirring and is allowed to stand at 18° for 16 hours. 165 ml. of methanol and 4.30 ml. of glacial acetic acid is added, followed by a solution of 7.30 g. of potassium thiocyanate in 7.30 ml. of water. The precipitate formed after scratching is filtered off, the solid material is washed with cold methanol and dried at 60° under reduced pressure to yield 31.0 g. of methyl 18-O-(3-nitro-phenyl-sulfonyl)-reserpate thiocyanate, which melts over a range of 25° at 190–215°.

?1.0 g. of methyl 18-O-(3-nitro-phenyl-sulfonyl)-reserpate thiocyanate is added to a mixture of 775 ml. of methanol and 39 ml. of water; the mixture is heated to reflux to ensure complete solution, is cooled to about 50° and treated with 5.25 g. of N,N,N-triethylamine. The mixture is stirred at 35° for about 45 minutes, chilled to 10° and then filtered. The solid material is washed with a cold 1:1-mixture of methanol and water, dried at 60° under reduced pressure (weight: 20.1 g.) and recrystallized from a large volume of methanol to yield methyl 18-O-(3-nitro-phenyl-sulfonyl)-reserpate, M.P. 189–190°.

*Example 34*

To a solution of 1.1 g. of methyl 18-epi-O-methyl-reserpate in 5 ml. of methylene chloride, kept at 0° is added while stirring 7.2 ml. of a 0.36 M perbenzoic acid solution in chloroform over a period of five minutes. Stirring is continued for an additional twenty minutes; the organic solution is washed twice with a five percent aqueous sodium carbonate solution, with water and with a saturated aqueous sodium chloride solution. The dried organic layer is evaporated, the frothy residue (0.9 g.) is dissolved in methylene chloride and the solution is placed on a column containing 25 g. of aluminum oxide (neutral, activity II–III). After washing with methylene chloride, the desired methyl 18-epi-O-methyl-reserpate N-oxide is eluted with methylene chloride, containing 0.5 percent methanol, and methylene chloride, containing 1 percent methanol, and is crystallized by stirring the residue from these eluates with moist ethyl acetate. It is recrystallized by dissolving it in a boiling mixture of methylene chloride and moist ethyl acetate, followed by evaporating most of the former solvent. The monohydrate of methyl 18-epi-O-methyl-reserpate N-oxide melts at 234–236° (with sintering).

*Example 35*

The mixture of 1.0 g. of methyl 18-epi-O-methyl-reserpate, 14 ml. of 1 N aqueous sodium hydroxide, 43 ml. of methanol and 7.2 ml. of water is refluxed for fifty-five minutes. After standing for an additional hour, the solution is concentrated to a volume of 15 ml., 6 ml. of water is added and the solution is acidified with 2 ml. of concentrated hydrochloric acid. The solution is concentrated while adding ethanol and the aqueous phase is decanted from the resulting oil. Addition of acetone precipitates inorganic material, which is filtered off; the solution is concentrated to a jelly and on addition of a small amount of fresh acetone and while warming, crystallization occurs. The desired 18-epi-O-methyl-reserpic acid hydrochloric monohydrate is filtered off and washed with acetone, M.P. 245–250°; $[\alpha]_D^{24} = -17°$ (chloroform-methanol); yield 0.78 g.

To a solution of 0.5 g. of 18-epi-O-methyl-reserpic acid hydrochloride in a mixture of methanol and methylene chloride is added an excess of diazoethane in diethyl ether while cooling. The reaction mixture is allowed to stand in the cold, a few drops of acetic acid are added to destroy the excess of diazoethane and the solution is evaporated to dryness. The residue is taken up in methylene chloride, the organic solution is washed twice with a five percent aqueous solution of sodium carbonate and once with saturated aqueous sodium chloride, dried and evaporated to dryness to yield the desired ethyl 18-epi-O-methyl-reserpate, M.P. 195–198°, which is identical with the compound obtained according to the procedure of Example 22.

Other 18α-etherified hydroxy-3-epi-allo-yohimbane 16β-carboxylic acids, such as, for example, 18-epi-O-n-pentyl-reserpic acid, M.P. 217–224°, 18-epi-O-ethyl-reserpic acid, 18-epi-O-n-propyl-reserpic acid and the like, may be prepared according to the above-described hydrolysis procedure from the corresponding 18α-etherified hydroxy-3-epi-allo-yohimbane 16β-carboxylic acid esters, such as, for example, methyl 18-epi-O-n-pentyl-reserpate (Example 26), methyl 18-epi-O-ethyl-reserpate (Example 17), methyl 18-epi-O-n-propyl-reserpate (Example 19) and the like, and may be converted into other 18α-etherified hydroxy-3-epic-allo-yohimbane 16β-carboxylic acid esters, such as ethyl 18-epi-O-n-pentyl-reserpate, ethyl 18-epi-O-ethyl-reserpate, M.P. 190–193°, $[\alpha]_D^{25} = -16°$ (chloroform), n-propyl 18-epi-O-n-propyl-reserpate, M.P. 192–195°, $[\alpha]_D^{24} = -12°$ (chloroform), and the like, by treatment with a lower diazo-alkane, e.g. diazoethane, n-diazopropane and the like, as described hereinbefore.

*Example 36*

A mixture of 3.0 g. of 2-methoxyethyl 18-O-(4-bromo-phenyl-sulfonyl)-reserpate, 0.45 g. of N,N,N-triethylamine and 200 ml. of 2-methoxyethanol is heated in a sealed bottle on the steam bath for eleven days. The excess 2-methoxyethanol is evaporated under reduced pressure, the residue is dissolved in methylene chloride, and the organic solution is washed twice with five percent aqueous sodium carbonate and once with saturated aqueous sodium chloride. The methylene chloride solution is dried over sodium sulfate and the solvent is evaporated under reduced pressure and the residue is crystallized on addition of diethyl ether. The solid material is filtered off and redissolved in methylene chloride; the organic solution is passed through a charcoal preparation and evaporated. The desired 2-methoxyethyl 18-epi-O-(2-methoxyethyl)-reserpate of the formula:

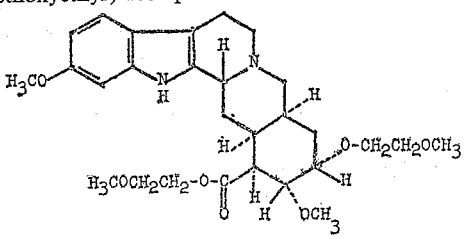

is crystallized from diethyl ether and melts at 144–147°, $[\alpha]_D^{24} = -22°$ (in chloroform); yield: 1.4 g.

Other lower alkyl-lower alkyl 18-epi-O-lower-alkoxy-lower alkyl-reserpates, in which lower alkoxy is separated from the 16-carboxyl group and the 18-oxygen atom, respectively, by from two to three carbon atoms, are, for example, 2-methoxyethyl 18-epi-O-(2-ethoxyethyl)-reserpate, M.P. 123–127°; $[\alpha]_D^{24} = -18°$ (chloroform), the hydrochloride hemihydrate of which melts at 132–137°;
2-ethoxyethyl 18-epi-O-(2-ethoxyethyl)-reserpate, M.P. 145–147°; $[\alpha]_D^{24} = -23°$ (chloroform), the hydrochloride sesquihydrate of which melts at 135–140°;

as well as 2-methoxyethyl 18-epi-O-(2-methoxypropyl)-reserpate,
2-methoxyethyl 18-epi-O-(2-isopropyloxyethyl)-reserpate,
2-methoxyethyl 18-epi-O-(2-methoxypropyl)-reserpate,
2-methoxyethyl 18-epi-O-(3-methoxypropyl)-reserpate,
2-n-propyloxyethyl 18-epi-O-(2-methoxyethyl)-reserpate,
2-isopropyloxyethyl 18-epi-O-(2-ethoxyethyl)-reserpate,
2-methoxypropyl 18-epi-O-(2-methoxyethyl)-reserpate,
2-methoxypropyl 18-epi-O-(2-ethoxyethyl)-reserpate,
3-methoxypropyl 18-epi-O-(2-methoxyethyl)-reserpate,
3-ethoxypropyl 18-epi-O-(3-methoxypropyl)-reserpate and the like, or therapeutically acceptable acid addition salts, such as the hydrochlorides and the like, of these compounds.

Additional 18α-(lower alkoxy-lower alkyl)-oxy-3-epi-allo-yohimbane 16β-carboxylic acid lower alkoxy-lower alkyl esters, in which lower alkoxy is separated from the 16β-carboxyl and the 18α-oxygen atom, respectively, by from two to three carbon atoms are, for example, lower alkoxy-lower alkyl 18-epi-O-lower alkoxy-lower alkyl-deserpidates, e.g. 2-methoxyethyl 18-epi-O-(2-methoxyethyl)-deserpidate,
2-methoxyethyl 18-epi-O-(2-ethoxyethyl)-deserpidate,
2-methoxyethyl 18-epi-O-(2-methoxypropyl)-deserpidate,
2-methoxyethyl 18-epi-O-(3-methoxypropyl)-deserpidate,
2-methoxyethyl 18-epi-O-(3-ethoxypropyl)-deserpidate,
2-ethoxyethyl 18-epi-O-(2-methoxyethyl)-deserpidate,
2-ethoxyethyl 18-epi-O-(2-ethoxyethyl)-deserpidate,
2-n-propyloxyethyl 18-epi-O-(2-methoxyethyl)-deserpidate,
2-n-butyloxyethyl 18-epi-O-(2-methoxyethyl)-deserpidate,
2-methoxyproplyl 18-epi-O-(2-methoxyethyl)-deserpidate,
2-methoxypropyl 18-epi-O-(2-ethoxyethyl)-deserpidate,
3-methoxypropyl 18-epi-O-(2-methoxyethyl)-deserpidate,
3-ethoxypropyl 18-epi-O-(2-methoxyethyl)-deserpidate
and the like, lower alkoxy-lower alkyl 18-epi-O-lower alkoxy-lower alkyl 18-epi-O-lower alkoxy-lower alkyl-5-methyl-reserpates, e.g. 2-methoxyethyl 18-epi-O-(2-methoxyethyl)-5-methyl-reserpate,
2-methoxyethyl 18-epi-O-(2-ethoxyethyl)-5-methyl-reserpate,
2-ethoxyethyl 18-epi-O-(2-methoxyethyl)-5-methyl-reserpate
and the like, lower alkoxy-lower alkyl 18-epi-O-lower alkoxy-lower alkyl-6-methyl-reserpates, e.g. 2-methoxyethyl 18-epi-O-(2-methoxyethyl)-6-methyl-reserpate,
2-methoxyethyl 18-epi-O-(2-ethoxyethyl)-6-methyl-reserpate,
2-ethoxyethyl 18-epi-O-(2-methoxyethyl)-6-methyl reserpate
and the like, lower alkoxy-lower alkyl 18-epi-O-lower alkoxy-lower alkyl-6-methyl-deserpidates, e.g. 2-methoxyethyl 18-epi-O-(2-methoxyethyl)-6-methyl-deserpidate,
2-methoxyethyl 18-epi-O-(2-ethoxyethyl)-6-methyl-deserpidate,
2-ethoxyethyl 18-epi-O-(2-methoxyethyl)-6-methyl-deserpidate
and the like, lower alkoxy-lower alkyl 18-epi-O-lower alkoxy-lower alkyl-9-methyl-deserpidates, e.g. 2-methoxyethyl 18-epi-O-(2-methoxyethyl)-9-methyl-deserpidate,
2-methoxyethyl 18-epi-O-(2-ethoxyethyl)-9-methyl-deserpidate,
3-methoxypropyl 18-epi-O-(2-methoxyethyl)-9-methyl-deserpidate
and the like, lower alkoxy-lower alkyl 18-epi-O-lower alkoxy-lower alkyl-10-methyl-deserpidates, e.g. 2-methoxyethyl 18-epi-O-(2-methoxyethyl)-10-methyl-deserpidate,
2-methoxyethyl 18-epi-O-(2-ethoxyethyl)-10-methyl-deserpidate
and the like, lower alkoxy-lower alkyl 18-epi-O-lower alkoxy-lower alkyl-11-methyl-deserpidates, e.g. 2-methoxyethyl 18-epi-O-(2-methoxyethyl)-11-methyl-deserpidate,
2-methoxyethyl 18-epi-O-(2-ethoxyethyl)-11-methyl-deserpidate,
2-methoxyethyl 18-epi-O-(3-ethoxypropyl)-11-methyl-deserpidate
and the like, lower alkoxy-lower alkyl 18-epi-O-lower alkoxy-lower alkyl-9-methoxy-deserpidates, e.g. 2-methoxyethyl 9-methoxy 18-epi-O-(2-methoxyethyl-deserpidate,
2-methoxyethyl 18-epi-O-(2-ethoxyethyl)-9-methoxy-deserpidate,
2-ethoxyethyl 9-methoxy-18-epi-O-(2-methoxyethyl)-deserpidate,
2-ethoxyethyl 9-methoxy-18-epi-O-(3-methoxypropyl)-deserpidate
and the like, lower alkoxy-lower alkyl 18-epi-O-lower alkoxy-lower alkyl-10-methoxy-deserpidates, e.g. 2-methoxyethyl 10-methoxy-18-epi-O-(2-methoxyethyl)-deserpidates,
2-methoxyethyl 18-epi-O-(2-ethoxyethyl)-10-methoxy-deserpidate,
2-methoxyethyl 18-epi-O-(2-ethoxypropyl)-10-methoxy-deserpidate,
2-methoxyethyl 10-methoxy-18-epi-O-(3-methoxypropyl)-deserpidate,
2-ethoxyethyl 10-methoxy-18-epi-O-(2-methoxyethyl)-deserpidate,
2-methoxypropyl 10-methoxy-18-epi-O-(2-methoxyethyl)-deserpidate,
3-methoxypropyl 10-methoxy-18-epi-O-(2-methoxyethyl)-deserpidate
and the like, lower alkoxy-lower alkyl 11-ethoxy-18-epi-O-lower alkoxy-lower alkyl-deserpidates, e.g. 2-methoxyethyl 11-ethoxy-18-epi-O-(2-methoxyethyl)-deserpidate,
2-methoxyethyl 11-ethoxy-18-epi-O-(2-ethoxyethyl)-deserpidate
and the like, lower alkoxy-lower alkyl 18-epi-O-lower alkoxy-lower alkyl-11-n-propyloxy-deserpidates, e.g. 2-methoxyethyl 18-epi-O-(2-methoxyethyl)-11-n-propyloxy-deserpidate,
2-ethoxyethyl 18-epi-O-(2-methoxyethyl)-11-n-propyloxy-deserpidate
and the like, lower alkoxy-lower alkyl 11-isopropyloxy-18-epi-O-lower alkoxy-lower alkyl-deserpidates, e.g. 2-methoxyethyl 11-isopropyl-18-epi-O-(2-methoxyethyl)-deserpidate,
2-methoxyethyl 11-isopropyloxy-18-epi-O-(2-ethoxyethyl)-deserpidate
and the like, lower alkoxy-lower alkyl 11-n-butyloxy-18-epi-O-lower alkoxy-lower alkyl-deserpidates, e.g. 2-methoxyethyl 11-n-butyloxy-18-epi-O-(2-methoxyethyl)-deserpidate,
2-methoxyethyl 11-n-butyloxy-18-epi-O-(2-n-propyloxyethyl)-deserpidate
and the like, lower alkoxy-lower alkyl 18-epi-O-lower alkoxy-lower alkyl-12-methoxy-deserpidates, e.g. 2-methoxyethyl 12-methoxy-18-epi-O-(2-methoxyethyl)-deserpidate,
2-ethoxyethyl 12-methoxy-18-epi-O-(2-methoxyethyl)-deserpidate
and the like, lower alkoxy-lower alkyl 18-epi-O-lower alkoxy-lower alkyl-10-methoxy-reserpates, e.g. 2-methoxyethyl 18-epi-O-(2-methoxyethyl)-10-methoxyreserpate,
2-methoxyethyl 18-epi-O-(2-ethoxyethyl)-10-methoxy-reserpate,
2-isopropyloxyethyl 18-epi-O-(2-methoxypropyl)-10-methoxy-reserpate
and the like, lower alkoxy-lower alkyl 9,10-dimethoxy-18-epi-O-lower alkoxy-lower alkyl-reserpates, e.g. 2-methoxyethyl 9,10-dimethoxy-18-epi-O-(2-methoxyethyl)-reserpate,
2-methoxyethyl 9,10-dimethoxy-18-epi-O-(2-n-propyloxyethyl)-reserpate,
2-ethoxyethyl 9,10-dimethoxy-18-epi-O-(2-methoxyethyl)-reserpate
and the like, lower alkoxy-lower alkyl 18-epi-O-lower alkoxy-lower alkyl-10,11-methylenedioxy-deserpidates, e.g. 2-methoxyethyl 18-epi-O-(2-methoxyethyl)-10,11-methylenedioxy-deserpidate,
2-methoxyethyl 18-epi-O-(2-n-butyloxyethyl)-10,11-methylenedioxy-deserpidate
and the like, lower alkoxy-lower alkyl 10-benzyloxy-18-epi-O-lower alkoxy-lower alkyl-deserpidates, e.g. 2-methoxyethyl 10-benzyloxy-18-epi-O-(2-methoxyethyl)-deserpidate,
2-methoxyethyl 10-benzyloxy-18-epi-O-(2-ethoxyethyl)-deserpidate,
2-isopropyloxyethyl 10-benzyloxy-18-epi-O-(2-methoxyethyl)-deserpidate
and the like, lower alkoxy-lower alkyl 11-benzyloxy-18-epi-O-lower alkoxy-lower alkyl-deserpidates, e.g. 2-methoxyethyl 11-benzyloxy-18-epi-O-(2-methoxyethyl)-deserpidate,
2-methoxyethyl 11-benzyloxy-18-epi-O-(2-ethoxyethyl)-deserpidate,
2-ethoxyethyl 11-benzyloxy-18-epi-O-(3-methoxypropyl)-deserpidate
and the like, lower alkoxy-lower alkyl 18-epi-O-lower alkoxy-lower alkyl-11-methylmercapto-deserpidates, e.g. 2-methoxyethyl 18-epi-O-(2-methoxyethyl)-11-methylmercapto-deserpidate,
2-methoxypropyl 18-epi-O-(2-methoxyethyl)-11-methylmercapto-deserpidate,
2-methoxyethyl 18-epi-O-(2-ethoxyethyl)-11-methylmercapto-deserpidate
and the like, lower alkoxy-lower alkyl 11-ethylmercapto-18-epi-O-lower alkoxy-lower alkyl-deserpidates, e.g. 2-methoxyethyl 11-ethylmercapto-18-epi-O-(2-methoxyethyl)-deserpidate,
2-methoxyethyl 18-epi-O-(2-ethoxyethyl)-11-ethylmercapto-deserpidate,
3-methoxypropyl 11-ethylmercapto-18-epi-O-(2-methoxyethyl-deserpidate
and the like, lower alkoxy-lower alkyl 10-fluoro-18-epi-O-lower alkoxy-lower alkyl-deserpidates, e.g. 2-methoxyethyl 10-fluoro-18-epi-O-(2-methoxyethyl)-deserpidate,
2-ethoxyethyl 10-fluoro-18-epi-O-(2-methoxyethyl)-deserpidate
and the like, lower alkoxy-lower alkyl 11-fluoro-18-epi-O-lower alkoxy-lower alkyl-deserpidates, e.g. 2-methoxyethyl 11-fluoro-18-epi-O-(2-methoxyethyl)-deserpidate,
2-methoxyethyl 11-fluoro-18-epi-O-(2-n-propyloxyethyl)-deserpidate,
2-methoxyethyl 11-fluoro-18-epi-O-(2-methoxypropyl)-deserpidate
and the like, lower alkoxy-lower alkyl 10-chloro-18-epi-O-lower alkoxy-lower alkyl-deserpidates, e.g.
2-methoxyethyl 10-chloro-18-epi-O-(2-methoxyethyl)-deserpidate,
2-methoxyethyl 10-chloro-18-epi-O-(2-ethoxyethyl)-deserpidate,
2-ethoxyethyl chloro-18-epi-O-(2-methoxyethyl)-deserpidate and the like, lower alkoxy-lower alkyl 10-chloro-18-epi-O-(2-methoxyethyl)-reserpates, e.g.
2-methoxyethyl 10-chloro-18-epi-O-(2-methoxyethyl)-reserpate,
2-methoxyethyl 10-chloro-18-epi-O-(2-ethoxyethyl)-reserpate and the like, lower alkoxy-lower alkyl 9,12-dichloro-18-epi-O-lower alkoxy-lower alkyl-deserpidates, e.g.
2-methoxyethyl 9,12-dichloro-18-epi-O-(2-methoxyethyl)-deserpidate,
2-ethoxyethyl 9,12-dichloro-18-epi-O-(2-ethoxyethyl)-deserpidate and the like, lower alkoxy-lower alkyl 11,12-dichloro-18-epi-O-lower alkoxy-lower alkyl-deserpidates, e.g.
2-methoxyethyl 11,12-dichloro-18-epi-O-(2-methoxyethyl)-deserpidate and the like, lower alkoxy-lower alkyl 10-bromo-18-epi-O-lower alkoxy-lower alkyl reserpates, e.g.
2-methoxyethyl 10-bromo-18-epi-O-(2-methoxyethyl)-reserpate,
2-methoxyethyl 10-bromo-18-epi-O-(2-ethoxyethyl)-reserpate,
2-isobutyloxyethyl 10-bromo-18-epi-O-(2-methoxyethyl)-reserpate and the like, lower alkoxy-lower alkyl 17α-desmethoxy-17α-ethoxy-18-epi-O-lower alkoxy-lower alkyl-reserpates, e.g.
2-methoxyethyl-17α-desmethoxy-17α-ethoxy-18-epi-O-(2-methoxyethyl)-reserpate,
2-methoxyethyl 17α-desmethoxy-17α-ethoxy-18-epi-O-(2-etoxyethyl)-reserpate and the like, lower alkoxy-lower alkyl 17α-desmethoxy-18-epi-O-lower alkoxy-lower alkyl-17α-n-propyloxy-reserpates, e.g.
2-methoxyethyl 17α-desmethoxy-18-epi-O-(2-methoxyethyl)-17α-n-propyloxy-reserpate,
2-methoxyethyl 17α-desmethoxy-18-epi-O-(2-ethoxyethyl)-17α-n-propyloxy-reserpate and the like, lower alkoxy-lower alkyl 17α-desmethoxy-17α-isopropyloxy-18-epi-O-lower alkoxy-lower alkyl-reserpates, e.g.
2-methoxyethyl 17α-desmethoxy-17α-isopropyloxy-18-epi-O-(2-methoxyethyl)-reserpate,
2-ethoxyethyl 17α-desmethoxy-18-epi-O-(2-ethoxyethyl)-17α-iso-propyloxy-reserpate and the like, lower alkoxy-lower alkyl 17α-desmethoxy-17α-ethoxy-18-epi-O-lower alkoxy-lower alkyl-reserpidates, e.g.
2-methoxyethyl 17α-desmethoxy-17α-ethoxy-18-epi-O-(2-methoxyethyl)-deserpidate,
2-ethoxyethyl 17α-desmethoxy-17α-ethoxy-18-epi-O-(2-n-propyloxyethyl)-reserpidate,
2-methoxyethyl 17α-desmethoxy-17α-ethoxy-18-epi-O-(2-ethoxyethyl)-reserpidate and the like, lower alkoxy-lower alkyl 17α-cyano-17α-desmethoxy-18-epi-O-lower alkoxy-lower alkyl-reserpates, e.g.
2-methoxyethyl 17α-cyano-17α-desmethoxy-18-epi-O-(2-methoxyethyl)-reserpate, 2-methoxyethyl 17α-cyano-17α-desmethoxy-18-epi-O-(2-isopropyloxyethyl)-reserpate and the like, lower alkoxy-lower alkyl 17α-cyano-17α-desmethoxy-18-epi-O-lower alkoxy-lower alkyl-deserpidates, e.g.

2-methoxyethyl 17α-cyano-17α-desmethoxy-18-epi-O-(2-methoxyethyl)-deserpidate, 2-methoxyethyl 17α-cyano-17α-desmethoxy-18-epi-O-(2-ethoxyethyl)-deserpidate and the like, or analogous compounds, or therapeutically acceptable acid addition salts thereof.

*Example 37*

To a solution of 1.4 g. of 2-methoxyethyl 18-epi-O-(2-methoxyethyl)-reserpate in 21 ml. of acetone is added 0.3 ml. of concentrated hydrochloric acid in 3.5 ml. of acetone. The reaction mixture is evaporated under reduced pressure, the residue is redissolved in ethyl acetate, and the organic solution is slowly evaporated until the beginning of gel formation. An excess of petroleum ether is added to yield the granular 2- methoxyethyl 18-epi-O-(2-methoxyethyl)-reserpate hydrochloride, which is quickly filtered off and dried under reduced pressure. It analyzes as the hemihydrate after drying at 110° under reduced pressure for three hours, M.P. 153–163° (with decomposition); yield: 1.23 g.

*Example 38*

A solution of 5.0 g. of 2-methoxyethyl 18-O-(3-nitrophenyl-sulfonyl)-reserpate and 1.2 g. of N,N,N-triethylamine in 125 ml. of 2-methoxyethanol in a sealed bottle is heated on the steam bath for 24 hours; the resulting mixture is evaporated under reduced pressure, the residue is taken up in methylene chloride, and the solution is worked up as shown in Example 36 to yield the 2-methoxyethyl 18-epi-O-(2-methoxyethyl)-reserpate, M.P. 143–145° (yield: 3.0 g.), which is identical with the product obtained according to the procedure described in Example 36.

The starting material may be prepared by allowing to stand for three hours at room temperature a mixture of 9.6 g. of 2-methoxyethyl reserpate and 6.0 g. of 3-nitrobenzene sulfonyl chloride in 15 ml. of pyridine (prepared at 0°), which is then poured into 600 ml. of water containing 4.5 ml. of N,N,N-triethylamine and 10 ml. of aqueous ammonia. The granular solid is filtered off, washed and dissolved in methylene chloride; the solution is filtered through a diatomaceous earth preparation and evaporated. The residue is crystallized by dissolving it in a small amount of methylene chloride, concentrating the solution until crystallization sets in and diluting it with diethyl ether. The resulting 2-methoxyethyl 18-O-(3-nitro-phenyl-sulfonyl)-reserpate melts at 152–156° C.; yield: 11.2 g.

*Example 39*

A mixture of 6.34 g. of methyl 18-O-(4-bromo-phenyl-sulfonyl)-reserpate, 1.2 g. of N,N,N-triethylamine and 135 ml. of n-hexanol is heated at 120° in a nitrogen atmosphere for 114 hours. The solvent is removed under reduced presure, water is added and re-evaporated. The residue is dissolved in methylene chloride, the solution is washed with a 5 percent aqueous sodium carbonate solution, water and a saturated aqueous sodium chloride solution, dried and evaporated to dryness. The residue is triturated with diethylether, and the crude methyl 18-epi-O-n-hexyl-reserpate is recrystallized from acetonitrile, M.P. 218–221°, [α]$_D^{25}$=—13° (in chloroform).

A suspension of 0.5 g. of methyl 18-epi-O-n-hexyl-reserpate in 50 ml. of 0.1 N aqueous hydrochloric acid is diluted with a sufficient amount of methanol and a small quantity of 5 percent hydrochloric acid to dissolve the solid material. The organic solvent is evaporated under reduced pressure while maintaining the temperature below 30°. The crystalline precipitate is collected and washed with cold water to yield the methyl 18-epi-O-n-hexyl-reserpate hydrochloride hemihydrate, M.P. 219–221° (decomposition).

The following compounds are prepared according to the above-described method:

Methyl 18-epi-O-secondary butyl-reserpate, M.P. 202–203° (after recrystallization from diethyl ether), the lyophilized hydrochloride of which melts at 220–222°;

Methyl 18-epi-O-n-heptyl-reserpate, M.P. 216–217° (recrystallized from acetonitrile), the hydrochloride hemihydrate of which melts at 216–219°;

Methyl 18-epi-O-n-octyl-reserpate, M.P. 192–193° (recrystallized from acetonitrile); [α]$_D^{23}$=—11° (in chloroform), the hydrochloride sesquihydrate of which melts at 210–211° (with decomposition);

Methyl 18-epi-O-n-nonyl-reserpate, M.P. 184–185° (recrystallized from acetonitrile); [α]$_D^{25}$=—9.5° (chloroform), the hydrochloride hemihydrate of which melts at 221.5–223° (decomposition).

*Example 40*

A mixture of 4.75 g. of methyl 18-O-(4-bromo-phenyl-sulfonyl)-reserpate and 0.9 g. of triethylamine in 50 ml. of 1,4-butandiol and 50 ml. of dioxane is heated for twenty days on the steam bath. The dioxane is removed under reduced pressure, the residual liquid is poured into a mixture of 100 ml. of a 5 percent aqueous sodium carbonate and 200 ml. of water, and the organic material is extracted with methylene chloride. The organic solution is washed with an aqueous solution of sodium carbonate, water and an aqueous sodium chloride solution, dried and evaporated. The residue is triturated with diethylether to yield 2.64 g. of the crude methyl 18-epi-O-(4-hydroxybutyl)-reserpate of the formula:

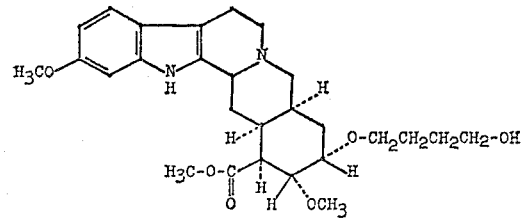

which is recrystallized from ethyl acetate and then from acetonitrile, M.P. 204–205°; [α]$_D^{23}$=—24° (chloroform).

To a solution of 0.49 g. of methyl 18-epi-O-(4-hydroxybutyl)-reserpate in 20 ml. of acetone is added 12.5 ml. of 0.1 N hydrochloric acid and the solution is evaporated under reduced pressure. The resulting crude oil is triturated with several portions of diethyl ether, the crude material is dried and then crystallized by boiling a suspension thereof in ethyl acetate to yield the methyl 18-epi-O-(4-hydroxybutyl)-reserpate hydrochloride hemihydrate, M.P. 203–207° (decomposition).

Other compounds prepared according to the above procedure are, for example,

Methyl 18-epi-O-(3-hydroxypropyl)-reserpate, M.P. 225–226° (decomposition; recrystallized from benzene and then from acetonitrile), [α]$_D^{22}$=—30° (chloroform), the anhydrous hydrochloride of which melts at 230–231.5°;

Methyl 18-epi-O-(5-hydroxypentyl)-reserpate, M.P. 205–206° (after recrystallization from acetonitrile), the lyophilized hydrochloride of which melts at 180–186°;

*Example 41*

The free hydroxyl group of 18α-hydroxy-lower alkoxy-3-epi-allo-yohimbane 16β-carboxylic acid esters, such as the methyl 18-epi-O-(2-hydroxyethyl)-reserpate of Example 12 or the analogous compounds described in Example 40, may be esterified as follows to yield 18α-esterified hydroxy-lower alkoxy-3-epi-allo-yohimbane 16β-carboxylic acid esters;

To a solution of 1.38 g. of methyl 18-epi-O-(2-hydroxyethyl)-reserpate in 15 ml. of dry pyridine is added 1.5 ml. of acetic acid anhydride. The reaction mixture is allowed to stand overnight in a nitrogen atmosphere and is then poured into 40 ml. of ice-water. Methylene chlorine is added, and the mixture is made alkaline with concentrated aqueous ammonia; the layers are separated, and the methylene chloride solution is washed with dilute aqueous ammonia, water and a saturated aqueous solution of sodium chloride and evaporated. The residue is triturated with diethyl ether, the solid material is filtered off, washed with diethyl ether and recrystallized from isopropanol containing a small amount of methylene chloride, the latter being evaporated, to yield the methyl 18-epi-O-(2-acetoxyethyl)-reserpate, M.P. 224–226° (decomposition), $[\alpha]_D^{23} = -20.5°$ (chloroform).

A solution of 0.5 g. of methyl 18-epi-O-(2-acetoxyethyl)-reserpate in 15 ml. of 0.1 N hydrochloric acid is lyophylized to yield the methyl 18-epi-O-(2-acetoxyethyl)-reserpate hydrochloride sesquihydrate, melting at 205–215° after drying.

Other 18-esterified hydroxy-lower alkyl-3-epi-allo-yohimbane 16β-carboxylic acid esters may be prepared as follows: To a solution of 2.29 g. of methyl 18-epi-O-(2-hydroxy-ethyl)-reserpate in 15 ml. of dry pyridine, chilled in an ice-bath, is added 1.27 g. of 3,4,5-trimethoxybenzoyl chloride. The mixture is stirred in the cold for 15 minutes and is then allowed to stand at room temperature overnight. The resulting red solution is poured into 150 ml. of water, the organic material is extracted with methylene chloride, and the organic layer is washed with 2 percent hydrochloric acid, a 2 percent aqueous solution of potassium hydroxide, water and an aqueous solution of sodium chloride and then evaporated. The residue is triturated with diethyl ether, the solid material is filtered off, washed with diethyl ether and recrystallized from acetonitrile to yield 2.37 g. of methyl 18-epi-O-[2-(3,4,5-trimethoxybenzoyloxy)-ethyl]-reserpate, which melts at 191–193° (decomposition) after repeated recrystallizations from acetonitrile and from a 2:1-mixture of benzene and cyclohexane.

To a slurry of 0.65 g. of methyl 18-epi-O-[2-(3,4,5-trimethoxybenzoyloxy)-ethyl]-reserpate in 10 ml. of methanol is added while stirring a 12 N solution of hydrogen chloride in ethanol until the solid material dissolves and the solution is acidic. 50 ml. of diethyl ether is added, the mixture is chilled, and upon scratching the crystalline methyl 18-epi-O-[2-(3,4,5-trimethoxybenzoyloxy)-ethyl]-reserpate hydrochloride precipitates. The anhydrous salt is washed wtih diethyl ether and melts at 172–180° (decomposition).

Other 18α-esterified hydroxy-lower alkoxy-3-epi-allo-yohimbane 16β-carboxylic acid esters, such as methyl 18-epi-O-(2-propionyloxyethyl)-reserpate, ethyl 18-epi-O-(3-pivaloyloxypropyl)-reserpate, methyl 18-epi-O-(2-benzoyloxyethyl)-reserpate, methyl 18-epi-O-[4-(4-chlorobenzoyloxy)-butyl]-reserpate and the like, are prepared according to the above-described procedure or may be obtained by treating an 18β-organic sulfonyloxy-3-epi-allo-yohimbane 16β-carboxylic acid ester with a monoesterified lower alkane diol, preferably in the presence of N,N,N-triethylamine.

Example 42

To a solution of 1.82 g. of methyl 18-epi-O-n-propyl-reserpate and 0.5 g. of maleic acid in about 40 ml. of acetone is added about 50 ml. of diethyl ether. On scratching, the desired methyl 18-epi-O-n-propyl-reserpate maleate hemihydrate crystallizes in large plates, M.P. 196–198° (decomposition).

The following maleate salts may be prepared according to procedures analogous to the one described hereinabove:

Methyl 18-epi-O-ethyl-reserpate maleate hemihydrate, M.P. 195–197° (decomposition);

2 - methoxyethyl 18 - epi - O-(2-methoxyethyl)-reserpate maleate monohydrate, M.P. 95–98°.

Other salts, such as the sulfate and the like, may be prepared according to known methods, for example, as follows: To a solution of 4.57 g. of methyl 18-epi-O-n-propyl-reserpate in about 130 ml. of ethyl acetate is added while stirring a precooled solution of 0.5 g. of sulfuric acid (97 percent) in 2 ml. of ethyl acetate. The reaction mixture is stirred at −10° to 0° for one hour and then allowed to stand at −10° overnight. The desired methyl 18-epi-O-n-propyy-reserpate hemisulfate monohydrate is filtered off, washed with cold ethyl acetate and dried at 60° and under a pressure of 20 mm., M.P. 202–207° (decomposition); yield: 3.83 g.

Example 43

A mixture of 5.0 g. of methyl 18-O-(4-bromo-phenylsulfonyl)-reserpate and 0.9 g. of N,N,N-triethylamine in 250 ml. of 2-N,N-dimethylaminoethanol is heated for seven days in a sealed bottle on a steam bath. The reaction mixture is worked up as shown in Example 19 to yield the methyl 18-epi-O-(2-N,N-dimethylaminoethyl)-reserpate, which crystallizes from a benzene-cyclohexane mixture and is purified by recrystallization from a 1:3-mixture of benzene and cyclohexane, M.P. 210–215°; $[\alpha]_D^{25} = -26°$ (chloroform).

Other 18α-tertiary amino-lower alkoxy-3-epi-allo-yohimbane 16β-carboxylic acid esters, such as, for example, methyl 18 - epi-O-(2-N,N-diethylaminoethyl)-reserpate, methyl 18-epi-O-[2-(1-piperidino)-ethyl]-reserpate, ethyl 18-epi-O-(2-N,N-dimethylaminoethyl) - reserpate, n-propyl 18 - epi-O-(3-N,N-dimethylaminopropyl) - reserpate, methyl 18 - epi-O-(2-N,N-dimethylaminoethyl)-deserpidate, methyl 18-epi-O-(2-N,N - dimethylaminoethyl)-10-methoxy-deserpidate and the like, may be prepared according to the above-described procedure by selecting the proper starting materials and reagents.

Example 44

A mixture of 5.0 g. of methyl 18-O-(4-bromo-phenylsulfonyl)-reserpate, 15 ml. of N,N,N-triethylamine and 160 ml. of tetrahydro-furfurylalcohol is heated for thirteen days in a sealed bottle on the steam bath and worked up as described in Example 19. The desired methyl 18-epi-O-tetrahydrofurfuryl-reserpate is crystallized from diethyl ether and recrystallized from a 1:3-mixture of benzene and cyclohexane, M.P. 210–212°; $[\alpha]_D^{25} = -19°$ (chloroform); yield: 2.0 g.

A mixture of 1.0 g. of methyl 18-epi-O-tetrahydrofurfuryl-reserpate, 2.2 ml. of 1 N hydrochloric acid and 30 ml. of water is lyophylized to yield the methyl 18-epi-O-tetrahydrofurfuryl - reserpate hydrochloride dihydrate, M.P. 185–190°.

Example 45

A mixture of 3.5 of isopropyl 18-O-(4-bromo-phenylsulfonyl)-reserpate, 250 ml. of isopropanol and 1.0 ml. of N,N,N-triethylamine is heated for 10 days in a sealed bottle on the steam bath. The reaction mixture is worked up as described in Example 19; the residue is crystallized from diethyl ether to yield the isopropyl 18-epi-O-isopropyl-reserpate, M.P. 186–190°; $[\alpha]_D^{25} = +2°$ (chloroform).

The methanol from a solution of 1.0 g. of isopropyl 18-epi-O-isopropyl-reserpate and 2.3 ml. of 1 N hydrochloric acid in 30 ml. of water and 10 ml. of methanol is distilled off, and the desired isopropyl 18-epi-O-isopropyl-reserpate hydrochloride dihydrate crystallizes, M.P. 205–210°; yield: 1.0 g.

Example 46

A mixture of 1.5 g. of methyl 10-bromo-18-O-(4-bromo-phenyl-sulfonyl)-reserpate and 0.32 ml. of N,N,N-triethylamine in 120 ml. of methanol is heated for 19 days in a sealed bottle on the steam bath; the reaction mixture is worked up as shown in Example 19 to yield the methyl 10-bromo18-epi-O-methyl-reserpate. The latter is purified by crystallization from a benzene-cyclo-hexane mixture, M.P. 155-160°; $[\alpha]_D^{25}=-55°$ (chloroform); yield: 0.33 g., and is converted into its hydrochloride, M.P. 210–215°, by lyophilizing a solution of 0.28 g. of the base in 0.7 ml. of 1 N hydrochloric acid and 25 ml. of water, yield: 0.3 g.

The starting material may be prepared as follows: To a solution of methyl 18-O-(4-bromo-phenyl-sulfonyl)-reserpate in 60 ml. of acetic acid is added over a period of ten minutes a solution of 0.25 ml. of bromine in 28 ml. of acetic acid while stirring. The reaction mixture is stirred for another ten minutes; the pH is then brought to 5–6 by adding solid sodium hydrogen carbonate and to 9–10 by adding aqueous ammonia. The resulting precipitate is filtered off, washed with water and dissolved in methylene chloride. The organic solution is washed twice with a five percent aqueous solution of sodium carbonate and once with a saturated aqueous sodium chloride solution, dried over sodium sulfate and evaporated. The residue is crystallized from methanol and recrystallized from a mixture of methanol and methylene chloride to yield the methyl 10-bromo-18-O-(4 - bromo-phenyl - sulfonyl) - reserpate, M.P. 205-207°; yield: 1.81 g.

Other lower alkyl 10-bromo-18-epi-O-lower alkyl-reserpates, such as, for example, methyl 10-bromo-18-epi-O-ethyl-reserpate, methyl 10-bromo-18-epi-O-n-propyl-reserpate, ethyl 10-bromo-18-epi-O-methyl-reserpate and the like, may be prepared according to the above-described procedure using the appropriate starting materials and reagents.

*Example 47*

A mixture of 2.2 g. of n-propyl 18-O-(4-bromo-phenyl-sulfonyl)-reserpate, 0.45 g. of N,N,N-triethylamine and 150 ml. of n-pentanol in a sealed bottle is heated on the steam bath for 11 days; the desired n-propyl 18-epi-O-(n-pentyl)-reserpate, isolated as described in Example 19, crystallizes from a 1:4-mixture of benzene-cyclohexane and is recrystallized from a 1:3-mixture of benzene and cyclohexane, M.P. 208–212°; $[\alpha]_D^{25}=-5°$ (chloroform); yield: 0.75 g.

The n-propyl 18-epi-O-n-pentyl-reserpate hydrochloride, M.P. 171–178°, is prepared by concentrating a solution of 0.7 g. of the free base and 3 ml. of a 1:1-mixture of concentrated hydrochloric acid and water in 10 ml. of water and 10 ml. of methanol and lyophylizing the remaining aqueous solution; yield: 0.66 g.

*Example 48*

A mixture fo 3.0 g. of methyl 18-O-(3-nitro-phenyl-sulfonyl)-reserpate, 2.0 ml. of N,N,N-triethylamine and 2-(1-cyclopentenyl)-ethanol in a sealed flask is heated under an atmosphere of nitrogen for 11 days and is worked up as described in Example 19. The resulting brown gum solidifies on adding diethyl ether (yield: 1.2 g.), and the crystalline material is recrystallized repeatedly from acetonitrile to yield the methyl 18-epi-O-[2-(1-cyclopentenyl)-ethyl]-reserpate, M.P. 224–227°.

A solution of 0.15 g. of the free base in 20 ml. of 0.1 N hydrochloric acid and 20 ml. of water yields 0.13 g. of the methyl 18-epi-O-[2-(1-cyclopentenyl)-ethyl] - reserpate hydrochloride, M.P. 204–205° (decomposition).

*Example 49*

A mixture of 4.0 g. of methyl 18-O-(4-bromo-phenyl-sulfonyl)-reserpate, 2 ml. of N,N,N-triethylamine and 10 ml. of 3-phenyl-allyl alcohol in a sealed bottle and under an atmosphere of nitrogen is heated on the steam bath for 25 days. The reaction mixture is worked up as described in Example 19; the resulting brown oil is taken up in petroleum ether and solidifies. The crystalline methyl 18-epi-O-(3-phenyl-allyl)-reserpate is filtered off, recrystallized from acetonitrile, M.P. 241–243°, and converted into its hydrochloride, M.P. 188–192°.

*Example 50*

A mixture of 5.0 g. of methyl 18-O-(4-bromo-phenyl-sulfonyl)-reserpate, 34 ml. of freshly distilled propargyl alcohol and 2.0 ml. of N,N,N-triethylamine is refluxed under an atmosphere of nitrogen for 22 hours, and then concentrated to dryness. The residue is dissolved in methylene chloride, the organic solution is worked up as described in Example 19, and the resulting gummy residue is stirred with petroleum ether and filtered to yield 3.22 g. of a solid material. The latter is stirred with hot ethyl acetate, the mixture is filtered, the filtrate is concentrated to dryness and the residue is stirred with petroleum ether. The resulting solid material is dissolved in 20 ml. of hot acetone and allowed to stand at room temperature for four days. The crystalline methyl 18-epi-O-propargly-reserpate precipitates and is recrystallized from acetone, M.P. 232-233°, and is converted into its hydrochloride, M.P. 218–220° (decomposition) by the previously-described lyophilization procedure.

*Example 51*

A mixture of 5.0 g. of methyl 18-O-(4-bromo-phenyl-sulfonyl)-reserpate, 38.7 g. of 2-methylmercaptoethanol and 2.5 ml. of N,N,N-triethylamine, kept in an atmosphere of nitrogen is heated on a steam bath for 14 days. The reaction mixture is worked up as described in Example 19, and the resulting brown powder is crystallized from acetonitrile, the crystallization mother liquor is concentrated to dryness to yield about 2 g. of a brown gum which is dissolved in 10 ml. of methylene chloride. The organic solution is chromatographed on 62 g. of aluminum oxide (neutral, Woelm activity II–III) and yields 0.12 g. of methyl 18-epi-O-(2 - methylmercaptoethyl) - reserpate, which melts at 252–254° (decomposition) after several recrystallizations from acetonitrile.

*Example 52*

A mixture of 5.0 g. of methyl 18-O-(4-bromo-phenyl-sulfonyl)-reserpate, 60 ml. of cyclohexanol and 2 ml. of N,N,N-triethylamine in a closed flask and under an atmosphere of nitrogen is heated for 8 days on a steam bath. The reaction mixture is worked up as described in Example 19 to yield an oil, which is triturated with petroleum ether. The solid material is filtered off, the filtrate is allowed to stand, whereupon a precipitate is formed, which is collected and recrystallized from ethanol to yield the methyl 18-epi-O-cyclohexyl-reserpate, M.P. 221–223°. The latter is converted into its hydrochloride, which melts at 209–212°.

*Example 53*

A mixture of 3.17 g. of methyl 18-O-(4-bromo-phenyl-sulfonyl)-reserpate and 200 ml. of methanol in a sealed bottle after being flushed with nitrogen is placed on a steam bath; the mixture is stirred and heated for 45 hours. The solvent is evaporated under reduced pressure, the residue is dissolved in methylene chloride, and the organic solution is washed with a 5 percent aqueous solution of sodium carbonate and then with a saturated aqueous solution of sodium chloride, dried and evaporated. The reddish-brown solid crystallizes on stirring with a small amount of diethyl ether, the crystalline material is filtered off after chilling to yield 1.79 g. of the pale-tan crude methyl 18-epi-O-methyl-reserpate, which yields the pure product in white filaments, M.P. 236–238° (decomposition) after recrystallization from isopropanol using charcoal, and which is identical with the product obtained according to the procedure described in Example 1.

*Example 54*

A mixture of 5.0 g. of 2-methoxyethyl 18-O-(3-nitro-phenyl-sulfonyl)-reserpate, 1.7 ml. of N,N,N-triethylamine and 125 ml. of 2-N,N-dimethylaminoethanol in a sealed bottle is heated on the steam bath for three days. The solvent is evaporated under reduced pressure, the residue is dissolved in methylene chloride, and the organic solution is washed twice with a 5 percent aqueous solution of sodium carbonate and once with a saturated solution of sodium chloride in water. The methylene chloride solution is filtered through a column containing a diatomaceous earth preparation and is then evaporated to dryness. The residue is dissolved in 20 ml. of benzene and chromatographed on 25 g. of aluminum oxide (neutral, grade II to III). A total of about 1.0 g. of the crude 2-methoxyethyl 18-epi-O-(2-N,N-dimethyl-aminoethyl)-reserpate is obtained from the combination of the residues from the second benzene wash, benzene containing 10 percent methylene chloride, methylene chloride, and methylene chloride containing 5 percent methanol. The crude material is dissolved in 20 ml. of benzene and rechromatographed on 25 g. of aluminum oxide (neutral, grade II to III), and a total of 0.28 g. of solid material is eluted with methylene chloride containing 0.5 percent of methanol, and methylene chloride containing 2 percent of methanol. The desired 2-methoxyethyl 18-epi-O-(2-N,N-dimethylaminoethyl)-reserpate is obtained by crystallization with diethyl ether and purified by recrystallization from ethyl acetate, M.P. 190–192°; $[a]_D^{24} = -16°$ (chloroform); yield 0.1 g.

A solution of 0.125 g. of 2-methoxyethyl 18-epi-O-(2-N,N-dimethylaminoethyl)-reserpate and 0.55 ml. of 1 N aqueous hydrochloric acid in 8 ml. of water lyophilized, and the very hygroscopic 2-methoxyethyl 18-epi-O-(2-N,N-dimethylaminoethyl)-reserpate hydrochloride is dried under reduced pressure and at room temperature, M.P. 178–186°; yield: 0.12 g.

*Example 55*

A mixture of 4.5 g. of 2-methoxyethyl 18-O-(3-nitro-phenyl-sulfonyl)-reserpate, 1.5 ml. of N,N,N-triethylamine and 100 ml. of 2-(2-methoxyethoxy)-ethanol in a sealed bottle is heated on the steam bath for two days. The solvent is then removed by distillation under reduced pressure, and the residue is dissolved in methylene chloride. The organic solution is washed with a 5 percent aqueous solution of sodium carbonate and a saturated aqueous solution of sodium chloride, filtered through a diatomaceous earth preparation of about one inch thickness, and evaporated. The residual oil is dissolved in 10 ml. of benzene and chromatographed on 20 g. of aluminum oxide (neutral, grade II to III); the crude product (3.0 g.) is eluted with a 1:1-mixture of benzene and cyclohexane, benzene and methylene chloride and is purified by repeated crystallizations from a diethyl ether-petroleum ether mixture. The desired 2-methoxyethyl 18-epi-O-[2-(2-methoxyethoxy)-ethyl]-reserpate melts at 128–130°; $[a]_D^{25} = -14°$ (chloroform).

The hydrochloride is prepared by lyophilizing a solution of 0.225 g. of 2-methoxyethyl 18-epi-O-[2-(2-methoxyethoxy)-ethyl]-reserpate and 0.5 ml. of 1 N hydrochloric acid in 10 ml. of water; it is obtained as the monohydrate and melts at 83–87°.

*Example 56*

A mixture of 4.0 g. of 2-ethoxyethyl 18-O-(3-nitrophenyl-sulfonyl)-reserpate and 1.5 ml. of N,N,N-triethylamine in 100 ml. of 2-ethoxyethanol is heated in a sealed bottle for two days. The reaction product is worked up as shown in Example 36, and the desired 2-ethoxyethyl 18-epi-O-(2-ethoxyethyl)-reserpate is crystallized from a mixture of diethyl ether and petroleum ether, M.P. 125–126°; $[a]_D^{24} = -17°$ (chloroform).

The starting material may be prepared as follows: A mixture of 20.0 g. of methyl reserpate and 3.6 ml. of benzyl trimethyl ammonium hydroxide in 280 ml. of 2-ethoxyethanol is heated on the steam bath for 1½ hours. The excess alcohol is evaporated, the residue is taken up into methylene chloride, the organic solution is washed twice with a 3 percent aqueous ammonia solution and twice with a saturated aqueous sodium chloride solution, and the solvent is partly evaporated. Any precipitate formed is filtered off, the remaining solvent is distilled off and the desired 2-ethoxyethyl reserpate is crystallized from ethyl acetate, M.P. 199–202°.

A mixture of 10.8 g. of 2-ethoxyethyl reserpate and 6.32 g. of 3-nitro-benzene sulfonyl chloride in 14.4 ml. of pyridine is allowed to stand at 5° overnight. The mixture is then poured into water containing small amounts of N,N,N-triethylamine and aqueous ammonia. The precipitate is filtered off and taken up in methylene chloride, the solution is filtered through a diatomaceous earth preparation, the solvent is evaporated and the residue is crystallized from a mixture of methylene chloride and diethyl ether to yield the 2-ethoxyethyl 18-O-(3-nitro-phenyl-sulfonyl)-reserpate, M.P. 160–170°.

*Example 57*

The 18-etherified hydroxy-3-epi-allo-yohimbane 16β-carboxylic acid esters of the present invention, salts, N-oxides or salts of N-oxides thereof, may be used in the form of pharmaceutically acceptable preparations. For example, tablets containing 0.0005 g. of methyl 18-epi-O-methyl-reserpate hydrochloride as the active ingredient may be prepared as follows for (20,000 tablets).

Ingredients: G.

| | |
|---|---|
| Methyl 18-epi-O-methyl reserpate hydrochloride | 10.0 |
| Lactose, spray dried | 2675.0 |
| Corn starch | 300.0 |
| Magnesium stearate | 15.0 |

The methyl 18-epi-O-methyl-reserpate hydrochloride is triturated with the corn starch and forced through a No. 60 sieve; the tools and the sieve are rinsed with a small amount of lactose. The remainder of the lactose and the magnesium stearate are passed through a No. 20 screen, placed in a mixer and the triturate is added. The mass is mixed together for twenty minutes, and the mix is compressed into tablets weighing 0.150 g., using ⁹⁄₃₂ inch die, standard concave punches, uppers bisected, lowers plain.

Tablets containing 0.001 g. of methyl 18-epi-O-n-propyl-reserpate maleate as the active ingredient may be prepared as follows (for 11,000 tablets).

Ingredients: G.

| | |
|---|---|
| Methyl 18-epi-O-n-propyl-reserpate maleate | 11.00 |
| Corn starch | 82.50 |
| Lactose, spray dried | 1548.25 |
| Magnesium stearate | 8.25 |

The methyl 18-epi-O-n-propyl-reserpate maleate is triturated with the corn starch. The magnesium stearate is blended with 100 g. of lactose. All powders are passed through a No. 30 mesh screen, mixed for 30 minutes in a mixer, and then compresses into tablets weighing 0.15 g. using ⁹⁄₃₂ inch concave punches, upper bisected and lower with monogram.

Tablets containing 0.0005 g. of methyl 18-epi-O-n-propyl-reserpate maleate as the active ingredient are prepared as follows (for 3000 tablets).

Ingredients: G.

| | |
|---|---|
| Methyl 18-epi-O-n-propyl-reserpate maleate | 1.50 |
| Corn starch | 22.50 |
| Lactose, spray dried | 423.75 |
| Magnesium stearate | 2.25 |

The methyl 18-epi-O-n-propyl-reserpate maleate is triturated with the corn starch. The magnesium stearate is blended with 50 g. of lactose. All powders are passed through a No. 30 mesh screen, mixed for 30 minutes in a mixer, and then compressed into tablets weighing 0.15 g. using ⁹⁄₃₂ inch concave punches, upper bisected and lower with monogram.

An injectable solution containing 0.005 g./ml. of methyl 18-epi-O-methyl-reserpate hydrochloride as the active ingredient may be prepared as follows (for 120 ml.).

Ingredients: G.
Methyl 18-epi-O-methyl-reserpate hydrochloride _____ 0.600
Sodium acetate, anhydrous _____ 0.720
Acetic acid, glacial _____ 0.510
Ethylenediamine tetraacetic acid Fe-3 _____ 0.012
Thiourea _____ 0.120
Water for injection, q.s., 120,000 ml.

The ingredients with the exception of methyl 18-epi-O-methyl-reserpate hydrochloride are dissolved in 110 ml. of water. Nitrogen gas is bubbled through the solution and the active compound is dissolved therein. Sufficient water is added to complete the volume of 120 ml., the solution is filtered, and 5 ml. portions are filled into 5 ml. clear glass ampules which are sterilized at 110° for thirty minutes.

An injectable solution containing 0.005 g./ml. of methyl 18-epi-O-n-propyl-reserpate sulfate as the active ingredient may be prepared as follows (for 3000 ml.).

Ingredients: G.
Methyl 18-epi-O-n-propyl-reserpate sulfate ___ 15.0
Sodium chloride _____ 24.6
Thiourea _____ 3.0
Water for injection, q.s., 3000.0 ml.

Nitrogen is passed for 15 minutes through 3500 ml. of boiling water. The thiourea, methyl 18-epi-O-n-propyl-reserpate sulfate and the sodium chloride is dissolved in 2800 ml. of the hot nitrogen-treated water. After cooling the volume is brought to 3000 ml., and the solution is filtered through a medium porosity sintered glass filter. The filling tube and the amber ampules are flushed with nitrogen, and the latter are filled with 2.2 ml. of the solution, sealed and sterilized at 115.5° for thirty minutes.

The single pharmaceutical preparation for oral use (e.g. tablets, capsules, pills and the like) contains from about 0.0001 g. to about 0.02 g. of one of the 18α-etherified hydroxy-3-epi-allo-yohimbane 16β-carboxylic acid ester compounds, salts, N-oxides or salts of the N-oxides of the present invention as the active ingredient. More especially, a single, orally administered tablet may contain form about 0.0001 g. to about 0.02 g., particularly from about 0.0005 g. to about 0.01 g., of a lower alkyl 18-epi-O-lower alkyl-reserpate, particularly a methyl 18-epi-O-lower alkyl-reserpate, in which lower alkyl has from one to three carbon atoms, e.g. methyl 18-epi-O-methyl-reserpate, methyl 18-epi-O-ethyl-reserpate, methyl 18-epi-O-n-propyl-reserpate and the like, or of a therapeutically and pharmacologically acceptable, non-toxic acid addition salt, such as the hydrochloride, sulfate, maleate and the like, of such compound.

Solutions, for example, for injectable use, contain from about 0.0001 g./ml. to about 0.02 g./ml. of an 18α-etherified hydroxy-3-epi-allo-yohimbane 16β-carboxylic acid ester, a salt, an N-oxide or a salt of an N-oxide thereof. These solutions may be illustrated by injectable solutions containing from about 0.0001 g./ml. to about 0.02 g./ml. especially from about 0.001 g./ml. to about 0.01 g./ml. of a lower alkyl 18-epi-O-lower alkyl-reserpate, particularly a methyl 18-epi-O-lower alkyl-reserpate, in which lower alkyl has from one to three carbon atoms, e.g. methyl 18-epi-O-methyl-reserpate, methyl 18-epi-O-ethyl-reserpate, methyl 18-epi-O-n-propyl-reserpate and the like, or a therapeutically and pharmacologically acceptable, non-toxic acid addition salt, such as the hydrochloride, sulfate, maleate and the like, of such compound.

*Example 58*

The compounds of the present invention can also be used in the veterinary field. For example, they may be employed as tranquilizing agents for quieting animals to facilitate handling, primarily at the time of vaccination, shipment and the like.

For example, a composition suitable for veterinary use, containing methyl 18-epi-O-methyl-reserpate hydrochloride, may be prepared as follows.

Premix: G.
Methyl 18-epi-O-methyl-reserpate hydrochloride _____ 22.000
Wheat standard middlings, 30–80 mesh_ 10,978.000

Total weight_____ 11,000.000

Feed formula:
Corn meal_____ 1,062.875
Fat _____ 80.000
Fish meal, 60% protein_____ 100.000
Soybean meal, 50% protein_____ 500.000
Corn gluten meal_____ 100.000
Dehydrated alfalfa meal_____ 50.000
Corn distiller solubles_____ 40.000
Di-calcium phosphate_____ 28.000
Calcium carbonate_____ 20.000
Iodized salt_____ 10.000
Vitamins A and D (1,000,000 A and 250,000 D/pound)_____ 4.000
Calcium pantothenate_____ 0.250
Butylated hydroxy toluene_____ 0.250
Choline chloride, 25%_____ 2.500
Riboflavin conc. (24 g. per pound)____ 0.125
Vitamin $B_{12}$ (0.02 g. per pound)_____ 1.000
Methionine _____ 0.500
Manganese sulfate_____ 0.500

Total weight_____ 2,000.000

The premix is made by adding the methyl 18-epi-O-methyl-reserpate hydrochloride to the wheat and then mixing until uniformity is obtained.

The feed formula is prepared as follows: A portion of the corn meal is introduced into the blending machine (about half of the amount to be added). The remaining corn meal, previously blended with the pre-heated, liquified fat, is added thereto and mixing is continued until uniformity is obtained. The manganese sulfate, di-calcium phosphate, calcium carbonate and iodized salt are then added with mixing, followed by the addition of the fish meal, soybean meal, corn gluten meal and corn distiller solubles. After a uniform mixture has been obtained, vitamins A and D, calcium pantothenate, choline chloride, riboflavin, vitamin $B_{12}$ and methionine are added in that order. Mixing is continued after the addition of butylated hydroxy toluene, and maintained until a uniform product is obtained.

The premix is added to the feed formula prepared as described above in an amount sufficient to provide a concentration of 0.02 g. of methyl 18-epi-O-methyl-reserpate hydrochloride per 1000 g. of feed in the uniformly blended mix.

Sedation of animals, particularly of poultry, may be achieved by adding from about 0.001 to about 0.02 percent, especially from about 0.002 to about 0.016 percent, of the 18α-etherified hydroxy-3-epi-allo-yohimbane 16β-carboxylic acid ester, such as the lower alkyl 18-epi-O-lower alkyl-reserpate, particularly the methyl 18-epi-O-lower alkyl-reserpate, in which lower alkyl has from one to three carbon atoms, e.g. methyl 18-epi-O-methyl-reserpate, methyl 18-epi-O-ethyl-reserpate, methyl 18-epi-O-n-propyl-reserpate and the like, or water soluble acid addition salts, such as the hydrochloride, sulfate, maleate and the like, of such compounds, to the drinking water.

What is claimed is:
1. Lower alkyl 18 - O - (bromo-phenyl) - sulfonyl-reserpate.
2. Methyl 18-O-(4-bromo-phenyl) - sulfonyl-reserpate.
3. 2-lower alkoxy-ethyl 18-O-(bromo-phenyl-sulfonyl)-reserpate.
4. 2-methoxyethyl 18 - O-(4 - bromo - phenyl-sulfonyl)-reserpate.

5. Lower alkyl 18-O-(nitro-phenyl)-sulfonyl-reserpate.
6. Methyl 18-O-(4-nitro-phenyl)-sulfonyl-reserpate.
7. Methyl 18-O-(3-nitro-phenyl)-sulfonyl-reserpate.
8. 2-lower alkoxy-ethyl 18-O-(nitro-phenyl-sulfonyl)-reserpate.
9. 2-methoxyethyl 18 - O - (3 - nitro-phenyl-sulfonyl)-reserpate.
10. 2-methoxyethyl 18-O-(4-nitro-phenyl-sulfonyl)-reserpate.
11. A member selected from the group consisting of a compound of the formula

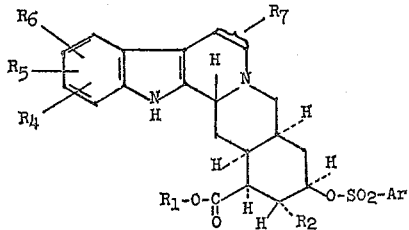

in which $R_1$ is a member selected from the group consisting of lower alkyl, phenyl-lower alkyl, lower alkoxy-lower alkyl, in which lower alkyl separates lower alkoxy from the carboxy group by two to three carbon atoms, and N,N-di-lower alkyl-amino, in which lower alkyl separates N,N-di-lower alkyl-amino from the carboxy group by two to three carbon atoms, $R_2$ is a member selected from the group consisting of lower alkoxy and cyano, Ar is a member selected from the group consisting of halogeno-phenyl and nitro-phenyl, each of the groups $R_4$, $R_5$ and $R_6$ is a member selected from the group consisting of hydrogen, lower alkyl, lower alkoxy, halogeno, lower alkyl-mercapto, and, whenever two of the groups $R_4$, $R_5$ and $R_6$ are attached to two adjacent positions and are taken together, for lower alkylenedioxy, and $R_7$, attached to one of the positions selected from the group consisting of position 5 and position 6, stands for a member selected from the group consisting of hydrogen and lower alkyl, an acid addition salt thereof, an N-oxide thereof and an acid addition salt of an N-oxide thereof.

12. A compound having the following formula

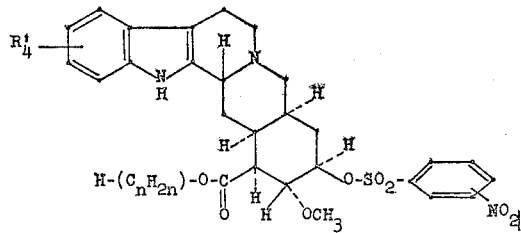

in which the letter $n$ stands for a whole number from one to four, and $R_4'$ is lower alkoxy.

13. A compound of the formula

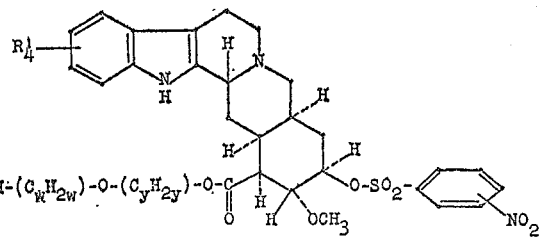

in which the letter $w$ stands for a whole number from one to four, the letter $y$ stands for a whole number from two to three, the group of the formula —$(C_yH_{2y})$— separates the two oxygen atoms attached to this group by at least two carbon atoms, and $R_4'$ is lower alkoxy.

14. A compound of the formula

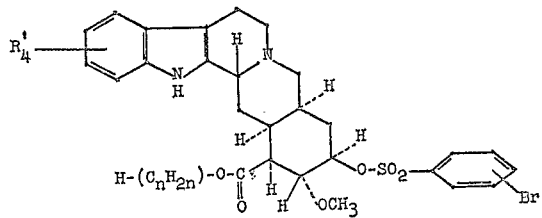

in which the letter $n$ stands for a whole number from one to four, and $R_4'$ is lower alkoxy.

15. A compound of the formula

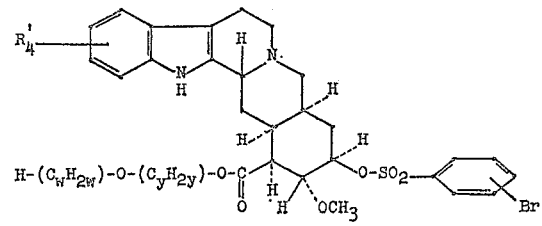

in which the letter $w$ stands for a whole number from one to four, the letter $y$ stands for a whole number from two to three, the group of the formula —$(C_yH_{2y})$— separates the two oxygen atoms attached to this group by at least two carbon atoms, and $R_4'$ is lower alkoxy.

References Cited in the file of this patent
UNITED STATES PATENTS

| | | |
|---|---|---|
| 2,796,420 | Weisenborn | June 18, 1957 |
| 2,857,385 | Kuehne | Oct. 21, 1958 |